(12) United States Patent
Xiong et al.

(10) Patent No.: US 10,301,439 B2
(45) Date of Patent: *May 28, 2019

(54) METHODS OF MAKING AN ELASTOMER COMPOSITE REINFORCED WITH SILICA AND PRODUCTS CONTAINING SAME

(71) Applicant: Cabot Corporation, Boston, MA (US)

(72) Inventors: Jincheng Xiong, Boxborough, MA (US); Martin C. Green, Boxborough, MA (US); William R. Williams, Charlotte, NC (US); Dmitry Fomitchev, Lexington, MA (US); Gerald D. Adler, Charlestown, MA (US); Duane G. McDonald, Cambridge, MA (US); Ron Grosz, Andover, MA (US); Michael D. Morris, Nashua, NH (US)

(73) Assignee: Cabot Corporation, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/935,505

(22) Filed: Mar. 26, 2018

(65) Prior Publication Data

US 2018/0251609 A1 Sep. 6, 2018

Related U.S. Application Data

(63) Continuation of application No. 15/599,899, filed on May 19, 2017, now Pat. No. 9,926,413, which is a continuation of application No. PCT/US2016/042102, filed on Jul. 13, 2016.

(60) Provisional application No. 62/192,891, filed on Jul. 15, 2015, provisional application No. 62/294,599, filed on Feb. 12, 2016.

(51) Int. Cl.
| | |
|---|---|
| *C08K 3/04* | (2006.01) |
| *C08J 3/22* | (2006.01) |
| *C08K 3/36* | (2006.01) |
| *C08K 9/02* | (2006.01) |
| *C08L 7/02* | (2006.01) |
| *C08J 3/16* | (2006.01) |

(52) U.S. Cl.
CPC ........ *C08J 3/22* (2013.01); *C08K 3/04* (2013.01); *C08K 3/36* (2013.01); *C08K 9/02* (2013.01); *C08L 7/02* (2013.01); *C08J 3/16* (2013.01); *C08J 2307/02* (2013.01); *C08K 2201/006* (2013.01)

(58) Field of Classification Search
CPC ..... C08J 3/22; C08K 3/04; C08K 3/36; C08K 9/02; C08L 7/02
See application file for complete search history.

(56) References Cited

U.S. PATENT DOCUMENTS

| | | | |
|---|---|---|---|
| 3,700,620 A | 10/1972 | Burke, Jr. | |
| 3,700,621 A | 10/1972 | Burke | |
| 4,250,082 A | 2/1981 | Sommer et al. | |
| 5,403,570 A | 4/1995 | Chevallier et al. | |
| 5,605,950 A | 2/1997 | Evans et al. | |
| 5,674,932 A | 10/1997 | Agostini et al. | |
| 5,679,728 A | 10/1997 | Kawazura et al. | |
| 5,763,388 A | 6/1998 | Lightsey et al. | |
| 6,013,234 A | 1/2000 | Ray et al. | |
| 6,048,923 A | 1/2000 | Mabry et al. | |
| 6,040,364 A | 3/2000 | Mabry et al. | |
| 6,075,084 A | 6/2000 | Mabry et al. | |
| 6,180,076 B1 | 1/2001 | Uhrlandt et al. | |
| 6,372,822 B1 | 4/2002 | Chung et al. | |
| 6,534,569 B2 | 3/2003 | Mahmud et al. | |
| 6,541,113 B1 | 4/2003 | Mehos et al. | |
| 6,908,961 B2 | 6/2005 | Wang et al. | |
| 7,071,257 B2 | 7/2006 | Esch et al. | |
| 7,250,463 B2 | 7/2007 | Durel et al. | |
| 8,114,935 B2 | 2/2012 | Okel | |
| 8,357,733 B2 | 1/2013 | Wallen | |
| 8,791,177 B2* | 7/2014 | Morris | ........ C08J 3/22 523/318 |
| 9,068,060 B2 | 6/2015 | Matsuura | |
| 9,096,735 B2* | 8/2015 | Morris | ........ B29B 7/465 |
| 9,108,853 B2 | 8/2015 | Neveu et al. | |
| 9,115,258 B2 | 8/2015 | De Gaudemaris et al. | |
| 9,175,144 B2 | 11/2015 | Berriot et al. | |
| 9,284,420 B2 | 3/2016 | De Gaudemaris et al. | |
| 9,290,626 B2 | 3/2016 | De Gaudemaris et al. | |
| 9,290,627 B2 | 3/2016 | De Gaudemaris et al. | |
| 9,926,413 B2* | 3/2018 | Xiong | ........ C08L 7/02 |
| 10,000,612 B2* | 6/2018 | Xiong | ........ C08J 3/05 |

(Continued)

FOREIGN PATENT DOCUMENTS

| | | |
|---|---|---|
| CN | 103159994 | 2/2015 |
| EP | 1834980 B1 | 4/2012 |

(Continued)

OTHER PUBLICATIONS

International Search Report and the Written Opinion of the International Searching Authority, or the Declaration of International Patent Application No. PCT/US2016/042081, dated Sep. 28, 2016.
International Search Report and the Written Opinion of the International Searching Authority, or the Declaration of International Patent Application No. PCT/US2016/042120, dated Sep. 28, 2016.
International Search Report and the Written Opinion of the International Searching Authority, or the Declaration of International Patent Application No. PCT/US2016/042102, dated Sep. 21, 2016.
International Search Report and the Written Opinion of the International Searching Authority, or the Declaration of International Patent Application No. PCT/US2016/042109, dated Sep. 21, 2016.
Zaccone, A., et al., "Shear-Induced Reaction-Limited Aggregation Kinetics of Brownian Particles at Arbitary Concentrations", The Journal of Chemical Physics 132, 134903 (2010).

(Continued)

*Primary Examiner* — Hannah J Pak

(57) ABSTRACT

Methods to make a silica elastomer composite with a destabilized dispersion of a never-dried, or as-produced, precipitated silica are described, along with silica elastomer composites made from the methods. The advantages achieved with the methods are further described.

35 Claims, 3 Drawing Sheets

(56) References Cited

U.S. PATENT DOCUMENTS

| | | | |
|---|---|---|---|
| 10,000,613 B2* | 6/2018 | Xiong | ............ C08L 7/02 |
| 2002/0016404 A1 | 2/2002 | Mabry et al. | |
| 2003/0195276 A1 | 10/2003 | Mabry et al. | |
| 2004/0109944 A1 | 6/2004 | Schmitt et al. | |
| 2006/0143938 A1 | 7/2006 | Karato et al. | |
| 2009/0062428 A1 | 3/2009 | Zhang et al. | |
| 2009/0111923 A1 | 4/2009 | Jiang et al. | |
| 2011/0244382 A1* | 10/2011 | Christopher | ...... G03G 9/09725 430/105 |
| 2012/0259035 A1 | 10/2012 | Berriot et al. | |
| 2012/0264849 A1 | 10/2012 | Berriot et al. | |
| 2012/0264875 A1 | 10/2012 | Berriot et al. | |
| 2013/0317137 A1 | 11/2013 | Thomasson et al. | |
| 2013/0345348 A1 | 12/2013 | Bibette et al. | |
| 2014/0011922 A1 | 1/2014 | Bibette et al. | |
| 2014/0249247 A1 | 9/2014 | De Gaudemaris et al. | |
| 2014/0249249 A1 | 9/2014 | De Gaudemaris et al. | |
| 2014/0249251 A1 | 9/2014 | De Gaudemaris et al. | |
| 2014/0256845 A1 | 9/2014 | De Gaudemaris et al. | |
| 2014/0256846 A1 | 9/2014 | Sevignon et al. | |
| 2014/0296378 A1 | 10/2014 | De Gaudemaris et al. | |
| 2015/0011678 A1 | 1/2015 | Bibette et al. | |
| 2015/0027087 A1 | 1/2015 | Sun et al. | |
| 2015/0038617 A1 | 2/2015 | De Gaudemaris et al. | |
| 2015/0267008 A1 | 9/2015 | Bibette et al. | |
| 2015/0376380 A1 | 12/2015 | Colvin et al. | |
| 2016/0168341 A1 | 6/2016 | Wang et al. | |
| 2016/0185921 A1 | 6/2016 | Wang et al. | |
| 2018/0243701 A1* | 8/2018 | Oba | ............ B01F 15/00409 |
| 2018/0251609 A1* | 9/2018 | Xiong | ............ C08L 7/02 |
| 2018/0273702 A1* | 9/2018 | Xiong | ............ C08K 9/02 |

FOREIGN PATENT DOCUMENTS

| | | |
|---|---|---|
| EP | 2754689 A1 | 7/2014 |
| FR | 2588008 A1 | 4/1987 |
| JP | S6363755 A | 3/1988 |
| JP | 2005/179436 A | 7/2005 |
| JP | 2009/051955 A | 3/2009 |
| JP | 2015-507041 A | 3/2015 |
| WO | WO 97/36957 | 10/1997 |
| WO | WO 01/10946 A2 | 2/2001 |
| WO | WO 02/096914 A2 | 12/2002 |
| WO | WO 03/042285 | 5/2003 |
| WO | WO 03/050182 | 6/2003 |
| WO | WO 2009/099623 | 8/2009 |
| WO | WO 2011/034581 | 3/2011 |
| WO | WO 2011/034587 | 3/2011 |
| WO | WO 2011/034589 A2 | 3/2011 |
| WO | WO 2012/037244 | 3/2012 |
| WO | WO 2014/024124 A1 | 2/2014 |
| WO | WO 2014/110499 | 7/2014 |
| WO | WO 2014/189826 | 11/2014 |
| WO | WO 2016/014037 A1 | 1/2016 |
| WO | WO 2017/011548 | 1/2017 |
| WO | WO 2017/011561 | 1/2017 |
| WO | WO 2017/011566 | 1/2017 |
| WO | WO 2017/011570 | 1/2017 |

OTHER PUBLICATIONS

Wang, M.-J., et al., "NR/Carbon Black Masterbatch Produced with Continuous Liquid Phase Mixing[1]", KGK Kautschuk Gummi Kunststoffe 55, Jahrgang, Nr. Jul. 8, 2002, pp. 1-10.

Alves Junior, José A., et al., "The Behavior of Zeta Potential of Silica Suspensions", New Journal of Glass and Ceramics, 2014, 4, pp. 29-37.

Zaccone, A., et al., "Shear-Driven Solidification of Dilute Colloidal Suspensions", Phys. Rev. Lett. 106, 138301 (2011), Mar. 29, 2011.

Martin, Justin J., et al., "Mixing Silica in Natural Rubber: Impact of Surface Treatment and Mixing Parameters on Performance, Throughput and Energy Use", Rubber World—Nov. 2014, pp. 22-39.

Martínez-Pedrero, F., et al., "Making an Elastomeric Composite Material via the Heteroaggregation of aBinary Colloidal Dispersion", Soft Matter 2012, 8, pp. 8752-8758.

Chapman, Andrew V., et al., "Microdispersion of Silica in Tire Tread Compounds Based on Epoxidized Natural Rubber", Fall 176th Technical Meeting of the Rubber Division of the American Chemical Society, Inc., Pittsburg, PA, Oct. 12-15, 2009.

Patent Examination Report No. 1 from the Australian Patent Office dated Jun. 1, 2018 received in corresponding Australian Patent Application No. 2016294421 (4 pages).

Office Action received in corresponding Japanese Patent Application No. 2018-501268 dated Jan. 22, 2019 (English translation attached) (5 pages).

* cited by examiner

METHODS OF MAKING AN ELASTOMER COMPOSITE REINFORCED WITH SILICA AND PRODUCTS CONTAINING SAME

The present invention relates to methods of making silica elastomer composites. More particularly, the present invention relates to a silica reinforced elastomer composite formed by a wet masterbatch method.

Numerous products of commercial significance are formed of elastomeric compositions wherein particulate reinforcing material is dispersed in any of various synthetic elastomers, natural rubber or elastomer blends. Carbon black and silica, for example, are widely used as reinforcing agents in natural rubber and other elastomers. It is common to produce a masterbatch, that is, a premixture of reinforcing material, elastomer, and various optional additives, such as extender oil. Numerous products of commercial significance are formed of such elastomeric compositions. Such products include, for example, vehicle tires wherein different elastomeric compositions may be used for the tread portion, sidewalls, wire skim and carcass. Other products include, for example, engine mount bushings, conveyor belts, windshield wipers, seals, liners, wheels, bumpers, and the like.

Good dispersion of particulate reinforcing agents in rubber compounds has been recognized for some time as one of the most important objectives for achieving good quality and consistent product performance, and considerable effort has been devoted to the development of methods to improve dispersion quality. Masterbatch and other mixing operations have a direct impact on mixing efficiency and on dispersion quality. In general, for instance, when carbon black is employed to reinforce rubber, acceptable carbon black macro-dispersions can often be achieved in a dry-mixed masterbatch. However, high quality, uniform dispersion of silica by dry-mix processes poses difficulties, and various solutions have been offered by the industry to address this problem, such as precipitated silica in the form of "highly dispersible silica" or "HDS" flowable granules. More intensive mixing can improve silica dispersion, but also can degrade the elastomer into which the filler is being dispersed. This is especially problematic in the case of natural rubber, which is highly susceptible to mechanical/thermal degradation.

In addition to dry mixing techniques, it is known to feed elastomer latex or polymer solution and a carbon black or silica slurry to an agitated tank. Such "wet masterbatch" techniques can be used with natural rubber latex and emulsified synthetic elastomers, such as styrene butadiene rubber (SBR). However, while this wet technique has shown promise when the filler is carbon black, this wet technique, when the filler is silica, poses challenges to achieving acceptable elastomer composite. Specific techniques for producing wet masterbatch, such as the one disclosed in U.S. Pat. No. 6,048,923, the contents of which are incorporated by reference herein, have not been effective for producing elastomer composites employing silica particles as the sole or principal reinforcing agent.

Accordingly, there is a need to improve methods that incorporate silica in elastomer composites in a wet masterbatch process, such as one that makes use of combining two fluids together under continuous, high energy impact conditions, so as to achieve an acceptable elastomer composite comprising silica particles as the sole or principal reinforcing agent, as described in U.S. Patent Application Nos. 62/192,891 and 62/294,599. Now, further improvements have been developed to integrate the manufacture of particulate silica into the production of elastomer composites in wet masterbatch processes, wherein silica drying steps are eliminated.

Precipitated silica is generally produced by acidifying a solution of silicate, which leads to polymerization, nucleation and growth of silica particles in an aqueous medium. The growing particles can collide, leading to aggregation, which can be consolidated by further deposition of silica on particle surfaces. The final size, surface area and structure of the particles are controlled by controlling silicate concentration, temperature, pH and metal ion content. At the end of the particle-forming process, an aqueous slurry of particles is obtained. This slurry undergoes a solid-liquid separation, usually comprising filtration such as by means of a filter press, belt filter or vacuum filter. The filtered particles are then washed to remove salt and other soluble substances and further filtered to give a filter cake. The filter cake typically contains 60-90% water by weight and 10-40% silica on a total filter cake weight basis. A typical production process is described in U.S. Pat. No. 7,250,463, incorporated in its entirety by reference herein.

Conventionally the wet filter cake is dried relatively slowly in ovens, or rotating dryers. Silica produced that way is generally considered difficult to disperse in rubber. An alternative drying process involves rapid heating to high temperatures for a short period of time, for example in a spray dryer. Precipitated silica produced this way generally gives much better dispersability in rubber. It is thought that during conventional drying, a combination of high capillary forces exerted by thin layers of water and chemical reactions between silanol groups on adjacent particles, leads to compact agglomerates with strong bonds between particles. The most significant chemical reaction is condensation, leading to siloxane bonds. This reaction is accelerated by heat and by removal of water. The strong bonds that are formed between particles cannot be easily broken during rubber mixing and hence, dispersion tends to be poor. During the rapid drying process, the residence time of the particles at high temperature is much shorter, providing less time for particle rearrangement or compaction and fewer condensation reactions. This leads to a lower number of bonds or strong contacts between silica particles, and therefore better rubber dispersion. However, it is not thought that silica particle-particle bonding is completely eliminated in the rapid-drying process, just reduced relative to the conventional process.

Thus, it would be very beneficial if a method could be developed that avoided or reduced the amount of drying of silica before its incorporation into rubber (elastomers). The advantages not only would provide a better quality elastomer composite reinforced with silica but also provide savings in the overall processes that utilize silica since the time and cost of drying the silica before its use can be avoided or reduced.

SUMMARY OF THE PRESENT INVENTION

A feature of the present invention is to provide methods to produce elastomer composites using a wet masterbatch process which permits the use of as-produced silica in wet form or silica not subjected to drying before dispersing in the elastomer, and yet achieves desirable silica elastomer composites.

To achieve these and other advantages, and in accordance with the purposes of the present invention, as embodied and broadly described herein, the present invention relates to a method of making elastomer composite in a wet masterbatch process that includes, but is not limited to, the use of a fluid that includes an elastomer latex, and the use of an additional fluid that includes a destabilized dispersion of particulate silica, where the silica has been obtained without drying the silica to a water content of less than 60% by weight. The two fluids are combined together under continuous flow conditions and selected velocities. The combining is such that the silica is dispersed within the elastomer latex and, in parallel (or almost parallel), the elastomer latex is transformed from a liquid to a solid or semi-solid elastomer composite, such as to a solid or semi-solid silica-containing continuous rubber phase. This can occur, for instance, in about two seconds or less such as a fraction of a second, due to the one fluid impacting the other fluid with sufficient energy to cause the uniform and intimate distribution of silica particles in the elastomer. The use of a destabilized dispersion of silica that is not dried beforehand, in this masterbatch process enables formation of an elastomer composite with desirable properties.

The present invention further relates to elastomer composites formed from any one or more of the processes of the present invention. The present invention also relates to articles that are made from or include the elastomer composite(s) of the present invention.

It is to be understood that both the foregoing general description and the following detailed description are exemplary and explanatory only and are intended to provide a further explanation of the present invention as claimed.

The accompanying drawings, which are incorporated in and constitute a part of this application, illustrate various features of the present invention and, together with the description, serve to explain the principles of the present invention.

DETAILED DESCRIPTION OF THE PRESENT INVENTION

Figure 1:
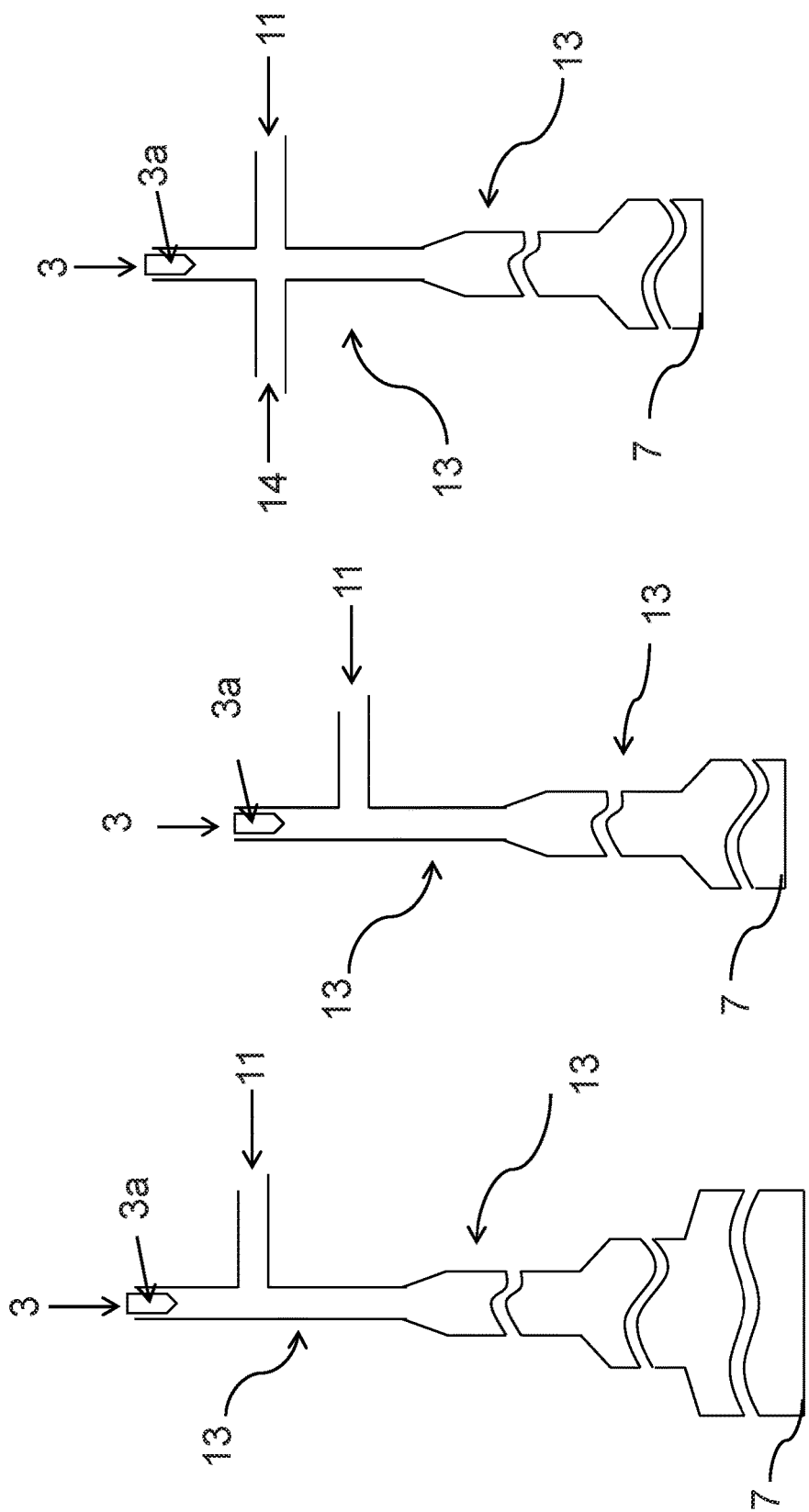
FIG. 1A illustrates an exemplary mixing apparatus in accordance with Process A.
FIG. 1B illustrates an exemplary mixing apparatus in accordance with Process B.
FIG. 1C illustrates an exemplary mixing apparatus having an additional inlet, in accordance with Process B.

The present invention relates to the selective and strategic introduction of silica, as-produced, in wet or never-dried form, into an elastomer latex in an integrated, continuous, or semi-continuous rapid, wet masterbatch process. Selected steps in the semi-continuous process may be carried out as batch processes. This process can be carried out in a semi-confined reaction zone, such as a tubular mixing chamber or other mixing chamber of an apparatus suitable for carrying out such a process under controlled volumetric flow and velocity parameters, leading to beneficial properties that would not be achieved, but for this selective and strategic use of silica. As explained in further detail herein, by 'selective', the present invention uses a destabilized dispersion of silica. And, by 'strategic' introduction, the present invention uses at least two separate fluids, one fluid that includes an elastomer latex, and another fluid that includes the destabilized dispersion of particulate silica. The two fluids can be pumped or transferred into a reaction zone, such as a semi-confined reaction zone. The two fluids can be combined under continuous flow conditions, and under selected volumetric flow and velocity conditions. The combining under pressure with selected differential velocity conditions is sufficiently energetic that the silica can be distributed in two seconds or less, such as in milliseconds, within the elastomer latex, and the elastomer latex is transformed from a liquid to a solid phase, such as to a silica elastomer composite in the form of a solid or semi-solid silica-containing continuous rubber phase.

The present invention relates in part, to a method of producing a silica elastomer composite, comprising, consisting essentially of, consisting of, or including:

(a) providing a continuous flow under pressure of at least a first fluid comprising a destabilized dispersion of silica and providing a continuous flow of a second fluid comprising elastomer latex, wherein the silica has a wt % of silica of from about 6 wt % to about 35 wt %, based on the weight of the first fluid, and wherein the silica has never been dried beforehand to a solids content of greater than 40% by weight;

(b) adjusting volumetric flows of the first fluid and the second fluid to yield an elastomer composite having a silica content of from about 15 phr to about 180 phr; and (c) combining the first fluid flow and the second fluid flow (for instance in a semi-confined reaction zone) with sufficient impact to distribute the silica within the elastomer latex, to obtain a flow of a solid silica-containing continuous rubber phase or semi-solid silica-containing continuous rubber phase. The method transforms the elastomer latex from a liquid to a flow of a solid or semi-solid silica-containing continuous rubber phase. The silica-containing continuous rubber phase can be recovered as a substantially continuous flow of the solid or semi-solid silica-containing continuous rubber phase.

Further details and/or options for the methods of the present invention are described below.

As used herein, "silica" means particulate silicon dioxide, or a particle coated with silicon dioxide, and includes precipitated silica in any form, such as highly dispersible (HDS) granules, non-HDS granules, silica aggregates and silica particles; colloidal silica; fumed silica; and any combinations thereof. Such silicon dioxide or silicon dioxide coated particles may have been chemically treated to include functional groups bonded (attached (e.g., chemically attached) or adhered (e.g., adsorbed)) to the silica surface. Thus, "silica" includes any particle having a surface substantially consisting of silica or silica having functional groups bonded or attached to it.

As used herein, "wet silica" or "never-dried silica" means that the silica material delivered to the wet masterbatch process of the present invention has not been subjected to any drying step or water removing step that increases the solids content of the silica material to greater than 40% by weight, based on the total weight of the silica material (e.g., a silica dispersion or the silica reaction medium or the silica filter cake). Put another way, the silica that is used in the methods of the present invention has a water or other aqueous fluid content of at least 60 wt % (based on the total weight of the silica material) and therefore can be considered a wet silica or never-dried silica.

For purposes of the invention and as used herein, "filter cake" is a reference to a silica cake obtained by filtering the product of a silica precipitation reaction, and is considered a semi-solid product or pulp. The filter cake can be considered a non-slurry product. The filter cake visually appears as a solid and not as a slurry. The filter cake can visually be or have a pomice consistency. The filter cake can and generally does have a moisture content wherein the water content will generally be below 90 wt % based on the weight of the filter cake. While the term "filter cake" is used, the formation of this type of product does not necessarily have to be achieved by filtering but can be achieved by other moisture removing processes or techniques, though filtering is generally the preferred process to obtain the consistency of a filter cake. The filter cake can have a water content of from about 60 wt % to about 90 wt % which is from about 65 wt % to about 85 wt % or from about 70 wt % to about 90 wt % based on the weight of the filter cake.

For purposes of the invention and as used herein, "dispersion" means a stable suspension of solid particles in aqueous fluid, wherein the charge at the surface of the particles prevents particle agglomeration and the dispersion is characterized by a zeta potential magnitude of greater than or equal to 30 mV.

Zeta potential is used to measure stability of charged particles, such as silica particles, dispersed in a fluid. Measurement of zeta potential can have a variance of, for instance +/−2 mV, and, as used herein, zeta potential magnitude refers to the absolute value of the number, e.g., a zeta potential value of minus 30 mV has a greater magnitude than a zeta potential value of minus 10 mV.

As used herein, "destabilized dispersion" means a suspension of solid particles in an aqueous fluid wherein the charge at the surface of the particles has been reduced by the presence of an agent, or by treatment of the solid particles, and is characterized by a zeta potential magnitude of less than 30 mV, or more preferably a zeta potential of less than 28 mV or less than 25 mV. The aqueous fluid can be water, a water miscible fluid (e.g., alcohol or ether), partially water miscible fluid, or a mixture of fluids that contains at least a water miscible or partially water miscible fluid.

As used herein, the terms "silica slurry" and "dispersion" mean a dispersion of silica in an aqueous fluid, wherein the charge at the surface of the silica prevents particle agglomeration and the dispersion is characterized by a zeta potential value with a magnitude of at least 30 mV. A silica slurry or dispersion may be destabilized by treatment with sufficient agent(s), or by treatment of the silica, to reduce the charge on the surface of the silica and the resulting destabilized silica slurry (or destabilized silica dispersion) is characterized by a zeta potential magnitude of less than 30 mV.

As used herein, the terms "uniform" and "uniformly" are intended to mean, conventionally for those skilled in the art, that the concentration of a component, for example, particulate filler, in any given fraction or percentage (e.g., 5%) of a volume is the same (e.g., within 2%) as the concentration of that component in the total volume of the material in question, e.g., elastomer composite or dispersion. Those skilled in the art will be able to verify the statistical uniformity of the material, if required, by means of measurements of concentration of the component using several samples taken from various locations (for example near the surface or deeper in the bulk).

As used herein, a "silica elastomer composite" means a masterbatch (a premixture of reinforcing material, elastomer, and various optional additives, such as extender oil) of coherent rubber comprising a reinforcing amount (e.g., about 15 phr to about 180 phr) of dispersed silica. Silica elastomer composite can contain optional, further components such as acid, salt, antioxidant, antidegradants, coupling agents, minor amounts (e.g., 10 wt % or less of total particulates) of other particulates, processing aids, and/or extender oil, or any combinations thereof.

As used herein, a "solid silica-containing continuous rubber phase" means a composite having a continuous rubber phase and a uniformly dispersed phase of silica and, for instance, up to 90%, by weight, aqueous fluid. The solid silica-containing continuous rubber phase may be in the form of a continuous rope or worm. When compressed these articles release water. The solid silica-containing continuous rubber phase can contain optional, further components such as acid, salt, antioxidant, coupling agents, minor amounts of other particulates (e.g., 10 wt % or less of total particulates), and/or processing oil, or any combinations thereof.

As used herein, a "semi-solid silica-containing continuous rubber phase" means a composite with a paste-like consistency, having a silica-containing, continuous rubber phase. The semi-solid product has a continuous phase of rubber, with entrapped silica uniformly distributed throughout the rubber phase. The semi-solid silica-containing continuous rubber phase remains coherent and expels water, while retaining solids content, upon further handling in one or more subsequent operations selected to develop the paste-like or gel-like material into a solid silica-containing continuous rubber phase.

As used herein, a "coherent" material is material existing in a substantially unitary form that has been created by the adhesion of many smaller parts, such as an elastic, solid mass of rubber created by the adhesion of many small rubber particles to each other.

As used herein, a "continuous flow" is a steady or constant flow of a fluid without interruption from a supply source (e.g., tank). But, it is to be understood that temporary interruptions (e.g., a second or a few minutes) of flow would still be considered a continuous flow (e.g., for instance, when switching supply from various supply holding areas, such as tanks and the like, or interrupting flows to accommodate downstream unit processes or maintenance of the equipment).

The elastomer composite can be produced in a continuous flow process involving a liquid mixture of elastomer latex and destabilized dispersion of silica. Any device, or apparatus or system can be used, provided the device, apparatus, or system can be operated such that a liquid mixture of elastomer latex and a destabilized silica dispersion can be combined under continuous flow conditions and under controlled volumetric flow, pressure, and velocity conditions, including, but not limited to, the apparatus shown in FIG. 1A, 1B, or 1C, or any type of eductor or ejector, or any other device arranged to combine a continuous flow of at least two flows of liquid under controlled volumetric flow, pressure, and velocity conditions into and through a reaction zone. The apparatus described in US20110021664, U.S. Pat. No. 6,048,923, WO2011034589, WO2011034587, US20140316058, and WO2014110499 (each incorporated in their entirety by reference) can be used or adapted to the processes herein as well. Also, ejectors and eductors or syphons such as water jet eductors or steam jet syphons can be used (e.g, ones commercially available from Schutte & Koerting, Trevose, Pa.).

The apparatus can include various supply tanks, pipes, valves, meters and pumps to control volumetric flow, pressure, and velocity. Further, as indicated at inlet (3) in FIGS. 1A, 1B, and 1C, various types and sizes of nozzles or other orifice size control elements (3a) can be employed to control the velocity of the silica slurry. The volumetric dimension of the reaction zone (13) can be selected to provide desired volumetric flows of the fluids and the elastomer composite. The inlet (11) supplying the elastomer latex to the reaction zone may be tapered to provide different volumetric flow rates and velocities. Devices may include an inlet (11) of uniform diameter, without any taper at the orifice leading to the reaction zone.

As indicated, one of the improvements with the present invention is the ability to utilize silica in the first fluid wherein the silica has never been dried to a solids content of greater than 40% by weight, based on the weight of the silica material delivered to the wet masterbatch process. In other words, the silica is obtained in the absence of a drying step which will reduce the water content or moisture content to below 60 wt % based on the total weight of the silica material. With the present invention, the ability to utilize silica without subjecting the silica to a drying step that reduces the water content to below 60 wt %, based on the total weight of the silica material is significant. This permits, for instance, the method of the present invention to utilize silica, for instance precipitated silica while it is still a wet silica.

For instance, prior to providing a continuous flow under pressure of at least a first fluid comprising a destabilized dispersion of silica in particulate form, the method of the present invention can involve methods to form a precipitated silica or other forms of silica. The steps can include acidifying a solution of silicate to obtain an aqueous slurry of precipitated silica. The step can further include filtering the aqueous slurry of precipitated silica to obtain precipitated silica in the form of a filter cake that has a water content of from about 60 wt % to about 90 wt % based on the weight of the filter cake. This water content can be from about 65 wt % to 90 wt %, 70 wt % to 90 wt %, or 60 wt % to 80 wt %, and the like.

As another option, prior to wet masterbatch step (a) which involves providing a continuous flow under pressure of at least the first fluid comprising the silica, the method can include acidifying a solution of silicate to obtain an aqueous slurry of precipitated silica having an initial ionic concentration and then optionally adjusting this initial ionic concentration to yield a solids content of from about 6 wt % to about 35 wt % by weight based on the weight of the aqueous slurry. This solids content can be from about 10 wt % to about 25 wt % or from about 15 wt % to about 20 wt %. The ionic concentration can be adjusted by the addition of an acid and/or salt to the aqueous slurry as described in detail below. The aqueous slurry of precipitated silica can be fed, with or without adjustment of the ionic concentration, and optionally in the absence of any filtering, to the reaction zone as the first fluid.

As another option, the method of the present invention can include, prior to wet masterbatch step (a) of providing a continuous flow under pressure of at least a first fluid containing the silica, the step of acidifying a solution of silicate to obtain an aqueous slurry of precipitated silica and then, without drying the precipitated silica, adjusting the aqueous slurry of the precipitated silica to a solids content of from about 6 wt % to about 35% by weight based on the weight of the aqueous slurry. This solids content as before, can be from about 10 wt % to about 25 wt % or from about 15 wt % to about 20 wt %.

As another option, prior to wet masterbatch step (a), the method can include acidifying a solution of silicate to obtain an aqueous slurry of the precipitated silica and then recovering the precipitated silica in the absence of forming a filter cake wherein the precipitated silica has a water content below 85 wt % based on the weight of the precipitated silica.

As has been stated, the silica, for instance precipitated silica, can be used, as-produced, without any filter cake drying beforehand (namely prior to wet masterbatch step (a)) and/or not formed in any filter cake beforehand. This water content can be from about 84.9 wt % to 60 wt % or from about 80 wt % to 60 wt % or from about 70 wt % to 60 wt % based on the weight of the precipitated silica.

As a further option, the method of the present invention can include the additional steps, prior to wet masterbatch step (a), of acidifying a solution of silicate to obtain an aqueous slurry of precipitated silica and then filtering the aqueous slurry of precipitated silica to obtain precipitated silica in the form of a filter cake and then diluting the filter cake with an aqueous solution and forming the aqueous slurry that becomes the first fluid. In this option, the filtering of the aqueous slurry of precipitated silica to obtain precipitated silica in the form of a filter cake can result in a water content that is lower than desired, and therefore diluting the filter cake to increase the water content of the aqueous slurry is desirable for purposes of using this aqueous slurry as the first fluid in the method of producing a silica elastomer composite of the present invention. The filtering of the aqueous slurry to form the filter cake, and, optionally, the washing of the filter cake with an aqueous fluid, can result in a filter cake having a water content of from, for instance, 80 wt % to 40 wt % such as from about 80 wt % to 60 wt %, based on the weight of the filter cake. And, the diluting of this filter cake with an aqueous solution can lead to a water content of the aqueous slurry of from 94 wt % to about 65 wt % based on the weight of the first fluid.

A further option of the present invention involves, prior to wet masterbatch step (a), of using silica coated carbon black particles wherein the present process involves the use of an aqueous slurry of silica coated carbon black particles that can be utilized without drying of the reaction mixture that contains the silica coated carbon black particles. With this option of the present invention, silica coated carbon black particles can be made that are essentially wet silica coated black particles and instead of going through the complex and costly step of drying this material, it can be utilized in its wet state in the processes of the present invention. Thus, as an option, the method of the present invention can include, prior to wet masterbatch step (a), of adding an aqueous silicate solution to an aqueous slurry of carbon black particles to form a reaction mixture and adjusting the reaction mixture pH to deposit silica onto the carbon black particles and forming an aqueous slurry of silica coated carbon black particles. Without drying the reaction mixture that contains the silica coated carbon black particles, the adjusting of this aqueous slurry containing the silica coated carbon black particles to a solids content of from about 6 wt % to about 35 wt % based on the weight of the aqueous slurry can be utilized as the first fluid in the present invention.

Examples of the type of carbon black and the reaction steps to form the silica coated carbon black can be found in U.S. Pat. Nos. 6,541,113 and 5,679,728, incorporated in their entirety by reference here.

For purposes of the present invention, the various options with regard to forming precipitated silica prior to wet masterbatch step (a) and utilizing the precipitated silica essentially in a form of a wet state, can involve acidifying a solution of silicate (e.g., sodium or potassium silicate) to obtain the aqueous slurry of precipitated silica that may include an electrolyte such as a salt. Precipitated silica is usually produced commercially by combining an aqueous solution of a soluble metal silicate, e.g., alkali metal silicate such as sodium silicate, and an acid so that colloidal particles will grow in weakly alkaline solution and be coagulated by the alkali metal ions of the resulting soluble alkali metal salt. Various acids may be used, including the mineral acids and/or carbon dioxide. In the absence of a coagulant, silica is not precipitated from solution at any pH. The coagulant used to effect precipitation may be the soluble alkali metal salt produced during formation of the colloidal silica particles, it may be added electrolyte such as a soluble inorganic or organic salt, or it may be a combination of both. The deposition of silica on aggregates of previously precipitated silica, has been referred to as reinforcement of precipitated silica. It has been found that by controlling the conditions of silica precipitation and using multiple reinforcement steps, silicas may be produced having properties that make them especially useful for reinforcing elastomeric composites. It has been suggested that as precipitated silica is dried, the material shrinks; consequently, pore diameters are reduced, surface area is reduced, and the void volume is reduced. It is further suggested that by sufficiently reinforcing the silica prior to drying, a more open structure is obtained after drying. It has been found that using potassium silicate as a replacement for some or all of the sodium silicate can result in the production of reinforced amorphous precipitated silica of lower surface area (U.S. Pat. No. 5,605,950). While 'sodium silicate' is a preferred example, it is to be understood that any silicate can be used and are well known in the art. The silicate can be of any form, such as, but not limited to, disilicates, metasilicates, or alkali metal silicates, such as sodium silicate or potassium silicate. For instance, when sodium silicate is used, the silicate can have a $SiO_2$ to $Na_2O$ weight ratio of from about 2:1 to about 4:1 or from 3:1 to 3.7:1. The "acidifying" step can involve the use of one or more acids such as strong inorganic acids as that term is understood in the art. Examples of acids can be or include sulfuric acid, nitric acid, hydrochloric acid, e.g., concentrated sulfuric acid. Further examples include one or more organic acids, such as, but not limited to, acetic acid, formic acid, or carbonic acid. In this process, a sediment, (e.g, at the bottom of a reaction vessel or tank) is formed. The sediment can include the silicate and at least one electrolyte. The amount of silicate present in the sediment may be either the total amount required for the reaction or only a portion of that amount. The term "electrolyte" is any ionic or molecular species which decomposes or dissociates when in solution, to form ions or charged particles. Examples of electrolytes include salts, such as alkali metal salts or alkaline earth metal salts. A particular example is the salt of the starting material silicate and the acid, for example sodium sulfate in the case of a reaction between a sodium silicate and sulfuric acid. The concentration of the electrolyte in the initial sediment can be less than 17 g/l, such as less than 14 g/l. The concentration of silica in the initial sediment can be less than 100 g $SiO_2$ per liter, such as less than 80 g/l or less than 70 g/l. When the acid used for the neutralization is in a high concentration, especially over 70%, the reaction can be conducted using an initial silicate sediment in which the concentration of $SiO_2$ is less than 80 g/l. The second stage of the process can include adding additional acid into the sediment having the composition described above. Addition of this additional acid, which results in a correlated lowering of the pH of the reaction medium, can continue until a pH of at least about 7, such as from 7 to 8, is attained. Once this value is attained and in the event of an initial sediment having only a portion of the total amount of silicate required, the additional acid can be introduced with the remainder of the silicate simultaneously. The precipitation reaction is generally completed when all of the remaining silicate has been added. The next step can be allowing the reaction medium to mature (age) when the precipitation is complete, for example, maturing the reaction medium from 5 minutes to 1 hour, or more. As an option, additional acid can be added to the reaction medium after precipitation, optionally in a later stage. The acid can be generally added until a pH of from 3 to 6.5 is reached, such as from 4 to 6.5 is attained. Addition of the acid permits the pH of the final product silica to be adjusted to a particular value desired. The temperature of the reaction medium can be from about 70° to 98° C. The reaction can be carried out at a constant temperature ranging from 80° to 95° C. As an option, the temperature at the end of the reaction can be higher than at the beginning. For instance, the temperature at the beginning of the reaction can be from 70° to 95° C.; and can then be increased to a range of from 80° to 98° C. and maintained at that level to the end of the reaction. A silica, such as a precipitated silica which is also sometimes described as a silica pulp is obtained after the reaction. The reaction product that contains the silica can then be separated (e.g., a liquid/solid separation). Such a separation can include a filtration, and optionally followed by washing. The filtration may be effected by any suitable technique, for example via a filter press or band filter, or rotating filter under vacuum. The suspension of precipitated silica thus recovered can be considered a "filter cake". The proportion of dry solids in the suspension at this point is generally no greater than 24 wt %, based on the weight of the suspension. As an option, the filter cake may be subjected to one or more milling steps or operations. This may include transferring the cake into a colloidal or ball-type mill. One means for lowering the viscosity of the suspension entails the addition of aluminum thereto, particularly in the form of sodium aluminate, at the stage of actual disintegration. Details of the formation of precipitated silica using an acid and silicate and filtering step are for instance described in U.S. Pat. Nos. 9,068,060, 7,250,463, 7,071,257, 6,013,234 5,605,950, and 5,403,570, all incorporated in their entirety by reference herein.

Figure 2:
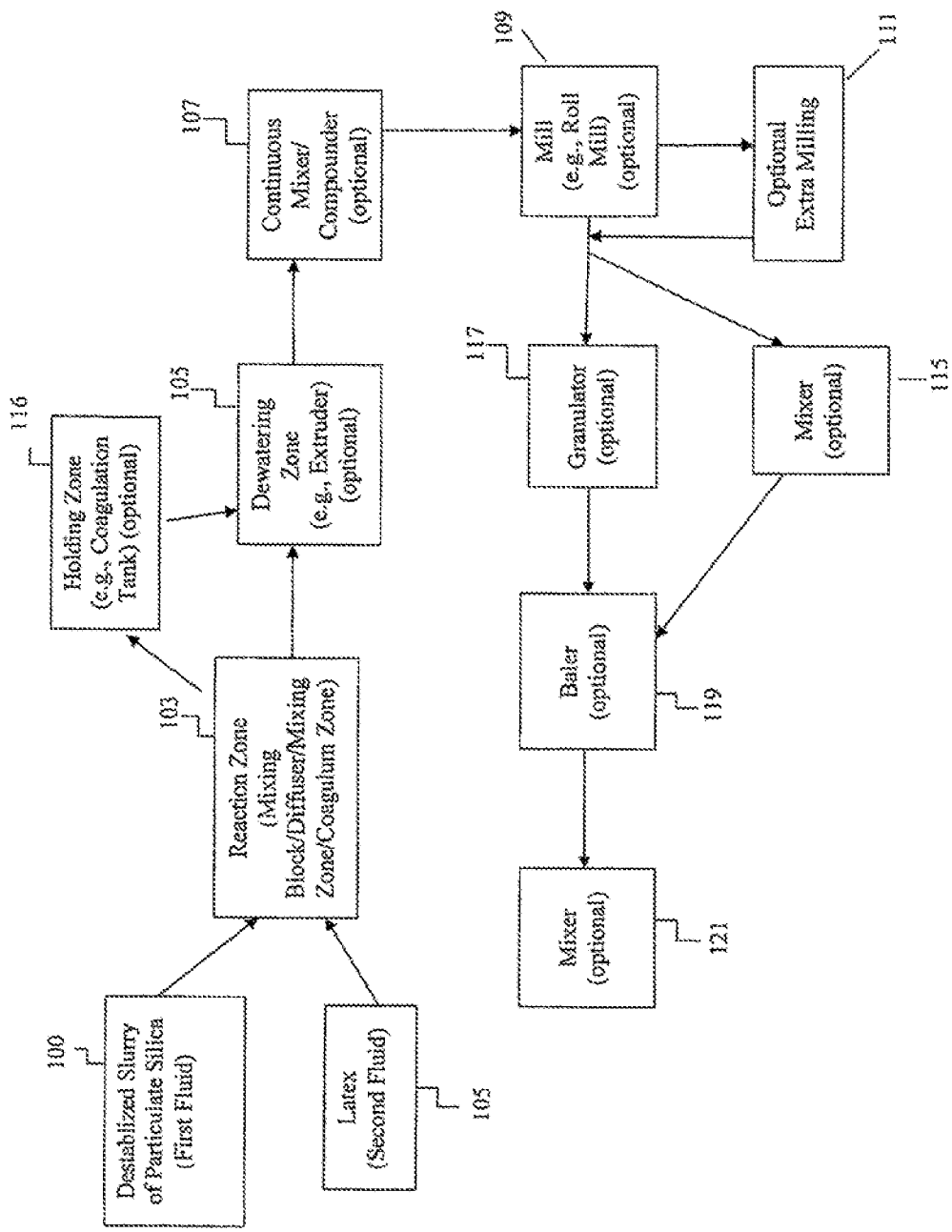
FIG. 2 is a block diagram of various steps that can occur in the formation of the elastomer composite of the present invention and in making rubber compounds with such elastomer composites.
Figure 3:
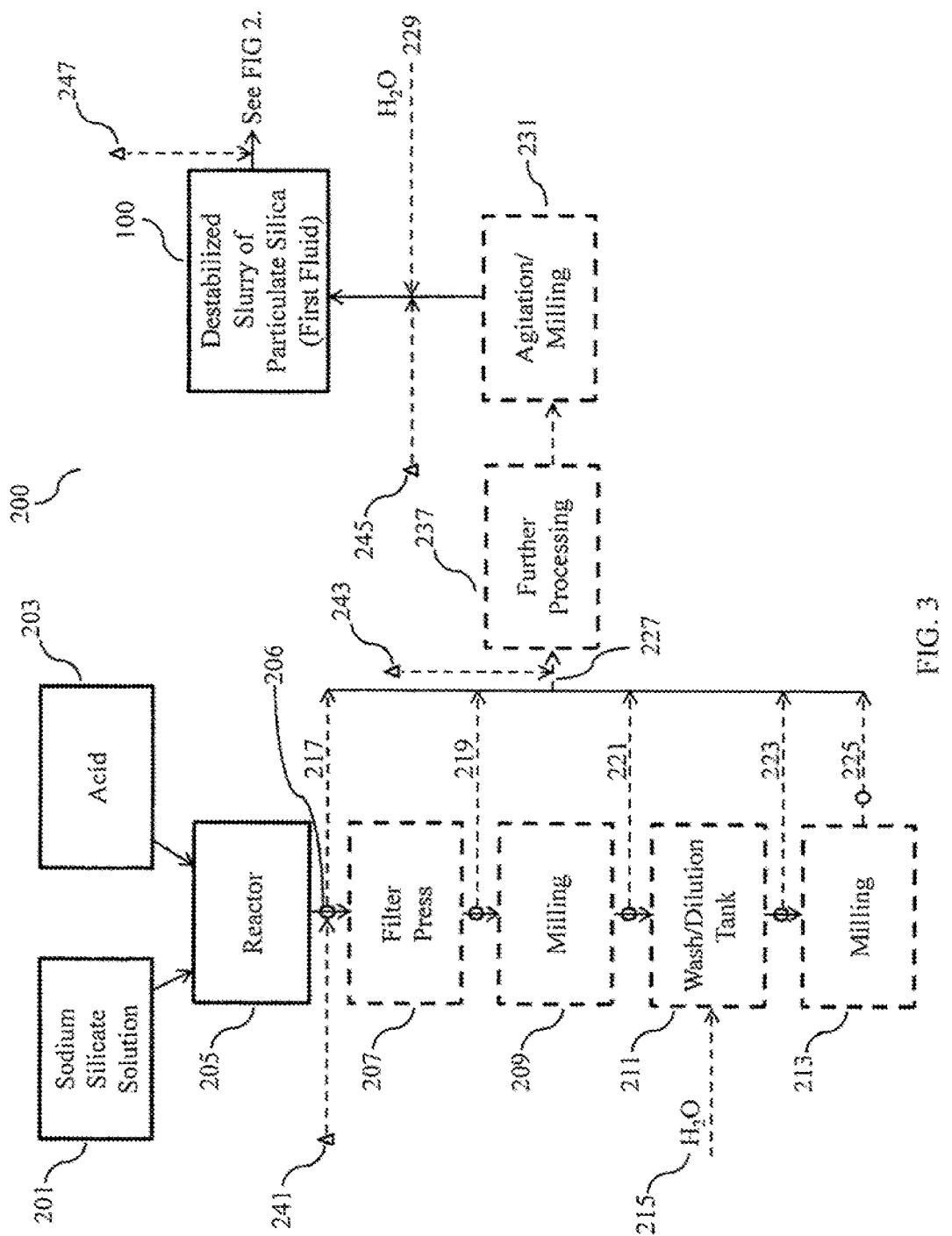
FIG. 3 is a block diagram of various optional steps that can occur to supply silica used in the formation of the silica elastomer composite of the present invention.

FIG. 3 provides a block diagram that provides options of how the silica that is used to include or form the first fluid (which is then used, for instance, in the process shown in FIG. 2) can be prepared. The boxes shown in dashed lines represent optional steps or processing of the silica. The process(es) in FIG. 3 can be a batch process or continuous process or semi-continuous process. Various options are show in the diagram 200. For instance, a silicate solution 201 can be combined with an acid(s) 203 in a reactor 205. Silica in the form of precipitated silica can be obtained (recovered) 206, for instance in a recovery tank, tray or belt (not shown) along with an electrolyte such as a salt. As an option, the silica 206 can optionally be subjected to a washing step(s) 241 to remove at least a portion or most or all of the electrolyte if desired. With or without the optional washing step 241, at this point, the silica can be used per arrow/route 217 as the first fluid in the present application. As shown in FIG. 3, the silica from any of the options can be subjected to further processing as reflected in step 237. The further processing of the silica 237 can include, but is not limited to, one or more of dilution (e.g., addition of water or aqueous fluid), destabilization (e.g, adding an acid and/or salt), ion exchange (e.g., replacing Na and sulfate ions with, e.g., Ca and nitrate ions), and/or diafiltration with or without water. Agitation and/or milling 231, as an option can occur before and/or after the optional 'further processing' step 237. Any number of 'further processing' steps can be used at this point. As a further option, the silica (in lieu of route 217), can be subjected to one or more of steps 207, 209, 211, and/or 225. For instance, the silica from reactor 205 can optionally be washed 241, and/or can be filter pressed (or subjected to one or more water removing processes/techniques) 207 and/or subjected to milling 209 and/or directed to a wash/dilution tank 211 (where water or aqueous fluid 215 can be provided to wash or dilute the silica) and/or subjected to milling 213. As an option, the silica from any of the steps 207, 209, 211, or 213 can be used per arrow/route 219, 221, 223, or 225 shown in FIG. 3. As with arrow/route 217, any of arrow/route 219, 221, 223, or 225 can be subjected to further processing as reflected in step 237 and/or step 231. One or more coupling agents can be added to the silica at various stages of the flow diagram, 243, 245 and/or 247, shown in FIG. 3. As stated, the silica taken from one or more of these locations/feeds 227 can optionally be agitated and/or subjected to milling 231 to reduce silica particle agglomeration, control silica particle size distribution, fluidize the silica slurry, lower silica slurry viscosity, and/or to obtain a better dispersion in liquid, and/or further processed per step 237, to for instance destabilize the silica in the slurry. As an example, the silica optionally taken from per route 217 can have a solids content of from 2 wt % to 40 wt %. As an example, the silica optionally taken from location 219 can have a solids content of from 10 wt % to 25 wt %. As an example, the silica optionally taken from location 221 can have a solids content of from 10 wt % to 40 wt %. As an example, the silica optionally taken from location 223 can have a solids content of from 2 wt % to 30 wt %. As an example, the silica optionally taken from location 225 can have a solids content of from 10 wt % to 40 wt %. If needed, for any of the options, the addition of water or aqueous fluid 229 can be introduced to the silica feed 227 to raise the water content (reduce the solids content) for purposes of forming the first fluid of from about 6 wt % to 35 wt % silica.

In the method, a fluid that includes an elastomer latex and an additional fluid that includes a destabilized dispersion of silica supplied, for instance, as a jet under pressure are combined together under continuous flow conditions and under selected volumetric flow rates, pressure, and velocities to rapidly and intimately mix the two fluids. The combining, for instance in a semi-confined space under pressure, is such that the silica is distributed throughout the elastomer latex and, in parallel, the elastomer latex is transformed from a liquid to a solid or semi-solid phase, i.e., a liquid to solid inversion, or coagulation, of the latex occurs, capturing the distributed silica and water in the rubber and forming a solid or semi-solid silica-containing continuous rubber phase in a continuous or semi-continuous flow out of the reaction zone (e.g., from opening at outlet (7) in FIGS. 1A-1C). At this point, the product can be considered an elastomer composite of a continuous rubber phase containing silica particles, a silica-containing coherent rubber, or a silica elastomer composite. It is believed that the silica particles first must be distributed in the elastomer latex to obtain the desired product, and the liquid to solid phase inversion follows immediately upon the silica distribution. However, with the continuous and extremely rapid rate of combining the fluids (i.e., less than 2 seconds, less than 1 second, less than 0.5 second, less than 0.25 second, less than 0.1 second, or on the order of milliseconds), and the energetic and intimate mixing of relatively small volumes of fluids in the reaction zone (e.g., fluid volumes on the order of 10 to 500 cc), the parallel steps of distribution of the silica particles and liquid to solid phase transformation of the elastomer latex can happen nearly simultaneously. The 'reaction zone' as used herein is the zone where the intimate mixing occurs along with coagulation of the mixture. The mixture moves through the reaction zone and to outlet (7).

An exemplary method for preparing the elastomer composite involves simultaneously feeding a first fluid comprising a destabilized dispersion of silica and a second fluid comprising an elastomer latex (e.g. natural rubber latex) fluid to a reaction zone. The first fluid comprising the destabilized dispersion of silica can be fed at a flow rate based on its volume, and the second fluid comprising the elastomer latex can be fed at a flow rate based on its volume (i.e., volumetric flow rates). The volumetric flows of either the first fluid, the second fluid, or both the first and second fluid can be adjusted or provided so as to yield an elastomer composite having a silica content of from 15 to 180 parts per hundred weight rubber (phr) (e.g., from 35 to 180 phr, from 20 phr to 150 phr, from 25 phr to 125 phr, from 25 phr to 100 phr, from 35 to 115 phr, or from 40 phr to 115 phr, or from 40 phr to 90 phr and the like). The fluid that contains the destabilized dispersion of silica may be referred to as the first fluid in some embodiments herein. This fluid is a separate fluid from the fluid containing the elastomer latex. Either fluid can be introduced through one inlet or injection point or through more than one inlet or injection point.

The volumetric flow ratio of the first fluid (destabilized silica dispersion) to the second fluid (latex fluid) can be adjusted to permit the desired elastomer composite to form. Examples of such volumetric flow ratios include, but are not limited to, a volumetric ratio of from 0.4:1 (first fluid to second fluid) to 3.2:1; from 0.2:1 to 2:1 and the like. The volumetric flow ratio between the first fluid and second fluid can be adjusted by any means or technique. For instance, the volumetric flow rate of the first or second fluid or both can be adjusted by a) increasing the volumetric flow rate, b) decreasing the volumetric flow rate, and/or c) adjusting the flow rates of the fluids relative to each other. Pressure created by physical constraints applied to the flow of the first fluid causes formation of a high velocity jet that enables the combination of the destabilized silica dispersion with the elastomer latex to occur rapidly, e.g., in a fraction of a second. As an example, the time during which two fluids are mixed and a liquid to solid phase inversion occurs can be on the order of milliseconds (e.g., about 50 ms to about 1500 ms or about 100 ms to about 1000 ms). For a given selection of fluids, if the velocity of the first fluid is too slow to adequately mix the fluids, or the residence time is too short, then a solid rubber phase and solid product flow may not develop. If the duration of the process is too long, back pressure may develop in the reaction zone and the continuous flow of materials halted. Likewise, if the velocity of the first fluid is too fast, and the duration of the process is too short, a solid rubber phase and solid product flow may not develop.

As described earlier, the relative volumetric flows of the first fluid (destabilized silica slurry) and the second fluid (latex) can be adjusted, and when at least one salt is used as the destabilization agent, it is preferred to adjust the volumetric flow ratio of destabilized silica slurry to elastomer latex so as to be 0.4:1 to 3.2:1. Other flow ratios may be used.

When at least one acid is used as the destabilization agent, it is preferred to adjust the volumetric flow ratio of destabilized silica slurry to elastomer latex so as to be 0.2:1 to 2:1. Other flow ratios may be used.

The elastomer latex can contain at least one base (such as ammonia), and the destabilized dispersion of silica can be achieved with the addition of at least one acid, wherein the molar ratio of the acid in the first fluid (silica) and the base (e.g., ammonia) in the second fluid (latex) is at least 1.0, or at least 1.1, or at least 1.2, such as from 1 to 2 or 1.5 to 4.5. The base can be present in a variety of amounts in the elastomer latex, such as, but not limited to, 0.3 wt % to about 0.7 wt % (based on the total weight of the elastomer latex), or other amounts below or above this range.

The destabilized silica dispersion can be fed to the reaction zone preferably as a continuous, high velocity, e.g., about 6 m/s to about 250 m/s, or about 30 m/s to about 200 m/s, or about 10 m/s to about 150 m/s, or about 6 m/s to about 200 m/s, jet of injected fluid, and the fluid containing the elastomer latex can be fed at a relatively lower velocity, e.g., about 0.4 m/s to about 11 m/s, or about 0.4 m/s to about 5 m/s, or about 1.9 m/s to about 11 m/s, or about 1 m/s to about 10 m/s or about 1 m/s to about 5 m/s. The velocities of the fluids are chosen for optimizing mixing between fluids and fast coagulation of elastomer latex. The velocity of the elastomer latex fed into the reaction zone should be preferably high enough to generate turbulent flow for better mixing with destabilized silica slurry. Yet, the velocity of the elastomer latex should be kept low enough so that latex would not coagulate from shear before it is well mixed with the destabilized silica slurry. In addition, the velocity of the elastomer latex should be kept low enough before it enters into the reaction zone for preventing clogging of latex supply lines from coagulation of latex due to high shear. Similarly, there is also an optimized range of the velocity of destabilized silica dispersion. It is theorized that if the velocity of the destabilized silica slurry is too high, the rate of shear induced agglomeration of silica particles could be too high to allow adequate, uniform mixing between silica particles and elastomer latex particles.

Shear thickening from agglomeration and networking of silica particles also could reduce turbulence of the destabilized silica slurry and adversely affect the mixing between silica and latex. On the other hand, if the velocity of the destabilized silica slurry is too low, there may not be sufficient mixing between silica particles and elastomer latex particles. Preferably, at least one of the fluids entering into the reaction zone has a turbulent flow. In general, due to much higher viscosity of a typical destabilized silica dispersion relative to a typical elastomer latex, a much higher velocity of the destabilized silica dispersion is needed for generating good fluid dynamics for mixing with the elastomer latex and fast coagulation of the latex. Such high velocity flow of the destabilized silica dispersion may induce cavitation in the reaction zone to enhance rapid mixing of fluids and distribution of silica particles in the elastomer latex. The velocity of the destabilized silica dispersion can be altered by using different volumetric flow rates, or a different nozzle or tip (3a) (wider or narrower in diameter) at the inlet (3) that feeds the first fluid comprising destabilized silica dispersion. With use of a nozzle to increase the velocity of the destabilized silica dispersion, it can be provided under pressure ranging from about 30 psi to about 3,000 psi, or about 30 psi to about 200 psi, or about 200 psi to about 3,000 psi, or about 500 psi to about 2,000 psi or a relative pressure at least 2 times higher than the pressure applied to the fluid containing the elastomer latex, or 2 to 100 times higher. The second fluid of elastomer latex can be provided, as an example, at a pressure ranging from about 20 psi to about 30 psi. The pressure in the first fluid supply system may be up to about 500 psi.

Based on the production variables described herein, such as the velocity of the destabilized silica slurry fluid, the velocity of the latex fluid, the relative flow rates of the destabilized silica slurry and latex fluids, the concentration of the destabilizing agent such as a salt and/or acid, the silica concentration in the destabilized slurry, the rubber weight percent in the latex, the ammonia concentration in the latex, and/or the acid (if present) to ammonia ratio, it is possible to control, obtain, and/or predict formation of a solid or semi-solid silica-containing continuous rubber phase over a range of desired silica contents. Thus, the process can be operated over an optimized range of variables. Thus, the a) velocity of one or both fluids, b) the volumetric flow ratio of the fluids, c) the destabilized nature of the silica, d) particulate silica concentration, e.g., 6 to 35 weight percent, of the destabilized silica dispersion, and e) the dry rubber content, e.g., 10 to 70 weight percent, of the latex, can permit mixing under high impact conditions so as to cause a liquid to solid inversion of the elastomer latex and uniformly disperse the silica in the latex at a selected silica to rubber ratio, and thus form a flow of a solid or semi-solid silica-containing continuous rubber phase. The recovery of the flow of solid or semi-solid silica-containing continuous rubber phase can be achieved in any conventional technique for recovery of a solid or semi-solid flow of material. The recovery can permit the solid or semi-solid flow to enter into a container or tank or other holding device. Such container or holding tank may contain a solution of salt or acid or both to effect further coagulation of the product to a more elastic state. For example, the recovering can be transporting or pumping the solid flow to other processing areas or devices for further processing, of which some options are described herein. The recovering can be continuous, semi-continuous, or by batch. The outflow end of the reaction zone preferably is semi-confined and open to the atmosphere, and the flow of solid or semi-solid elastomer composite is preferably recovered at ambient pressure to allow continuous operation of the process.

The flow of a solid silica-containing continuous rubber phase can be in the form of more or less elastic, rope-like "worms" or globules. The solid silica-containing continuous rubber phase may be capable of being stretched to 130-150% of its original length without breaking. In other cases, a semi-solid silica-containing continuous rubber phase can be in the form of non-elastic, viscous paste or gel-like material that can develop elastic properties. In each case, the output is a coherent, flowing solid whose consistency can be highly elastic or slightly elastic and viscous. The output from the reaction zone can be a substantially constant flow concurrent with the on-going feeding of the elastomer latex and the destabilized dispersion of silica fluids into the reaction zone. Steps in the process, such as the preparation of the fluids, may be done as continuous, semi-continuous, or batch operations. The resulting solid or semi-solid silica-containing continuous rubber phase can be subjected to subsequent further processing steps, including continuous, semi-continuous, or batch operations.

The solid or semi-solid silica-containing continuous rubber phase created in the process contains water, or other aqueous fluid, and solutes from the original fluids, and, for instance, can contain from about 40 wt % to about 95 wt % water, or 40 wt % to about 90 wt % water, or from about 45 wt % to about 90 wt % water, or from about 50 to about 85 wt % water content, or from about 60 to about 80 wt % water, based on the total weight of the flow of silica elastomer composite. As an option, after forming the solid or semi-solid silica-containing rubber phase comprising such water contents, this product can be subjected to suitable de-watering and masticating steps and compounding steps to develop desired rubber properties and fabricate rubber compounds. Further details of the process and other post-processing steps are set forth below and can be used in any embodiment of the present invention.

A semi-solid silica-containing continuous rubber phase may be converted to a solid silica-containing continuous rubber phase. This for instance can be done by subjecting the semi-solid silica-containing continuous rubber phase to mechanical steps that remove water from the composite and/or having the semi-solid material sit for a time (e.g., after recovery from the reaction zone in an offline location) for instance, 10 minutes to 24 hours or more; and/or heating the semi-solid silica-containing continuous rubber phase to remove water content (e.g., a temperature of from about 50° C. to about 200° C.); and/or subjecting the semi-solid material to acid or additional acid such as in an acid bath, or to salt or additional salt, or a salt bath, or to a combination of acid and salt, and the like. One or more or all of these steps can be used. In fact, one or more or all of steps can be used as a further processing step(s) even when a solid silica-containing continuous rubber phase is initially or subsequently recovered.

The degree of destabilization of the silica slurry, at least in part, determines the amount of silica that can be present in the silica elastomer composite (e.g., captured and distributed uniformly within the composite) for a given silica concentration in the silica slurry and a given dry rubber content of the latex. At lower selected target silica to rubber ratios (e.g., 15 phr to 45 phr), the concentration of destabilizing agent may not be high enough in the silica slurry and ultimately the silica/latex mixture to rapidly coagulate and form a solid or semi-solid silica-containing continuous rubber phase. In addition, selecting appropriate silica and rubber concentrations and appropriate relative fluid flow rates as described herein are considerations for forming the solid or semi-solid product. For example, at relatively low volumetric flow ratios of destabilized slurry to latex, the amount of the destabilizing agent in the destabilized silica slurry may not be sufficient to facilitate rapid coagulation of elastomer latex in the reaction zone. Generally, for a given elastomer latex, lower silica loadings can be achieved by increasing the destabilization of the silica slurry and/or reducing the weight percentage of silica in the destabilized slurry.

When a dispersion of silica is destabilized, the silica particles tend to flocculate. When a dispersion of silica is too highly destabilized, the silica can 'fall out' of solution and become unsuited for use in preferred embodiments.

When destabilization occurs, the surface charges on the silica are typically not completely removed. However, sometimes when the silica particle, or the silica dispersion, is treated to destabilize, the isoelectric point (IEP) may be crossed over from a negative zeta potential to a positive zeta potential value. Generally for silica, the net charge on the surface of the silica particles is reduced and the magnitude of the zeta potential is decreased during destabilization.

For higher silica to rubber ratios in the silica elastomer composite, one may select higher silica concentrations in the destabilized slurry and/or a higher silica fluid to latex fluid volumetric flow ratio. Once the silica slurry is destabilized and initially combined with the latex fluid, if the mixture does not coagulate, the volume flow ratio of the first fluid and second fluid can be adjusted, such as by decreasing the volume flow of latex, which effectively provides a higher silica to rubber ratio in the elastomer composite. In this step of adjusting the amount of latex present, the amount of latex is, or becomes, an amount that does not cause excessive dilution of the concentration of the destabilizing agent in the overall mixture such that the desired product can be formed within the residence time in the reaction zone. To obtain a desired silica to rubber ratio in the elastomer composite, various options are available. As an option, the level of destabilization of the silica slurry can be increased, such as by reducing the magnitude of the zeta potential of the destabilized silica slurry (e.g., by adding more salt and/or acid). Or, as an option, the silica concentration in the destabilized silica slurry can be adjusted, for instance, by lowering or increasing the silica concentration in the destabilized silica slurry. Or, as an option, a latex can be used that has a higher rubber content, or a latex can be diluted to a lower rubber content, or the relative flow rate of the latex can be increased. Or, as an option, the flow rate and orifice size (where each can control or affect velocity of the fluid(s)) or relative orientation of the two fluid flows can be modified to shorten or lengthen the residence time of the combined fluids in the reaction zone, and/or alter the amount and type of turbulence at the point of impact of the first fluid on the second fluid. Any one or two or more of these options can be used to adjust the process parameters and obtain a target or desired silica to rubber ratio in the elastomer composite.

The amount or level of destabilization of the silica slurry is a major factor in determining what silica to rubber ratio can be achieved in the silica elastomer composite. A destabilizing agent used to destabilize silica in the slurry may play a role in accelerating coagulation of elastomer latex particles when the destabilized silica slurry is mixed with elastomer latex in the reaction zone. It is theorized that the rate of latex coagulation in the reaction zone may depend on the concentration of the destabilizing agent in the combined fluids. It has been observed that by running the process for producing silica elastomer composite under various conditions, one may determine a threshold concentration of a destabilizing agent present in the combined mixture of fluids at the time of mixing that is effective to produce solid or semi-solid silica-containing continuous rubber phase. An example of selecting and adjusting process conditions to achieve the threshold concentration to yield solid or semi-solid silica-containing continuous rubber phase, is described in the Examples below. If the threshold concentration for a given selection and composition of fluids, volumetric flows, and velocities is not equaled or exceeded, a solid or semi-solid silica-containing continuous rubber phase will generally not be produced.

The minimum amount of destabilization of the silica slurry is indicated by a zeta potential magnitude of less than 30 mV (e.g. with zeta potentials such as −29.9 mV to about 29.9 mV, about −28 mV to about 20 mV, about −27 mV to about 10 mV, about −27 mV to about 0 mV, about −25 mV to about 0 mV, about −20 mV to about 0 mV, about −15 mV to about 0 mV, about −10 mV to about 0 mV and the like). If the silica slurry has been destabilized to within this zeta potential range, then the silica in the destabilized slurry can be incorporated into a solid or semi-solid silica-containing continuous rubber phase when combined with the elastomer latex.

While it may be desirable to destabilize the latex before combining it with the silica slurry, under shear conditions such as those present while continuously pumping the latex into the reaction zone, it is difficult to destabilize the latex fluid beforehand without causing premature coagulation of the latex. However, the destabilization agent used in the destabilized silica slurry may be present in a surplus amount to enhance destabilization of the latex, and/or mitigate dilution of the agent once the destabilized silica slurry and latex fluid are combined. As a further option, at especially high silica concentrations (e.g., >25 wt % silica in the silica slurry), some added destabilization agent can be added separately to the mixture of the destabilized silica slurry and elastomer latex in the reaction zone to enhance coagulation of the latex.

Without wishing to be bound to any theory, the process for producing silica elastomer composite is believed to form interpenetrated coherent networks of both rubber particles and silica aggregates in about two seconds or less, such as a fraction of a second, as the two fluids combine and the phase inversion occurs, resulting in a solid or semi-solid material comprising these networks with encapsulated water. Such fast network formation allows the continuous production of a solid or semi-solid silica-containing continuous rubber phase. It is theorized that shear induced agglomeration of silica particles as the destabilized silica slurry passes through an inlet nozzle to be combined with the elastomer latex may be useful for creating unique, uniform particle arrangement in rubber masterbatches and capturing silica particles within rubber through hetero-coagulation between silica and rubber particles. It is further theorized that without such an interpenetrated network, there may not be a composite of a solid or semi-sold, continuous rubber phase containing dispersed silica particles, in the shape of a worm, or solid pieces, for instance, that encapsulates 40-95 wt % water and retains all or most of the silica in subsequent dewatering processes including squeezing and high energy mechanical working.

It is theorized that the formation of a silica network arises, at least in part, from shear induced silica particle agglomeration as the destabilized silica slurry passes through a pressurized nozzle (3a) at high velocity through the first inlet (3) into the reaction zone (13), as shown in FIGS. 1A-1C. This process is facilitated by reduction of stability of silica in the destabilized slurry when the silica slurry has been destabilized (e.g., by treating the silica slurry with salt or acid or both).

It is theorized that the liquid to solid phase inversion of the latex may result from various factors, including shear induced coagulation from mixing with the high velocity jet of destabilized silica slurry, interaction of the silica surface with the latex components, ionic or chemical coagulation from contact with the silica slurry containing destabilizing agent, and a combination of these factors. In order to form composite material comprising the interpenetrated silica network and rubber network, the rates of each network formation as well as the rate of mixing should be balanced. For example, for highly destabilized silica slurries at a high salt concentration in the slurry, agglomeration and network formation of silica particles occurs rapidly under shear conditions. In this case, volumetric flows and velocities are set so the latex has a rapid rate of coagulation for formation of the interpenetrated silica/rubber networks. Rates of formation are slower with more lightly destabilized silica slurries.

One exemplary process to produce a silica elastomer composite includes feeding a continuous flow of a fluid that contains at least elastomer latex (sometimes referred to as the second fluid) through inlet 11 (FIGS. 1A, 1B, and/or 1C), to a reaction zone 13 at a volumetric flow rate of about 20 L/hr to about 1900 L/hr. The method further includes feeding a continuous flow of a further fluid containing a destabilized dispersion of silica through inlet 3 (sometimes referred to as the first fluid) under pressure that can be accomplished by way of nozzle tips (in FIG. 1A-1C, at 3a) at a volumetric flow rate of 30 L/hr to 1700 L/hr. The destabilized state of the silica dispersion and the impacting of the two fluid flows (introduced at inlets 3 and 11) under high energy conditions created by introducing the first fluid as a high velocity jet (e.g., about 6 m/s to about 250 m/s) that impacts the lower velocity latex flow (e.g., 0.4-11 m/s) entering the reaction zone at an angle approximately perpendicular to the high speed jet of the first fluid is effective to intimately mix the silica with the latex flow, promoting a uniform distribution of silica in the flow of solid silica-containing continuous rubber phase from the outlet of the reaction zone.

As an option, the elastomer latex introduced, for instance, through inlet 11 can be a blend of two or more latexes, such as a blend of two or more synthetic latexes. As an option, the devices in FIGS. 1A, 1B, and/or 1C can be modified to have one or more additional inlets so as to introduce other components to the reaction zone, such as one or more additional latexes. For instance, in FIG. 1C, inlet 14 can be used to introduce a further latex besides using inlet 11. The one or more additional inlets can be sequential to each other, or be adjacent to each other or set forth in any orientation as long as the material (e.g. latex) being introduced through the inlet(s) has sufficient time to disperse or be incorporated into the resulting flow. In WO 2011/034587, incorporated in its entirety by reference herein, FIGS. 1, 2A, and 2B provide examples of additional inlets and their orientations which can be adopted here for use with embodiments of the present invention. As a particular example, one inlet can introduce a flow that includes natural rubber latex and an additional inlet can introduce a synthetic elastomer latex, and these latex flows are combined with the flow of the destabilized dispersion of silica to result in the flow of a solid or semi-solid silica-containing continuous rubber phase. When more than one inlet is utilized for elastomer latex introduction, the flow rates can be the same or different from each other.

FIG. 2 sets forth an example, using a block diagram of various steps that can occur in the formation of the elastomer composite. As shown in FIG. 2, the destabilized dispersion of silica (first fluid) 100 is introduced into the reaction zone 103 and the fluid containing the elastomer latex (second fluid) 105 is introduced also into the reaction zone 103. As an option, a flow of solid or semi-solid silica-containing continuous rubber phase exits the reaction zone 103 and can optionally enter a holding zone 116 (e.g., a holding tank, with or without the addition of a salt or acid solution to further enhance coagulation of rubber and formation of silica/rubber networks); and can optionally enter, directly, or after diversion to a holding zone 116, a dewatering zone 105; can optionally enter a continuous mixer/compounder 107; can optionally enter a mill (e.g., open mill, also called a roll mill) 109; can be subjected to additional extra milling 111 (same or different conditions as mill 109) (such as same or different energy input); can be subjected to optional mixing by mixer 115, and/or can be granulated using a granulator 117, and then can optionally be baled, using a baler 119, and can optionally be broken down by use of an additional mixer 121.

With regard to the silica, one or more types of silica, or any combination of silica(s), can be used in any embodiment of the present invention. The silica suitable for reinforcing elastomer composites can be characterized by a surface area (BET) of about 20 $m^2/g$ to about 450 $m^2/g$; about 30 $m^2/g$ to about 450 $m^2/g$; about 30 $m^2/g$ to about 400 $m^2/g$; or about 60 $m^2/g$ to about 250 $m^2/g$; and for heavy vehicle tire treads a BET surface area of about 60 $m^2/g$ to about 250 $m^2/g$ or for example from about 80 $m^2/g$ to about 200 $m^2/g$. Highly dispersible precipitated silica can be used as the filler in the present methods. Highly dispersible precipitated silica ("HDS") is understood to mean any silica having a substantial ability to dis-agglomerate and disperse in an elastomeric matrix. Such determinations may be observed in known manner by electron or optical microscopy on thin sections of elastomer composite. Examples of commercial grades of HDS include, Perkasil® GT 3000GRAN silica from WR Grace & Co, Ultrasil® 7000 silica from Evonik Industries, Zeosil® 1165 MP and 1115 MP silica from Solvay S.A., Hi-Sil® EZ 160G silica from PPG Industries, Inc., and Zeopol® 8741 or 8745 silica from JM Huber Corporation. Conventional non-HDS precipitated silica may be used as well. Examples of commercial grades of conventional precipitated silica include, Perkasil® KS 408 silica from WR Grace & Co, Zeosil® 175GR silica from Solvay S.A., Ultrasil® VN3 silica from Evonik Industries, Hi-Sil® 243 silica from PPG Industries, Inc. and the Hubersil® 161 silica from JM Huber Corporation. Hydrophobic precipitated silica with surface attached silane coupling agents may also be used. Examples of commercial grades of hydrophobic precipitated silica include Agilon®400, 454, or 458 silica from PPG Industries, Inc. and Coupsil silicas from Evonik Industries, for example Coupsil 6109 silica.

Typically the silica (e.g., silica particles) have a silica content of at least 20 wt %, at least 25 wt %, at least 30 wt %, at least 35 wt %, at least 40 wt %, at least 50 wt %, at least 60 wt %, at least 70 wt %, at least 80 wt %, at least 90 wt %, or almost 100 wt % or 100 wt %, or from about 20 wt % to about 100 wt %, all based on the total weight of the particle. Any of the silica(s) can be chemically functionalized, such as to have attached or adsorbed chemical groups, such as attached or adsorbed organic groups. Any combination of silica(s) can be used. The silica that forms the silica slurry and/or destabilized silica slurry can be in part or entirely a silica having a hydrophobic surface, which can be a silica that is hydrophobic or a silica that becomes hydrophobic by rendering the surface of the silica hydrophobic by treatment (e.g., chemical treatment). The hydrophobic surface may be obtained by chemically modifying the silica particle with hydrophobizing silanes without ionic groups, e.g., bis-triethoxysilylpropyltetrasulfide. Such a surface reaction on silica may be carried out in a separate process step before dispersion, or performed in-situ in a silica dispersion. The surface reaction reduces silanol density on the silica surface, thus reducing ionic charge density of the silica particle in the slurry. Suitable hydrophobic surface-treated silica particles for use in dispersions may be obtained from commercial sources, such as Agilon® 454 silica and Agilon® 400 silica, from PPG Industries. Silica dispersions and destabilized silica dispersions may be made using silica particles having low surface silanol density. Such silica may be obtained through dehydroxylation at temperatures over 150° C. via, for example, a calcination process.

Further, the silica slurry and/or destabilized silica slurry can contain, as an option, a minor amount (10 wt % or less, based on a total weight of particulate material) of any non-silica particles, such as carbon black(s) or zinc oxide, or calcium carbonate, or other particulate materials useful in rubber compositions (e.g., 95 wt % precipitated silica and 5 wt % carbon black). Any reinforcing or non-reinforcing grade of carbon black may be selected to yield the desired property in the final rubber composition.

Silica may be dispersed in aqueous fluid according to any technique known to those of skill in the art. A dispersion of particulate silica can be subjected to mechanical processing, for instance, to reduce particle size. This can be done prior to or during or after destabilizing of the dispersion and can contribute in a minor way or major way to the destabilizing of the dispersion. The mechanical processing can comprise or include grinding, milling, comminution, bashing, or high shear fluid processing, or any combinations thereof.

For example, a silica slurry can be made by dispersing silica in a fluid by means of a grinding process. Such a grinding process reduces the size of most silica agglomerates (e.g. over 80% by volume) in the fluid to below 10 microns, and preferably below 1 micron, the typical size range of colloidal particles. The fluid may be water, an aqueous fluid, or a non-aqueous polar fluid. The slurry, for instance, may comprise from about 6 wt % to about 35 wt % silica-containing particles, based on the weight of the slurry. The size of silica particles may be determined using a light scattering technique. Such a slurry when made in water using silica particles having low residual salt content at a pH of 6-8, typically has a zeta potential magnitude higher than, or equal to, 30 mV and shows good stability against aggregation, gelling, and settlement in a storage tank with slow stirring (e.g. stirring speed below 60 RPM). As well-ground silica particles are generally stable in water at a pH of around 7 due to high negative charges on silica, very high shear is generally needed to overcome the repulsive energy barrier between particles to induce particle agglomeration.

In an exemplary method employing silica, such as HDS granules, the silica can be combined with water, and the resulting mixture is passed through a colloid mill, pipeline grinder, or the like to form a dispersion fluid. This fluid is then passed to a homogenizer that more finely disperses the filler in the carrier liquid to form the slurry. Exemplary homogenizers include, but are not limited to, the Microfluidizer® system commercially available from Microfluidics International Corporation (Newton, Mass., USA). Also suitable are homogenizers such as models MS18, MS45 and MC120, and series homogenizers available from the APV Homogenizer Division of APV Gaulin, Inc. (Wilmington, Mass., USA). Other suitable homogenizers are commercially available and will be apparent to those skilled in the art given the benefit of the present disclosure. The optimal operating pressure across a homogenizer may depend on the actual apparatus, the silica type, and/or the silica content. As an example, a homogenizer may be operated at a pressure of from about 10 psi to about 5000 psi or higher, for example, from about 10 psi to about 1000 psi, about 1000 psi to about 1700 psi, about 1700 psi to about 2200 psi, about 2200 psi to about 2700 psi, about 2700 psi to about 3300 psi, about 3300 psi to about 3800 psi, about 3800 psi to about 4300 psi, or about 4300 psi to about 5000 psi. As indicated earlier, the dispersion of particulate silica is destabilized before carrying out the masterbatch process, and the dispersion can be destabilized by following one of the techniques mentioned herein, before, during, or after any grinding or similar mechanical process.

Depending on the wet masterbatch method employed, a high silica concentration in slurry may be used to reduce the task of removing excess water or other carrier. For the destabilized dispersion of silica particles, the liquid used can be water or other aqueous fluid or other fluid. For the destabilized dispersion, from about 6 weight percent to about 35 weight percent filler may be employed, for example, from about 6 weight percent to about 9 weight percent, from about 9 weight percent to about 12 weight percent, from about 12 weight percent to about 16 weight percent, from about 10 weight percent to about 28 weight percent, from about 16 weight percent to about 20 weight percent, from about 20 weight percent to about 24 weight percent, from about 24 weight percent to about 28 weight percent, or from about 28 weight percent to about 30 weight percent, based on the weight of the destabilized dispersion. For the destabilized dispersion, a higher silica concentration can have benefits. For instance, silica concentration in the destabilized slurry can be at least 10 weight percent or at least 15 weight percent, based on the weight of the slurry (e.g., about 12 wt % to about 35 wt % or about 15.1 wt % to about 35 wt %, or about 20 wt % to about 35 wt %), which can provide benefits such as, but not limited to, reduced wastewater, increased production rates, and/or reduction of the equipment size needed for the process. Those skilled in the art will recognize, given the benefit of this disclosure, that the silica concentration (in weight percent) of the silica slurry (and in the destabilized silica slurry) should be coordinated with other process variables during the wet process to achieve a desired silica to rubber ratio (in phr) in the ultimate product.

Details of a dispersion of silica are further described below. In general, a dispersion can be a material comprising more than one phase where at least one of the phases contains or includes or consists of finely divided phase domains, optionally in the colloidal size range, dispersed throughout a continuous phase. A dispersion or slurry of silica or silica dispersion can be prepared as a stable suspension of particulate silica in aqueous fluid, wherein the charge at the surface of the particles prevents particle agglomeration and the dispersion is characterized by a zeta potential magnitude of greater than or equal to 30 mV. In such dispersions, the silica particles remain in stable dispersion, and/or suspension, with respect to aggregation and coalescence, for instance, for at least 8 hours. A stable dispersion can be one where constant particle size is maintained, and wherein the particles do not settle or gel, or take a very long time to settle appreciably in the presence of slow or periodic stirring, for example, not settling appreciably after 8 hours, or 12 hours or 24 hours, or 48 hours. For instance, for colloidal silica particles well dispersed in aqueous fluid, stability can generally be observed from a pH of 8 to 10. Further, with slow stirring of the dispersion, the silica particles remain suspended in the fluid by means of particle surface charge, particle surface polarity, pH, selected particle concentration, particle surface treatment, and combinations thereof. The fluid may be or include water, an aqueous mixture, or a water miscible or partially miscible fluid, such as various alcohols, ethers, and other low molecular weight water-miscible solvents, preferably having $C_1$-$C_5$ organic groups (e.g., ethanol, methanol, propanol, ethyl ether, acetone, and the like). As indicated above, the dispersion, for instance, may comprise about 6 wt % to about 35 wt %, about 10 wt % to about 28 wt %, about 12 wt % to about 25 wt %, or about 15 wt % to about 30 wt % silica-containing particles, based on the weight of the dispersion.

A stable dispersion may be a colloidal dispersion. In general, a colloidal dispersion or colloid can be a substance where dispersed particles are suspended throughout another substance. The dispersed-phase particles have a diameter of from approximately about 1 nanometer to about 1000 nanometers, and typically about 100 nanometers to about 500 nanometers. In a stable colloidal dispersion, particle size, density, and concentration are such that gravity does not cause particles to settle out of dispersion easily. Colloids with the magnitude of zeta potential of 30 mV or over are generally regarded as stable colloidal systems. Reduction of particle stability (e.g., silica) in a colloid or dispersion due to charge stabilization can be measured by reduction of magnitude of zeta potential. Particle size may be measured by a light scattering method.

A destabilized silica dispersion can be understood to be a dispersion of silica in a fluid wherein weakened particle-to-particle repulsive forces allow clustering of particles and formation of a silica particle-to-particle network or gel once the destabilized dispersion is subjected to an effective amount of shear. In certain cases, mechanical shear may cause destabilization of silica dispersions and clustering of silica particles. The higher the degree of destabilization of silica slurry, the lower the shear needed for aggregation of particles, and the higher the rate of particle aggregation. For a destabilized dispersion, the dispersion can comprise from about 6 wt % to about 35 wt % particulate silica (based on the weight of the dispersion), e.g., from about 8 wt % to about 35 wt %, from about 10 wt % to about 28 wt %, from about 12 wt % to about 25 wt %, from about 15 wt % to about 30 wt %. The aqueous fluid in the destabilized dispersion of silica particles may be or include water, an aqueous mixture, or a water miscible or partially miscible fluid, such as various alcohols, ethers, and other low molecular weight water-miscible solvents, preferably having $C_1$-$C_5$ organic groups (e.g., ethanol, methanol, propanol, ethyl ether, acetone, and the like). To form silica elastomer composites, the stability of silica particles in a slurry or dispersion is reduced (i.e., destabilized) by lowering the electrostatic energy barrier between particles using an effective amount of a destabilizing agent such as acid or salt or both before the slurry is mixed with latex. A destabilizing agent may be selected for its capacity to reduce repulsive charge interaction among particle surfaces that prevent particles from agglomeration in the fluid.

A destabilized dispersion of silica may be obtained by lowering the pH of the dispersion of silica to close to the isoelectric point of the silica (around pH 2 for typical hydrophilic silicas). For example, destabilizing silica can be achieved by adding acid to lower a pH of the dispersion of particulate silica to 2 to 4, thus reducing the magnitude of the zeta potential of the dispersion to less than 30 mV, such as below about 28 mV (e.g., zeta potentials of magnitude of about 18 mV to about 6 mV for formic acid as the destabilization agent). The addition of acid and/or salt into silica slurry can effectively reduce the stability of silica particles dispersed in water. The acid or salt molar concentration is generally the dominant factor that determines the zeta potential of the destabilized silica slurry. In general, a sufficient amount of acid or salt or both can be used to reduce the magnitude of the zeta potential of the silica slurry to less than 30 mV, such as 28 mV or less, preferably 25 mV or less, for producing a semi-solid or solid silica-containing continuous rubber phase.

The amount of acid used to destabilize the silica dispersion can be an amount to obtain a zeta potential magnitude in the destabilized dispersion of less than 30 mV, such as 28 mV or less, or 25 mV or lower. The acid can be at least one organic or inorganic acid. The acid can be or include acetic acid, formic acid, citric acid, phosphoric acid, or sulfuric acid, or any combinations thereof. The acid can be or include a $C_1$ to $C_4$ alkyl containing acid. The acid can be or include one that has a molecular weight or a weight average molecular weight below 200, such as below 100 MW, or below 75 MW, or from about 25 MW to about 100 MW. The amount of acid can vary and depend on the silica dispersion being destabilized. The amount of acid can be, for instance, from about 0.8 wt % to about 7.5 wt %, for example, from about 1.5 wt % to about 7.5 wt % or more (based on the total weight of the fluid comprising the dispersion of silica). If an acid is the only destabilizing agent used, the amount of acid can be an amount that lowers the pH of the dispersion of silica by at least 2 pH units, or to at least a pH of 5 or lower, or the pKa range of the acid or acids in use, so as to reduce charge interactions among particles.

A destabilized dispersion may be obtained by treating a dispersion of silica with a destabilizing agent comprising one or more salts to alter slurry zeta potential to the range described above. The salt can be or include at least one metal salt (e.g., from Group 1, 2, or 13 metals). The salt can be or include a calcium salt, magnesium salt, or aluminum salt. Exemplary counterions include nitrate, acetate, sulfate, halogen ions such as chloride, bromide, iodine, and the like. The amount of salt can be, for instance, from about 0.2 wt % to about 2 wt % or more, for example, from about 0.5 or 1 wt % to about 1.6 wt % (based on the weight of the fluid comprising the destabilized dispersion of silica).

A combination of at least one salt and/or at least one acid can be used to destabilize the dispersion of the silica.

When the destabilized dispersion of silica is achieved with the addition of at least one salt, the salt concentration in the destabilized dispersion of silica can be from about 10 mM to about 160 mM, or other amounts above or below this range.

When the destabilized dispersion of silica is achieved with the addition of at least one acid, the acid concentration in the destabilized dispersion can be from about 200 mM to about 1000 mM, for example, about 340 mM to about 1000 mM, or other amounts above or below this range.

A destabilized silica dispersion may be made using silica particles treated to comprise an appropriate amount of surface functional groups carrying positive charges so that the net charges on the silica surface are reduced sufficiently to decrease the magnitude of zeta potential of the dispersion below 30 mV. The net charge on the silica surface can be positive, instead of negative, as a result of such surface treatment. The positively charged functional group may be introduced to silica surface through chemical attachment or physical adsorption. For example, the silica surface may be treated with N-trimethoxylsilylpropyl-N,N,N-trimethylammonium chloride either before or after preparation of the silica dispersion. It is also possible to adsorb cationic coating agents, such as amine containing molecules and basic amino acids on the silica surface. It is theorized that a net positive charge on silica particle surfaces may enhance coagulation of the latex, which comprises negatively charged rubber particles, by means of heterocoagulation.

With regard to the "second fluid," which contains at least one elastomer latex, this fluid may contain one or more elastomer latices. An elastomer latex can be considered a stable colloidal dispersion of rubber and may contain, for example, from about 10 wt % to about 70 wt % rubber based on the total weight of the latex. The rubber can be dispersed in a fluid, such as water or other aqueous fluid, for example. The aqueous content of this fluid (or water content) can be 40 wt % or higher, such as 50 wt % or higher, or 60 wt % or higher, or 70 wt % or higher, for instance from about 40 wt % to 90 wt % based on the weight of the fluid comprising the at least one elastomer latex. Suitable elastomer latices include both natural and synthetic elastomer latices and latex blends. For example, elastomer latex may be made synthetically by polymerizing a monomer such as styrene that has been emulsified with surfactants. The latex should be appropriate for the wet masterbatch process selected and the intended purpose or application of the final rubber product. It will be within the ability of those skilled in the art to select a suitable elastomer latex or a suitable blend of elastomer latices for use in the methods and apparatus disclosed here, given the benefit of this disclosure.

The elastomer latex can be or include natural rubber, such as an emulsion of natural rubber. Exemplary natural rubber latices include, but are not limited to, field latex, latex concentrate (produced, for example, by evaporation, centrifugation or creaming), skim latex (e.g., the supernatant remaining after production of latex concentrate by centrifugation) and blends of any two or more of these in any proportion. Natural rubber latex typically is treated with ammonia to preserve it, and the pH of treated latex typically ranges from 9 to 11. The ammonia content of the natural rubber latex may be adjusted, and can be reduced, e.g., by bubbling nitrogen across or through the latex. Typically, latex suppliers desludge the latex by addition of diammonium phosphate. They may also stabilize the latex by addition of ammonium laurate. The natural rubber latex may be diluted to a desired dry rubber content (DRC). Thus, the latex that can be used here can be a desludged latex. A secondary preservative, a mixture of tetramethylthiuram disulfide and zinc oxide (TZ solution) may also be included. The latex should be appropriate for the wet masterbatch process selected and the intended purpose or application of the final rubber product. The latex is provided typically in an aqueous carrier liquid (e.g, water). The amount of the aqueous carrier liquid can vary, and for instance be from about 30 wt % to about 90 wt % based on the weight of the fluid. In other words, such natural rubber latices may contain, or may be adjusted to contain, e.g., about 10 wt % to about 70 wt % rubber. Selection of a suitable latex or blend of latices will be well within the ability of those skilled in the art given the benefit of the present disclosure and the knowledge of selection criteria generally well recognized in the industry.

The natural rubber latex may also be chemically modified in some manner. For example, it may be treated to chemically or enzymatically modify or reduce various non-rubber components, or the rubber molecules themselves may be modified with various monomers or other chemical groups such as chlorine. Epoxidized natural rubber latex may be especially beneficial because the epoxidized rubber is believed to interact with the silica surface (Martin, et al., Rubber Chemistry and Technology, May 2015, doi:10.5254/rct15.85940). Exemplary methods of chemically modifying natural rubber latex are described in European Patent Publications Nos. 1489102, 1816144, and 1834980, Japanese Patent Publications Nos. 2006152211, 2006152212, 2006169483, 2006183036, 2006213878, 2006213879, 2007154089, and 2007154095, Great Britain Patent No. GB2113692, U.S. Pat. Nos. 6,841,606 and 7,312,271, and U.S. Patent Publication No. 2005-0148723. Other methods known to those of skill in the art may be employed as well.

Other exemplary elastomers include, but are not limited to, rubbers, polymers (e.g., homopolymers, copolymers and/or terpolymers) of 1,3-butadiene, styrene, isoprene, isobutylene, 2,3-dialkyl-1,3-butadiene, where alkyl may be methyl, ethyl, propyl, etc., acrylonitrile, ethylene, propylene and the like. The elastomer may have a glass transition temperature (Tg), as measured by differential scanning calorimetry (DSC), ranging from about −120° C. to about 0° C. Examples include, but are not limited to, styrene-butadiene rubber (SBR), natural rubber and its derivatives such as chlorinated rubber, polybutadiene, polyisoprene, poly(styrene-co-butadiene) and the oil extended derivatives of any of them. Blends of any of the foregoing may also be used. The latex may be in an aqueous carrier liquid. Particular suitable synthetic rubbers include: copolymers of styrene and butadiene comprising from about 10 percent by weight to about 70 percent by weight of styrene and from about 90 to about 30 percent by weight of butadiene such as a copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine, 2-methyl-5-vinylpyridine, allyl-substituted acrylates, vinyl ketone, methyl isopropenyl ketone, methyl vinyl either, alpha-methylene carboxylic acids and the esters and amides thereof, such as acrylic acid and dialkylacrylic acid amide. Also suitable for use herein are copolymers of ethylene and other high alpha olefins such as propylene, 1-butene, and 1-pentene. Blends of two or more types of elastomer latex, including blends of synthetic and natural rubber latex or with two or more types of synthetic or natural rubber, may be used as well.

The rubber compositions can contain, in addition to the elastomer and filler and coupling agent, various processing aids, oil extenders, antidegradants, antioxidants, and/or other additives.

The amount of silica (in parts per hundred of rubber, or phr) present in the elastomer composite can be from about 15 phr to about 180 phr, about 20 phr to about 150 phr, about 25 phr to about 80 phr, about 35 phr to about 115 phr, about 35 phr to about 100 phr, about 40 phr to about 100 phr, about 40 phr to about 90 phr, about 40 phr to about 80 phr, about 29 phr to about 175 phr, about 40 phr to about 110 phr, about 50 phr to about 175 phr, about 60 phr to about 175 phr, and the like. The silica-reinforced elastomer composite may optionally include a small amount of carbon black for color, conductivity, and/or UV stability and/or for other purposes. Small amounts of carbon black contained in the elastomer composite can range, for instance, from about 0.1 wt % to about 10 wt %, based on the weight of the total particles present in the elastomer composite. Any grade or type of carbon black(s) can be used, such as reinforcing, or semi-reinforcing tire-grade furnace carbon blacks and the like. As an example, if carbon black or other filler is to be added and form part of the elastomer composite, the carbon black or other filler can be added, for instance, using a 3-way mixing block. One example is shown in FIG. 1C. Using such a set-up, the carbon black or other filler can be added simultaneously with the silica slurry in order to provide a blend of reinforcing particles in the elastomer composite. The carbon black can be dispersed in an aqueous slurry prior to use.

In any method of producing an elastomer composite, the method can further include one or more of the following steps, after formation of the solid or semi-solid silica-containing continuous rubber phase:
one or more holding steps or further solidification or coagulation steps to develop further elasticity;
one or more dewatering steps can be used to de-water the composite to obtain a dewatered composite;
one or more extruding steps;
one or more calendaring steps;
one or more milling steps to obtain a milled composite;
one or more granulating steps;
one or more baling steps to obtain a bailed product or mixture;
the baled mixture or product can be broken apart to form a granulated mixture;
one or more mixing or compounding steps to obtain a compounded composite.

As a further example, the following sequence of steps can occur and each step can be repeated any number of times (with the same or different settings), after formation of the solid or semi-solid silica-containing continuous rubber phase:
one or more holding steps or further coagulation steps to develop further elasticity
dewatering the composite (e.g., the elastomer composite exiting the reaction zone) to obtain a dewatered composite;
mixing or compounding the dewatered composite to obtain a compounded mixture;
milling the compounded mixture to obtain a milled mixture (e.g., roll milling);
granulating or mixing the milled mixture;
optionally baling the mixture after the granulating or mixing to obtain a baled mixture;
optionally breaking apart the baled mixture and mixing.

In any embodiment, a coupling agent can be introduced in any of the steps (or in multiple steps or locations) as long as the coupling agent has an opportunity to become dispersed in the elastomer composite. As an example, one or more coupling agents (e.g., silane coupling agents) can be reacted with the silica slurry (e.g., precipitated silica slurry) before the slurry is fed to the wet masterbatch reaction zone. For instance, the process described in U.S. Pat. No. 8,357,733 (incorporated in its entirety by reference herein) can be implemented in the methods of the present invention. Another example is to add one or more coupling agents (e.g., silane coupling agents) to the solid or semi-solid silica-containing continuous rubber phase after coagulation, for instance, prior to and/or during any downstream dewatering or mastication step with the preference of having sufficient heat present to enhance reaction of silica with the coupling agent. Another example can be adding one or more coupling agents by way of a third inlet in a reaction zone such as shown in FIG. 1C. This option can be optimized by pH adjustment such that the pH of the silica slurry is sufficiently high for the coupling agent to react rapidly with the silica (e.g., a salt destabilized silica) while being mixed with elastomer latex.

As just one example, the solid or semi-solid silica-containing continuous rubber phase exiting the reaction zone or area can be transferred by a suitable apparatus (e.g., belt or conveyor), to a dewatering extruder. Suitable dewatering extruders are well known and commercially available from, for example, the French Oil Mill Machinery Co. (Piqua, Ohio, USA). Alternatively or in addition, the solid or semi-solid silica-containing continuous rubber phase may be compressed, for example, between metallic plates, to expel at least a portion of the aqueous fluid phase, e.g., to expel aqueous fluid until the water content of such material is below 40 wt %.

In general, the post processing steps can comprise compressing the elastomer composite to remove from about 1 wt % to about 15 wt % or more, of an aqueous fluid phase, based on the total weight of the elastomer composite. The dewatering extruder may bring the silica elastomer composite from, e.g., approximately about 40% to about 95% water content to approximately about 5% to about 60% water content (for example, from about 5% to about 10% water content, from about 10% to about 20% water content, from about 15% to about 30% water content, or from about 30% to about 50% water content) with all weight percent based on total weight of composite. The dewatering extruder can be used to reduce the water content of the silica elastomer composite to about 35 wt % or other amounts. The optimal water content may vary with the elastomer employed, the amount, and/or type of filler, and the devices employed for mastication of the dewatered product. The elastomer composite may be dewatered to a desired water content, following which the resulting dewatered product can be further masticated while being dried to a desired moisture level (e.g., from about 0.5% to about 10%, for example, from about 0.5% to about 1%, from about 1% to about 3%, about 3% to about 5%, or from about 5% to about 10%, preferably below 1% all weight percent based on total weight of product). The mechanical energy imparted to the material can provide improvement in rubber properties. For example, the dewatered product may be mechanically worked with one or more of a continuous mixer, an internal mixer, a twin screw extruder, a single screw extruder, or a roll mill. This optional mixing step can have the ability to masticate the mixture and/or generate surface area or expose surface which can permit removal of water (at least a portion thereof) that may be present in the mixture. Suitable masticating devices are well known and commercially available, including for example, a Unimix Continuous Mixer and MVX (Mixing, Venting, eXtruding) Machine from Farrel Corporation of Ansonia, Conn., USA, a long continuous mixer from Pomini, Inc., a Pomini Continuous Mixer, twin rotor co-rotating intermeshing extruders, twin rotor counter-rotating non-intermeshing extruders, Banbury mixers, Brabender mixers, intermeshing-type internal mixers, kneading-type internal mixers, continuous compounding extruders, the biaxial milling extruder produced by Kobe Steel, Ltd., and a Kobe Continuous Mixer. Alternative masticating apparatus will be familiar to those of skill in the art and can be used.

As dewatered product is processed in a desired apparatus, the apparatus imparts energy to the material. Without being bound by any particular theory, it is believed that friction generated during mechanical mastication heats the dewatered product. Some of this heat is dissipated by heating and vaporizing the moisture in the dewatered product. A portion of the water may also be removed by squeezing the material in parallel with heating. The temperature should be sufficiently high to rapidly vaporize water to steam that is released to the atmosphere and/or is removed from the apparatus, but not so high as to scorch the rubber. The dewatered product can achieve a temperature from about 130° C. to about 180° C., such as from about 140° C. to about 160° C., especially when the coupling agent is added prior to or during mastication. The coupling agent can include a small amount of sulfur, and the temperature should be maintained at a sufficiently low level to prevent the rubber from cross-linking during mastication.

As an option, additives can be combined with the dewatered product in a mechanical mixer. Specifically, additives such as filler (which may be the same as, or different from, the filler used in the mixer; exemplary fillers include silica, carbon black, and/or zinc oxide), other elastomers, other or additional masterbatch, antioxidants, coupling agents, plasticizers, processing aids (e.g., stearic acid, which can also be used as a curing agent, liquid polymers, oils, waxes, and the like), resins, flame-retardants, extender oils, and/or lubricants, and a mixture of any of them, can be added in a mechanical mixer. Additional elastomers can be combined with the dewatered product to produce elastomer blends. Suitable elastomers include any of the elastomers employed in latex form in the mixing process described above and elastomers such as EPDM that are not available in latex form and may be the same or different than the elastomer in the silica-containing elastomer composite. Exemplary elastomers include, but are not limited to, rubbers, polymers (e.g., homopolymers, copolymers and/or terpolymers) of 1,3-butadiene, styrene, isoprene, isobutylene, 2,3-dialkyl-1,3-butadiene, where alkyl may be methyl, ethyl, propyl, etc., acrylonitrile, ethylene, propylene, and the like. Methods of producing masterbatch blends are disclosed in commonly owned U.S. Pat. Nos. 7,105,595, 6,365,663, and 6,075,084 and PCT Publication WO2014/189826. The antioxidant (an example of a degradation inhibitor) can be an amine type antioxidant, phenol type antioxidant, imidazole type antioxidant, metal salt of carbamate, para-phenylene diamine(s) and/or dihydrotrimethylquinoline(s), polymerized quinine antioxidant, and/or wax and/or other antioxidants used in elastomer formulations. Specific examples include, but are not limited to, N-(1,3-dimethylbutyl)-N'-phenyl-p-phenylenediamine (6-PPD, e.g., ANTIGENE 6C, available from Sumitomo Chemical Co., Ltd. and NOCLAC 6C, available from Ouchi Shinko Chemical Industrial Co., Ltd.), "Ozonon" 6C from Seiko Chemical Co., Ltd., polymerized 1,2-dihydro-2,2,4-trimethyl quinoline (TMQ, e.g., Agerite Resin D, available from R. T. Vanderbilt), 2,6-di-t-butyl-4-methylphenol (available as Vanox PC from Vanderbilt Chemicals LLC), butylhydroxytoluene (BHT), and butylhydroxyanisole (BHA), and the like. Other representative antioxidants may be, for example, diphenyl-p-phenylenediamine and others such as, for example, those disclosed in The Vanderbilt Rubber Handbook (1978), pages 344-346.

Another improvement with the present invention is the option of making a rubber compound that involves utilizing the method of the present invention by producing a silica elastomer composite as detailed herein. Then, the silica elastomer composite can be blended with other components as indicated herein to form a rubber compound. The "other components" can comprise at least one antioxidant and preferably this antioxidant has a lower affinity to silica than the antioxidant N-(1,3-dimethylbutyl)-N'-phenyl-p-phenylenediamine ("6-PPD"). An example of such an antioxidant is polymerized 2,2,4-trimethyl 1-1,2 dihydroquinoline. A general class of such antioxidants are the quinloine types or the monophenol types. Commercial examples include Ageritie Resin D pellets by Vanderbilt or Vanox PC by Vanderbilt. With such an option, namely, the antioxidant(s) having a lower affinity for silica, this can avoid the quick adsorption of the antioxidant onto the silica surface, leaving sufficient antioxidant available to protect the surrounding rubber from oxidation. Also, by having less antioxidant being adsorbed onto the silica surface, the silica has greater reactivity with any coupling agents present, resulting in better coupling of silica to rubber. Therefore, with this type of antioxidant in the process of the present invention, silica silanization and/or bound rubber formation can be enhanced or their inhibition can be reduced or avoided.

In general, if an antioxidant is added in making the rubber compound, the order of addition of the antioxidant(s) with any "other components" is not critical. More than one type of antioxidant can be use and/or one or more antioxidants can be added at one or more stages of the process to make the rubber compound, including any one or more stages prior to rubber formation and/or any of the stages or steps shown in FIG. 2.

The coupling agent can be or include one or more silane coupling agents, one or more zirconate coupling agents, one or more titanate coupling agents, one or more nitro coupling agents, or any combination thereof. The coupling agent can be or include bis(3-triethoxysilylpropyl)tetrasulfane (e.g., Si 69 from Evonik Industries, Struktol SCA98 from Struktol Company), bis(3-triethoxysilylpropyl)disulfane (e.g., Si 75 and Si 266 from Evonik Industries, Struktol SCA985 from Struktol Company), 3-thiocyanatopropyl-triethoxy silane (e.g., Si 264 from Evonik Industries), gamma-mercaptopropyl-trimethoxy silane (e.g., VP Si 163 from Evonik Industries, Struktol SCA989 from Struktol Company), gamma-mercaptopropyl-triethoxy silane (e.g., VP Si 263 from Evonik Industries), zirconium dineoalkanolatodi(3-mercapto) propionato-O, N,N'-bis(2-methyl-2-nitropropyl)-1,6-diaminohexane, S-(3-(triethoxysilyl)propyl) octanethioate (e.g., NXT coupling agent from Momentive, Friendly, W. Va.), and/or coupling agents that are chemically similar or that have the one or more of the same chemical groups. Additional specific examples of coupling agents, by commercial names, include, but are not limited to, VP Si 363 from Evonik Industries. It is to be appreciated that any combination of elastomers, additives, and additional masterbatch may be added to the dewatered product, for instance in a compounder.

As an option, the dewatered product can be masticated using an internal mixer such as a Banbury or Brabender mixer. The dewatered product may first be brought to a moisture content of about 3 wt % to about 40 wt %, for example, about 5 wt % to about 20 wt %, or about 20 wt % to about 30 wt %. The moisture content may be achieved by dewatering to the desired level or by dewatering the dewatered product crumb to an intermediate moisture content as the first step and then further reducing moisture content by heating the resulting dewatered product, or by letting water evaporate from the dewatered product at room temperature, or by other methods familiar to those of skill in the art. The dewatered product may then be masticated in an internal mixer until a desired moisture level or mechanical energy input is achieved. The dewatered product can be masticated until it reaches a predetermined temperature, allowed to cool, and then placed back into the internal mixer one or more times to impart additional energy to the material. Examples of temperatures include from about 140° C. to about 180° C., for example, from about 145° C. to about 160° C., or from about 150° C. to about 155° C. The dewatered product may be sheeted in a roll mill after each mastication in the internal mixer. Alternatively or in addition, dewatered product that has been masticated in a Banbury or Brabender mixer may be further masticated in an open mill.

As an option, the masticated product can be further processed on an open mill. The masticated product can be discharged from the continuous compounder as a length of extrudate and may be cut into smaller lengths prior to entering the open mill. The masticated product may optionally be fed to the open mill via a conveyor. The conveyor may be a conveyor belt, conduit, pipe, or other suitable means for transporting the masticated product from a continuous compounder to an open mill. The open mill can include a pair of rollers that may optionally be heated or cooled to provide enhanced operation of the open mill. Other operating parameters of the open mill can include the gap distance between the rolls, the bank height, i.e., the reservoir of material in the gap between and on top of the rolls, and the speed of each roll. The speed of each roll and the temperature of the fluid used to cool each roll may be controlled independently for each roll. The gap distance may be from about 3 mm to about 10 mm or from about 6 mm to about 8 mm. The roll speed may be about 15 rpm to about 70 rpm, and the rollers may roll towards one another with respect to the inlet side of the mill. The friction ratio, the ratio of the speed of the collection roller, e.g., the roller on which the masticated product collects, to that of the back roller, may be from about 0.9 to about 1.1. The fluid employed to cool the rollers may be from about 35° C. to about 90° C., for example, from about 45° C. to about 60° C., from about 55° C. to about 75° C., or from about 70° C. to about 80° C. In addition to controlling the operation of the open mill to provide a desired level of mastication and desiccation to the masticated product, it is also desirable that the output of the open mill should collect on the collection roller as a smooth sheet. Without being bound by any particular theory, it is thought that cooler roller temperatures facilitate this goal. The open mill may reduce the temperature of the masticated product to approximately about 110° C. to about 140° C. The residence time of the masticated product in the mill can be determined in part by the roller speed, the gap distance and the amount of mastication and drying desired and may be about 10 minutes to about 20 minutes for material that has already been masticated, for example, in a twin-rotor continuous mixer.

One skilled in the art will recognize that different combinations of devices may be employed to provide mastication and desiccation to a solid silica-containing continuous rubber phase produced according to the various embodiments. Depending on which devices are used, it may be desirable to operate them under different conditions than those described above to impart varying amounts of work and desiccation to the material. In addition, it may be desirable to employ more than one particular kind of device, e.g., an open mill or internal mixer, in series or to pass masticated product through a given device more than one time. For example, the masticated product may be passed through an open mill two or three or more times or passed through two or three or more open mills in series. In the latter case, it may be desirable to operate each open mill under different operating conditions, e.g., speed, temperature, different (e.g. higher) energy input, etc. Masticated product can be passed through one, two, or three open mills after being masticated in an internal mixer.

The elastomer composite may be used to produce an elastomer or rubber containing product. As an option, the elastomer composite may be used in or produced for use in various parts of a tire, for example, tires, tire treads, tire sidewalls, wire-skim for tires, and cushion gum for retread tires. Alternatively or in addition, elastomer composite may be used for hoses, seals, gaskets, anti-vibration articles, tracks, track pads for track-propelled equipment such as bulldozers, etc., engine mounts, earthquake stabilizers, mining equipment such as screens, mining equipment linings, conveyor belts, chute liners, slurry pump liners, mud pump components such as impellers, valve seats, valve bodies, piston hubs, piston rods, plungers, impellers for various applications such as mixing slurries and slurry pump impellers, grinding mill liners, cyclones and hydrocyclones, expansion joints, marine equipment such as linings for pumps (e.g., dredge pumps and outboard motor pumps), hoses (e.g., dredging hoses and outboard motor hoses), and other marine equipment, shaft seals for marine, oil, aerospace, and other applications, propeller shafts, linings for piping to convey, e.g., oil sands and/or tar sands, and other applications where abrasion resistance and/or enhanced dynamic properties are desired. The vulcanized elastomer composite may be used in rollers, cams, shafts, pipes, tread bushings for vehicles, or other applications where abrasion resistance and/or enhanced dynamic properties are desired.

Traditional compounding techniques may be used to combine vulcanization agents and other additives known in the art, including the additives discussed above in connection with the dewatered product, with the dried elastomer composite, depending on the desired use.

The present invention further relates to an elastomer composite formed by any one or more methods described herein of the present invention.

Unless otherwise specified, all material proportions described as a percent herein are in weight percent.

The present invention will be further clarified by the following examples which are intended to be only exemplary in nature.

SILICA EXAMPLES

Silica Example 1

The following materials are placed into a stainless steel reactor equipped with a propeller-type agitating system and a double-jacketed heater: (i) 660 liters of water, (ii) 11.8 kg of Na2SO4 (electrolyte), (iii) 323 liters of aqueous sodium silicate having an SiO2/Na2O weight ratio of 3.45:1 and a density at 20° C. of 1,230.

The concentration of SiO2 in the sediment (or vessel bottoms) is then 77 g/l. The mixture is heated to a temperature of 82° C. and agitation is maintained. 395 liters of dilute aqueous sulfuric acid having a density at 20° C. of 1.050 are added until a pH value of 7.5 is attained in the reaction medium (measured at the temperature thereof). The reaction temperature is 82° C. during the first 15 minutes of reaction; it is then adjusted from 82° to 95° C. over 15 minutes, and maintained at 95° C. until the reaction is completed.

A total of 77 liters of aqueous sodium silicate of the type described above and 106 liters of sulfuric acid, also of the type described above, are then together added to the reaction medium. The simultaneous addition of acid and silicate is carried out in such manner that the pH of the reaction medium during their addition is constantly maintained at 7.5+/−0.1. When all of the silicate had been introduced, introduction of the dilute acid is continued for 5 minutes at a flow rate of 310 l/h. The introduction of the additional acid adjusted the pH of the medium to a value of 5.0. After a total reaction time is fixed at 85 minutes, a pulp of precipitated silica is obtained. It is filtered and washed by means of a filter press, such that a silica cake is ultimately recovered, exhibiting an ignition weight loss of 79% (hence, the proportion of dry solids is 21% by weight). The filter cake is fluidized by mechanical action. After this disintegrating operation, a pumpable cake is produced having a pH of 6.3.

Silica Example 2

A total of 10 liters of purified water is introduced into a 25-liter stainless steel reactor. The solution is brought to 80° C. The entire reaction is carried out at this temperature. With stirring (350 rpm, propeller-type stirring), 80 g/l sulfuric acid is introduced until the pH reaches a value of 4.

There are introduced simultaneously into the reactor over 35 minutes a solution of sodium silicate (of weight ratio SiO2/Na$_2$O equal to 3.52) having a concentration of 230 g/l and at a flow rate of 76 g/min and sulfuric acid of a concentration equal to 80 g/l at a flow rate regulated so as to keep the pH of the reaction medium at a value of 4. After 30 minutes, the stirring rate is brought to 450 rpm.

At the end of 35 minutes of simultaneous addition, the introduction of acid is stopped as long as the pH has not reached a value equal to 9. The flow of silicate is then stopped. A maturation of 15 minutes at pH 9 follows. At the end of the maturation, the stirring rate is brought to 350 rpm. The pH is then brought to pH 8 by introduction of sulfuric acid. Another simultaneous addition is effected for 40 minutes with a flow rate of sodium silicate of 76 g/min (same sodium silicate as for the first simultaneous addition) and a flow rate of sulfuric acid of a concentration equal to 80 g/l regulated so as to keep the pH of the reaction medium at a value of 8.

After this simultaneous addition, the reaction medium is brought to a pH of 4 by adding 80 g/l sulfuric acid. The medium is matured for 10 minutes at pH 4. A flocculant FA 10 (polyoxyethylene of a molar mass equal to $5 \times 10^6$ g; BASF-Wyandotte Corporation) 250 ml at 1% is introduced at the 3rd minute of the maturation. The slurry is filtered and washed in a vacuum (dry extract of 16.7%). After dilution (dry extract of 13%), the filter cake obtained is disintegrated mechanically.

Silica Example 3

In sample 3-1, a total of 43.5 m$^3$ of hot water is introduced into a vat and commercial sodium water glass (weight modulus 3.42, density 1.348) is stirred in a quantity to yield a pH of 8.5. While maintaining a precipitation temperature of 88° C. and pH 8.5, 16, 8 m$^3$ of the same water glass and sulfuric acid (96%) are simultaneously added over 150 minutes from inlets at opposite sides of the vat. A solids content of 100 g/l is produced. Further sulfuric acid is then added until a pH of <5 is achieved. The solids are separated in presses and washed.

The same procedure is repeated for sample 3-2, with the exception that a pH value of 9.0 is maintained in the initial precipitation batch and during precipitation. After 135 minutes, a solids content of 98 g/l is achieved in the precipitation suspension.

The same procedure used for sample 3-2 is repeated for sample 3-3, with the difference that the precipitation time is shortened to 76 minutes and the precipitation temperature reduced to 80° C. After this period, a solids content in the precipitation suspension of 100 g/ll is achieved.

Silica Example 4

To prepare a slurry of silica pre-treated with a coupling agent, an aqueous solution of silane is prepared by charging to a vessel 4 grams of isopropanol, 2.36 grams of bis-(3-trimethoxysilylpropyl) disulfide (TMSPD), which is prepared using the procedure of U.S. Pat. No. 5,440,064 and which contains essentially no condensation products (6.0% by weight of the silica to be charged later), and 0.7 grams of acetic acid. The mixture is then stirred vigorously at room temperature while 96 grams of water is slowly added. The mixture is then stirred for a further 15 minutes until the solution clears.

In a separate vessel equipped with a stirrer, 196 grams of silica cake made according to Silica Example 1 (20% solids with the remainder being water) and 331 grams of water are charged. The mixture is then stirred for 15 minutes to ensure the cake is completely dispersed. Then the aqueous silane solution is added and stirred for a further 30 minutes. Using a 25% NaOH solution, the pH of the mixture is increased to 7.5. The mixture is then heated to approximately 70° C. for 4 hours while continuously mixing. The product is filtered and a silanized silica material containing about 20% by wt solids, and about 80% aqueous medium, is recovered.

Silica Example 5

To prepare a silica sol containing approximately 2 wt % of silica, ion exchange resin (Lewatit Monoplus 108; Lanxess Deutschland GmbH, Leverkusen, Germany) is activated in a column by eluting it with $H_2SO_4$ until the pH of the eluent is below 2. Then it is neutralized by passing deionized water through the resin until the ion conductivity of the eluent is 5 µS/cm.

In a 2 L vessel equipped with stirrer and cooling unit, 1 L of wet ion exchange resin and 225 g of deionized water are cooled to 6° C. and stirred vigorously. Then 550 g of a sodium water glass solution with 4.875 wt % $SiO_2$ are prepared by diluting a commercial sodium water glass solution (37/38 alkali silicate from Woellner GmbH, Ludwigshafen, Germany) with deionized water. This solution is added to the vessel via a peristaltic pump with an addition rate of 23 ml/min. Temperature is maintained below 12° C. When sodium water glass addition is completed, the mixture is stirred for 15 min at below 12° C. The liquid phase is decanted from the resin and passed via a Buchner funnel through a filter (Whatmann, 0.7 µm). The sol is collected in a 5 L washing bottle and characterized. A total of 744.5 g of silica sol with a solid content of 2.21 wt % (density@20° C.=1.0116 kg/L, pH=3.2) is obtained. The $SiO_2$ content is adjusted to 1.94 wt % with deionized water and the resulting sol used immediately to coat carbon black.

For the coating step, 25.0 g of fluffy carbon black (N115 ASTM grade; $I_2$ No=147 mg/g; Cabot Corporation, Boston, Mass.) are dispersed in 1250 g of deionized water by shear mixing at 25,000 rpm for 5 min to yield a dispersion containing 2 wt % of carbon black. The resulting dispersion is transferred to a jacketed glass vessel (2 L) equipped with a thermostat and a stirrer. Temperature and pH are monitored. Stirring is started and the slurry is heated to 80° C.

To yield a final $SiO_2$/CB ratio of 0.35 in the batch, 451.9 g of the silica sol (1.94% $SiO_2$, density@20° C.=1.0099 kg/L) are added via a peristaltic pump with an addition rate of 15 g/min. The pH is controlled and the dispersion is stirred for 5 min at 80° C. Then the coated carbon black is separated from the liquid phase by vacuum filtration. The filtrate is characterized by a pH=4.1, density@20° C.: 998.6 kg/L; 0.1 wt % $SiO_2$, and conductivity: 48.5 S/cm.

To remove any residual silica, the solid product is redispersed in deionized water (80° C.) and filtered until the conductivity of the washing water is close to deionized water. A total of 168.8 g of a solid filter cake is obtained, consisting of 19.7% SiO2 and carbon black and about 80% of water. (Silica content is determined by ashing the coated carbon black in a muffle furnace for 5 h at 600° C.) The $SiO_2$/CB ratio in the product is determined to be 0.35 and the product contained 25 wt % silica on a total product weight basis.

The wet filter cakes obtained from Silica Examples 1-5 are adjusted with water to a solids level of 10-25% silica, and re-slurried with a mechanical agitator. Optionally, the resulting silica slurry is milled so as to fluidize the slurry, reduce silica particle agglomeration, control silica particle size distribution, and/or reduce the viscosity of the silica slurry. At this point the silica material can be pumped as a liquid slurry. Any grinding or further mechanical processing of the silica slurry can be carried out by adapting the techniques described below in the Masterbatch Examples to the never-dried silica slurries made according to Silica Examples 1-5, above. Likewise never-dried silica slurries made according to Silica Examples 1-5 may be adjusted to target solids contents, ionic concentration, pH, and degree of destabilization by techniques described below in the Masterbatch Examples. The re-slurried precipitated silica is pumped to the reaction zone of a continuous reactor, such as described herein and in the Figures. The processes described in the Masterbatch Examples below (e.g., Example 4) are used to form the silica elastomer composite comprising never-dried silica particles. Because the silica particles have been engulfed by rubber molecules in the latex before drying, particle compaction and silica-silica bonding may be greatly reduced or rendered insignificant relative to wet masterbatch processes using dry silica production materials. Processes described herein utilizing never-dried silica yield silica elastomer composites with excellent levels of silica dispersion, both at the macro- and micro-dispersion levels. The excellent silica dispersion leads to improved wear, abrasion and other mechanical properties after compounding and vulcanization of the silica elastomer composite.

Masterbatch Examples

In these examples, the "field latex" was field latex (Muhibbah Lateks Sdn Bhd, Malaysia) having a dry rubber content of about 30 wt %. The "latex concentrate" was latex concentrate (high ammonia grade, from Muhibbah Lateks Sdn Bhd, Malaysia, or from Chemionics Corporation, Tallmadge, Ohio) diluted by about 50% to a dry rubber content of about 30 wt % using either pure water or water with 0.6 wt % to 0.7 wt % ammonia. Unless noted otherwise below in these Masterbatch Examples, the "silica" was ZEOSIL® Z1165 MP precipitated silica from Solvay USA Inc., Cranbury, N.J. (formerly Rhodia). However, for each Masterbatch Example below, a never-dried silica slurry prepared by a method of Silica Examples 1-5 as described above may be adjusted to the parameters of, and substituted for, the first fluid of such Masterbatch Example with an equivalent effect.

Thermogravimetric Analysis.

The actual silica loading levels were determined by thermogravimetric analysis (TGA) following the ISO 6231 method.

Water Content of Product.

The test material was cut into mm size pieces and loaded into the moisture balance (e.g., Model MB35 and Model MB45; Ohaus Corporation, Parsippany N.J.) for measurement. The water content was measured at 130° C. for 20 minutes to 30 minutes until the test sample achieved a consistent weight.

Slurry Zeta Potential.

In these examples, the zeta potential of particulate slurries was measured using a ZetaProbe Analyzer™ from Colloidal Dynamics, LLC, Ponte Vedra Beach, Fla. USA. With multi-frequency electroacoustic technology, the ZetaProbe measures zeta potential directly at particle concentrations as high as 60% by volume. The instrument was first calibrated using the KSiW calibration fluid provided by Colloidal Dynamics (2.5 mS/cm). A 40 g sample was then placed into a 30 mL Teflon cup (Part #A80031) with a stir bar, and the cup was placed on a stirring base (Part #A80051) with 250 rpm stirring speed. The measurement was performed using the dip probe 173 in a single-point mode with 5-point run at ambient temperature (approximately 25° C.). The data were analyzed using ZP version 2.14c Polar™ software provided by Colloidal Dynamics. The zeta potential values can be negative or positive depending on polarity of charge on the particles. The "magnitude" of zeta potential refers to the absolute value (e.g., a zeta potential value of −35 mV has a higher magnitude than a zeta potential value of −20 mV). The magnitude of the zeta potential reflects the degree of electrostatic repulsion between similarly charged particles in dispersion. The higher the magnitude of zeta potential, the more stable of particles in dispersion. Zeta potential measurements were carried out on particulate silica slurries prepared as described below.

Dry silica was weighed and combined with deionized water using a 5-gallon bucket and a high shear overhead laboratory mixer with a shrouded agitator (Silverson Model AX3, Silverson Machines, Inc., East Longmeadow, Mass.; operating at 5200-5400 rpm for 30 minutes to 45 minutes). Once the silica was roughly dispersed in water and able to be pumped, the silica slurry was transferred via a peristaltic pump (Masterflex 7592-20 system—drive and controller, 77601-10 pump head using I/P 73 tubing; Cole-Palmer, Vernon Hills, Ill.) into a mixing loop with an inline high shear rotor-stator mixer (Silverson Model 150LB located after the peristaltic pump, operated at 60 Hz) in a run tank (30 gal. convex bottom port vessel) and was ground to further break down silica agglomerates and any remaining silica granules. The slurry in the run tank was then circulated at 2 L/min using the same peristaltic pump through the mixing loop for a time sufficient for turnover of at least 5-7 times of the total slurry volume (>45 minutes) to make sure any silica agglomerates were properly ground and distributed. An overhead mixer (Ika Eurostar power control visc-P7; IKA-Works, Inc., Wilmington, N.C.) with a low shear anchor blade rotating at about 60 rpm was used in the run tank to prevent gelling or sedimentation of silica particles. An acid (formic acid or acetic acid, reagent grade from Sigma Aldrich, St. Louis, Mo.) or salt (calcium nitrate, calcium chloride, calcium acetate or aluminum sulfate, reagent grade from Sigma Aldrich, St. Louis, Mo.) was added to the slurry in the run tank after grinding. The amount of silica in the slurry and the type and concentration of acid or salt are indicated in the specific Examples below.

Exemplary Process A.

Where indicated in the examples below, a method was carried out utilizing Exemplary Process A. In Process A, dry precipitated silica and water (municipal water filtered to remove particulate matter) were metered and combined and then ground in a rotor-stator mill to form silica slurry, and the silica slurry was further ground in a feed tank using an agitator and another rotor-stator mill. The silica slurry was then transferred to a run tank equipped with two stirrers. The silica slurry was recirculated from the run tank through a homogenizer and back into the run tank. A solution of acid (formic acid or acetic acid, industrial grade obtained from Kong Long Huat Chemicals, Malaysia) or salt (calcium nitrate, industrial grade obtained from Mey Chern Chemicals, Malaysia) was then pumped into the run tank. The slurry was maintained in dispersed form through stirring and, optionally, by means of the recirculating loop in the run tank. After a suitable period, the silica slurry was fed to a confined reaction zone (13), such as the one shown in FIG. 1A, by means of the homogenizer. The concentration of silica in the slurry and the concentration of acid or calcium nitrate are indicated in the specific Examples below.

The latex was pumped with a peristaltic pump (at less than about 40 psig pressure) through the second inlet (11) into the reaction zone (13). The latex flow rate was adjusted between about 300-1600 kg latex/hr in order to obtain a desired production rate and silica loading levels in the resulting product. The homogenized slurry containing acid, or salt, or a combination of acid and salt, was pumped under pressure from the homogenizer to a nozzle (0.060"-0.130" inside diameter (ID)) (3a), represented by the first inlet (3) shown in FIG. 1A, such that the slurry was introduced as a high speed jet into the reaction zone. Upon contact with the latex in the reaction zone, the jet of silica slurry flowing at a velocity of 25 m/s to 120 m/s entrained the latex flowing at 1 m/s to 11 m/s. In Examples according to embodiments of the invention, the impact of the silica slurry on the latex caused an intimate mixing of silica particles with the rubber particles of the latex, and the rubber was coagulated, transforming the silica slurry and the latex into a material comprising a solid or semi-solid silica-containing continuous rubber phase containing 40 to 95 wt % water, based on total weight of the material, trapped within the material. Adjustments were made to the silica slurry flow rate (500-1800 kg/hr), or the latex flow rate (300-1800 kg/hr), or both, to modify the silica to rubber ratios (e.g., 15-180 phr silica) in the final product, and to achieve the desired production rate. The production rates (dry material basis) were 200-800 kg/hr. Specific silica contents (by TGA analysis) in the rubber following dewatering and drying of the material are listed in the Examples below.

Process A Dewatering.

Material was discharged from the reaction zone at atmospheric pressure at a flow rate from 200 to 800 kg/hr (dry weight) into a dewatering extruder (The French Oil Machinery Company, Piqua, Ohio). The extruder (8.5 inch I.D.) was equipped with a die plate with various die-hole buttons configurations and operated at a typical rotor speed of 90 to 123 RPM, die plate pressure 400-1300 psig, and power of 80 kW to 125 kW. In the extruder, silica-containing rubber was compressed, and the water squeezed out of the silica-containing rubber was ejected through a slotted barrel of the extruder. Dewatered product typically containing 15-60 wt % water was obtained at the outlet of the extruder.

Process A Drying and Cooling.

The dewatered product was dropped into a continuous compounder (Farrel Continuous Mixer (FCM), Farrel Corporation, Ansonia, Conn.; with #7 and 15 rotors) where it was dried, masticated and mixed with 1-2 phr of antioxidant (e.g. 6PPD from Flexsys, St. Louis, Mo.) and optionally silane coupling agent (e.g. NXT silane, obtained from Momentive Performance Materials, Inc., Waterford, N.Y.; 8 wt % silane on silica weight basis). The temperature of the FCM water jacket was set at 100° C., and the FCM temperature at the output orifice was 140° C. to 180° C. The moisture content of the masticated, dewatered elastomer composite exiting the FCM was around 1 wt % to 5 wt %. The product was further masticated and cooled on an open mill. A rubber sheet of the elastomer composite was directly cut from the open mill, rolled and cooled in air.

Exemplary Process B.

Where indicated in the examples below, an exemplary method was carried out utilizing Exemplary Process B. In Process B, dry silica was weighed and combined with deionized water using a 5-gallon bucket and a high shear overhead laboratory mixer with a shrouded agitator (Silverson Model AX3, Silverson Machines, Inc., East Longmeadow, Mass.; operating at 5200 rpm to 5400 rpm for 30-45 minutes). Once the silica was roughly dispersed in water and able to be pumped, the silica slurry was transferred via a peristaltic pump (Masterflex 7592-20 system—drive and controller, 77601-10 pump head using I/P 73 tubing; Cole-Palmer, Vernon Hills, Ill.) into a mixing loop with an inline high shear rotor-stator mixer (Silverson Model 150LB located after the peristaltic pump, operated at 60 Hz) in a run tank (30 gal convex bottom port vessel) and was ground to further break down silica agglomerates and any remaining granules. The slurry in the run tank was then circulated at 2 L/min through the mixing loop for a time sufficient for turnover of at least 5-7 times of the total slurry volume (>45 minutes) to make sure any silica agglomerates were properly ground and dispersed. An overhead mixer (Ika Eurostar power control visc-P7; IKA-Works, Inc., Wilmington, N.C.) with a low shear anchor blade rotating at about 60 rpm was used in the run tank to prevent gelling or sedimentation of silica particles. An acid (formic acid or acetic acid, reagent grade from Sigma Aldrich, St. Louis, Mo.) or salt (calcium nitrate, calcium chloride, calcium acetate, or aluminum sulfate salt, reagent grade from Sigma Aldrich, St. Louis, Mo.) was added to the slurry in the run tank after grinding. The amount of silica in the slurry and the type and concentration of acid or salt are indicated in Table 4 for the specific Examples below.

The latex was pumped using a peristaltic pump (Masterflex 7592-20 system—drive and controller, 77601-10 pump head using I/P 73 tubing; Cole-Palmer, Vernon Hills, Ill.) through a second inlet (11) and into a reaction zone (13) configured similarly to that shown in FIG. 1B. The latex flow rate was adjusted between about 25 kg/h to about 250 kg/h in order to modify silica to rubber ratios of the elastomer composites.

When the silica was well dispersed in the water, the slurry was pumped from the run tank through a diaphragm metering pump (LEWA-Nikkiso America, Inc., Holliston, Mass.) through a pulsation dampener (to reduce pressure oscillation due to the diaphragm action) into either the reaction zone or the run tank via a recycle loop "T" connector. The direction of the slurry was controlled by two air actuated ball valves, one directing the slurry to the reaction zone and the other directing the slurry to the run tank. When ready to mix the silica slurry with latex, the line feeding the first inlet (3) to the reaction zone was pressurized to 100 psig to 150 psig by closing both valves. The ball valve directing the slurry to the reaction zone was then opened and pressurized silica slurry was fed to a nozzle (0.020' to 0.070" ID) (3a) shown in FIG. 1B, at an initial pressure of 100 psig to 150 psig, such that the slurry was introduced as a high speed jet into the reaction zone. Upon contact with the latex in the reaction zone, the jet of silica slurry flowing at a velocity of 15 m/s to 80 m/s entrained the latex flowing at 0.4 m/s to 5 m/s. In Examples according to embodiments of the invention, the impact of the silica slurry on the latex caused an intimate mixing of silica particles with the rubber particles of the latex, and the rubber was coagulated, transforming the silica slurry and the latex into an elastomer composite comprising the silica particles and 40 wt % to 95 wt % water trapped within a solid or semi-solid silica-containing, continuous rubber phase. Adjustments were made to the silica slurry flow rate (40 kg/hr to 80 kg/hr) or the latex flow rate (25 kg latex/hr to 300 kg latex/hr), or both, to modify silica to rubber ratios (e.g., 15 phr to 180 phr silica) in the resulting product and to achieve the desired continuous production rates (30 kg/hr to 200 kg/hr on dry material basis). Specific silica to rubber ratio (phr) contents following dewatering and drying are listed in the Examples below.

Process B Dewatering.

Material discharged from the reaction zone was recovered and sandwiched between two aluminum plates inside a catch pan. The "sandwich" was then inserted between two platens of a hydraulic press. With 2500 psig pressure exerted on the aluminum plates, water trapped inside the rubber product was squeezed out. If needed, the squeezed material was folded into a smaller piece and the squeezing process was repeated using the hydraulic press until the water content of the rubber product was below 40 wt %.

Process B Drying and Cooling.

The dewatered product was put into a Brabender mixer (300 cc) for drying and mastication to form a masticated, dewatered elastomer composite. Sufficient dewatered material was charged into the mixer to cover the rotors. The initial temperature of the mixer was set at 100° C. and the rotor speed was generally at 60 rpm. The water remaining in the dewatered product was converted to steam and evaporated out of the mixer during the mixing process. As the material in the mixer expanded as result of evaporation, any overflowing material was removed as necessary. Either or both of a silane coupling agent (NXT silane, obtained from Momentive Performance Materials, Inc., Waterford, N.Y.; 8 wt % silane on silica weight basis) and/or antioxidant (6-PPD, N-(1,3-dimethylbutyl)-N'-phenyl-p-phenylenediamine, Flexsys, St. Louis, Mo.) was optionally added to the mixer when the mixer temperature was above 140° C. When the temperature of the mixer reached 160° C., the material inside the mixer was held at 160° C. to 170° C. by varying the rotor speed for 2 minutes before the material was dumped. The masticated, dewatered elastomer composite was then processed on an open mill. The moisture content of the material being taken off of the mill typically was below 2 wt %.

Preparation of Rubber Compounds.

Dried elastomer composite obtained by either Process A or Process B was compounded according to the formulation in Table A and the procedure outlined in Table B. For silica elastomer composites where either silane or antioxidant was added during drying, the final compound composition is as specified in Table A. The amount of silane coupling agent and/or antioxidant added during compounding was adjusted accordingly.

TABLE A

| Ingredient | phr |
|---|---|
| NR in Composite | 100 |
| Silica in Composite | S |
| 6PPD* (antioxidant) | 2.0 |
| Silane (NXT silane**) | 0.08 × (phr silica) |
| ZnO | 4 |
| Stearic acid | 2 |
| DPG*** | 1.5 |
| Cure Rite ® BBTS**** | 1.5 |
| Sulfur | 1.5 |

*N-(1,3-dimethylbutyl)-N'-phenyl-p-phenylenediamine (Flexsys, St. Louis, MO)
**main active component: S-(3-(triethoxysilyl)propyl)octanethioate (Momentive, Friendly, WV)
***DiphenylGuanidine (Akrochem, Akron, OH)
****N-tert-Butylbenzothiazole-2-sulphenamide (Emerald Performance Materials, Cuyahoga Falls, OH)
NR = natural rubber
S = as stated

TABLE B

| | Time (min) | Operation |
|---|---|---|
| Stage 1 | | Brabender mixer (300 cc), 65% fill factor, 60 rpm, 100° C. |
| | 0 | Add rubber-silica composite |
| | 1 | Add silane coupling agent, if needed Hold for 2 minutes beginning at 150° C. |
| | 2 | Sweep and add 6PPD and mix for 1 additional minute at 150° C. |

TABLE B-continued

| Time (min) | Operation |
|---|---|
| | 3 Sweep |
| | Dump, 160° C. |
| | Pass through roll mill 6x |
| Stage 2 | Brabender mixer (300 cc), 63% fill factor, 60 rpm, 100° C. |
| 0 | Add stage 1 compound |
| 1 | Add zinc oxide and stearic acid |
| 2 | Sweep |
| 4 | Dump, 150° C. |
| | Pass through roll mill 6x |
| Stage 3 | Brabender mixer (300 cc), 63% fill factor, 60 rpm, 100° C. |
| 0 | Add stage 2 compound, sulfur and accelerators |
| 0.5 | Sweep |
| 1 | Dump |
| | Roll mill for one minute with adequate band. Remove and perform 6 end rolls. Sheet off to required thickness. |

Vulcanization was carried out in a heated press set at 150° C. for a time determined by a conventional rubber rheometer (i.e., T90+10% of T90, where T90 is the time to achieve 90% vulcanization).

Properties of Rubber/Silica Compounds.

The tensile properties of vulcanized samples (T300 and T100, elongation at break, tensile strength) were measured according to ASTM standard D-412. Tan delta 600 was determined using a dynamic strain sweep in torsion between 0.01% and 60% at 10 Hz and 60° C. Tan $\delta_{max}$ was taken as the maximum value of tan δ 60 within this range of strains.

Example 1

A silica slurry with 27.8 wt % Zeosil® 1165 silica was prepared as described above in connection with the Slurry Zeta Potential test method. The slurry was then diluted using either deionized water or a supernatant obtained from ultracentrifugation of the 27.8 wt % slurry to make a series of silica slurries at various silica concentrations. The zeta potential of various silica slurries was measured to show the relationship between the concentration of the silica in the slurry and the zeta potential of the slurry. The zeta potential of the silica slurry, as shown in Table 1, appears to depend upon the silica concentration when the silica slurry is made using deionized water. However, as shown in Table 2, when slurry was diluted using the supernatant obtained from ultracentrifugation of the 27.8 wt % slurry, the zeta potential stays roughly the same at different silica concentrations.

TABLE 1

Zeta potential of slurry of silica made using deionized water.

| Silica Concentration in slurry (w/w) | 6% | 10% | 15% | 20% | 22% | 25% |
|---|---|---|---|---|---|---|
| Zeta Potential (mV) | −46.4 | −42.7 | −39.6 | −36.2 | −34.7 | −32.3 |
| pH | 5.19 | 5.04 | 4.92 | 4.86 | 4.83 | 4.77 |

TABLE 2

Zeta potential of silica slurry made from dilution of a 27.8 wt % silica slurry using the supernatant of the 27.8 wt % silica slurry.

| | Silica Concentration in slurry (w/w) | |
|---|---|---|
| | 6% | 22% |
| Zeta Potential (mV) | −31.5 | −31.4 |
| pH | 4.86 | 4.79 |

This result demonstrates that an increase of magnitude of zeta potential when such silica slurries are diluted with deionized water is mostly due to reduction of ionic strength of the slurry. The ions in the silica slurry are believed to be from residual salts present in the silica from the silica particle manufacturing process. The high magnitude of zeta potential of the silica slurries (all over 30 mV) indicated that the silica has high electrostatic stability in the slurry.

Example 2

The effect of adding salt or acid at various concentrations to silica slurries on the zeta potential of these slurries is set forth in Table 3. Slurries were prepared in deionized water by the Slurry Zeta Potential test method described above. Data summarized in Table 3 illustrate the dependence of zeta potential of silica slurries and destabilized silica slurries on the silica concentration, salt concentration, and acid concentration. Adding salt or acid to silica slurry reduces the magnitude of zeta potential, thus the stability of the silica slurry. As shown in Table 3, the zeta potential depends mostly on the concentration of salt or acid in the slurry or destabilized slurry, and not on silica concentration.

TABLE 3

Zeta potential of slurry and destabilized of silica at various slurry concentrations, salt concentrations, and acid concentrations.

| Silica Concentration in Slurry (wt %) | [CaCl$_2$] (mM) | [acetic acid] (mM) | [formic acid] (mM) | Zeta (mV) | pH |
|---|---|---|---|---|---|
| 22.0 | 0 | 0 | 0 | −34.4 | 4.80 |
| 6.0 | 0 | 0 | 0 | −45.0 | ND |
| 22.0 | 10.6 | 0 | 0 | −24.2 | 4.49 |
| 22.0 | 29.7 | 0 | 0 | −17.0 | 4.27 |
| 22.0 | 51.1 | 0 | 0 | −14.6 | 4.17 |
| 22.0 | 105 | 0 | 0 | −9.2 | ND |
| 22.0 | 155 | 0 | 0 | −6.4 | ND |
| 6.0 | 4.6 | 0 | 0 | −29.9 | ND |
| 6.0 | 10.4 | 0 | 0 | −23.4 | ND |
| 6.0 | 27.6 | 0 | 0 | −18.5 | ND |
| 6.0 | 46.4 | 0 | 0 | −15.4 | ND |
| 6.0 | 140 | 0 | 0 | −7.7 | ND |
| 22.0 | 0 | 98 | 0 | −23.6 | 3.72 |
| 22.0 | 0 | 192 | 0 | −21.4 | 3.65 |
| 22.0 | 0 | 564 | 0 | −17.1 | 3.26 |
| 22.0 | 0 | 1857 | 0 | −12.7 | ND |
| 6.0 | 0 | 27 | 0 | −33.6 | 3.84 |
| 6.0 | 0 | 45 | 0 | −29.9 | 3.68 |
| 6.0 | 0 | 174 | 0 | −22.1 | 3.38 |
| 6.0 | 0 | 431 | 0 | −18.9 | 3.61 |
| 22.0 | 0 | 0 | 118 | −15.3 | 3.17 |
| 22.0 | 0 | 0 | 197 | −14.2 | 2.96 |
| 22.0 | 0 | 0 | 731 | −10.7 | 2.46 |
| 22.0 | 0 | 0 | 1963 | −6.5 | 2.04 |
| 6.0 | 0 | 0 | 36 | −17.7 | 3.07 |
| 6.0 | 0 | 0 | 42 | −17.4 | 3.04 |
| 6.0 | 0 | 0 | 168 | −14.6 | 2.62 |
| 6.0 | 0 | 0 | 456 | −11.4 | 2.29 |
| 22.0 | 10.7 | 0 | 130 | −12.9 | 3.04 |
| 22.0 | 26.6 | 0 | 248 | −9.0 | 2.78 |

TABLE 3-continued

Zeta potential of slurry and destabilized of silica at various
slurry concentrations, salt concentrations, and acid concentrations.

| Silica Concentration in Slurry (wt %) | [CaCl$_2$] (mM) | [acetic acid] (mM) | [formic acid] (mM) | Zeta (mV) | pH |
|---|---|---|---|---|---|
| 22.0 | 101 | 0 | 978 | −3.1 | 2.10 |
| 6.0 | 4.7 | 0 | 36 | −15.9 | 3.12 |
| 6.0 | 46.4 | 0 | 224 | −10.1 | 2.41 |

ND = not determined.

Results shown in Table 3 illustrate the dependence of zeta potential of silica slurries and destabilized silica slurries on acetic acid concentration and silica concentration. The data show that the zeta potential values are more dependent on the acid concentration than the silica concentration. A similar relationship between zeta potential to acid concentration and silica concentration is observed for formic acid. At a given concentration, formic acid reduces zeta potential magnitude more than acetic acid. As shown in Table 3, a combination of formic acid and calcium chloride was effective in reducing the zeta potential magnitude. The results in Table 3 show that the stability of silica particles in slurry can be reduced effectively through addition of destabilization agents, such as acid or salt or a combination of acid and salt. Similar results were seen for calcium nitrate and calcium acetate.

Example 3

In this example, the importance of destabilizing the dispersion of silica particles prior to contacting the silica dispersion with elastomer latex was established. Specifically, four experiments were run using the mixing apparatus of FIG. 1C, equipped with three inlets (3, 11, 14) for introducing up to three fluids into a confined reaction zone (13), such that one fluid impacted the other fluids at a 90 degree angle as a high speed jet at a velocity of 15 m/s to 80 m/s (See FIG. 1C). In three of the four experiments, the silica was ground as described above in Process B and acetic acid was optionally added as described in Examples 3-A to 3-D, below. The slurry or destabilized slurry was then pressurized to 100 psig to 150 psig and fed into the confined reaction zone through the inlet (3) at a volumetric flow rate of 60 liter per hour (L/hr) such that the slurry or destabilized slurry was introduced as a high speed jet at 80 m/s into the reaction zone. At the same time, natural rubber latex concentrate (60CX12021 latex, 31 wt % dry rubber content, from Chemionics Corporation, Tallmadge, Ohio, diluted with deionized water) was introduced into the second inlet (11) through a peristaltic pump at a volumetric flow rate of 106 L/hr and velocity of 1.8 m/s. These rates were selected and flows were adjusted to yield an elastomer composite product comprising 50 phr (parts per hundred weight dry rubber) silica. The silica slurry or destabilized silica slurry and latex were mixed by combining the low velocity latex flow and the high velocity jet of silica slurry or destabilized slurry through entraining the latex flow in the jet of silica slurry or destabilized silica slurry at the point of impact. The production rate (on a dry material basis) was set at 50 kg/hr. Specific actual silica to rubber ratios in rubber composites produced by the process are listed in the Examples below. TGA was performed following drying according to the Process B method.

Example 3-A

First Fluid: A destabilized aqueous dispersion of 25 wt % of silica with 6.2 wt % (or 1.18 M) acetic acid was prepared as described in Process B described above. The zeta potential of the destabilized slurry was −14 mV, indicating that the slurry was significantly destabilized by the acid. The destabilized silica slurry was pumped continuously under pressure into the first inlet (3).

Second Fluid: Elastomer latex was supplied to the reaction zone through the second inlet (11).

The first fluid impacted the second fluid in the reaction zone.

Results: A liquid to solid phase inversion occurred in the reaction zone when the destabilized silica slurry and latex were intimately mixed by entraining the low velocity latex flow into the high velocity jet of destabilized silica slurry. During the entrainment process, the silica was intimately distributed into the latex and the mixture coagulated into a solid phase which contained 70 wt % to 85 wt % of water. As a result, a flow of a solid silica-containing, continuous rubber phase in a worm or rope-like shape was obtained at the outlet of the reaction zone (13). The composite was elastic and could be stretched to 130% of the original length without breaking. TGA analysis on the dried product showed the elastomer composite contained 58 phr of silica.

Example 3-B

First Fluid: A destabilized aqueous dispersion of 25 wt % of silica with 6.2 wt % acetic acid was prepared according to Process B described above. The zeta potential of the slurry was −14 mV, indicating the slurry was significantly destabilized by the acid. The destabilized silica slurry was pumped continuously under pressure into the first inlet (3).

Second Fluid: Elastomer latex was supplied to the reaction zone through the second inlet (11).

Third Fluid: Deionized water was also injected into the reaction zone through third inlet (14) at a volumetric flow rate of 60 L/hr and a velocity of 1.0 m/s.

The three fluids met and impacted each other in the reaction zone.

Results: A liquid to solid phase inversion occurred in the reaction zone and a solid or semi-solid silica containing continuous rubber phase in a rope or worm-like shape was obtained from the outlet of the reaction zone. A significant amount of cloudy liquid containing silica and/or latex flowed out of the outlet (7) with the solid or semi-solid silica-containing continuous rubber phase. The silica-containing continuous rubber phase contained about 70 wt % to about 75 wt % water based on the weight of the composite. TGA analysis on the dried product showed the elastomer composite contained 44 phr of silica. Thus, the addition of water through the third inlet had a negative impact on the process, yielding a product with lower silica content (44 phr in contrast to 58 phr in Example 3-A) and significant waste product.

Example 3-C

First Fluid: A 10 wt % acetic acid aqueous solution without silica was prepared. A continuous feed of the acid fluid was pumped using a peristaltic pump at a volumetric flow rate of 60 L/hr through the third inlet (14) into the reaction zone at a velocity of 1.0 m/s at the time of entry into the reaction zone.

Second Fluid: Elastomer latex was supplied to the reaction zone through the second inlet (11) by a peristaltic pump at a velocity of 1.8 m/s and a volumetric flow rate of 106 L/hr.

The two fluids met and impacted each other in the reaction zone.

Results: A solid worm-like, sticky rubber phase was formed. TGA analysis on the dried product showed the solid rubber phase contained no silica.

Example 3-D

First Fluid: An aqueous dispersion of 25 wt % of silica without acetic acid was prepared according to Process B described above. The silica slurry was pumped under pressure continuously into the first inlet (3) at a volumetric flow rate of 60 L/hr and at a velocity of 80 m/s at the point of entry into the reaction zone. The zeta potential of the slurry was −32 mV, indicating that silica was stably dispersed in the slurry. Thus, in this Example 3-D, the silica slurry was not destabilized by addition of acid to the slurry prior to impacting the latex fluid.

Second Fluid: Elastomer latex was supplied to the reaction zone through the second inlet (11) by a peristaltic pump at a velocity of 1.8 m/s and a volumetric flow rate of 106 L/hr.

Third fluid: After an initial period of continuous flow of the first and second fluids, a 10 wt % acetic acid aqueous solution was injected through the third inlet (14) into the reaction zone at a volumetric flow rate that increased from 0 L/hr to 60 L/hr and a velocity that increased from 0 m/s to 1.0 m/s. All three fluids impacted each other and mixed in the reaction zone.

Results: Initially, prior to the injection of acid, no silica-containing continuous rubber phase formed and only cloudy liquid came out of the reaction zone outlet (7). Upon the injection of acid into the reaction zone (13), a worm-like, semi-solid silica-containing continuous rubber phase started to form as the flow of acetic acid through the third inlet was increased from 0 L/hr to 60 L/hr. The materials flowing from the outlet still contained a significant amount of cloudy liquid, indicating a significant amount of waste. TGA analysis of the dried product showed that the silica-containing continuous rubber phase formed in this experimental run only contained 25 phr silica. Based on the production conditions selected and the amount of silica used, if the silica had been substantially incorporated into the silica-containing rubber phase as in Example 3-A, the silica would have yielded a silica-containing rubber phase comprising in excess of 50 phr silica.

These experiments show that the silica slurry must be destabilized prior to initial impact with the elastomer latex in order to achieve the desired silica-containing, continuous rubber phase. Example 3-A achieved what was considered efficient capture of the silica within the solid silica-containing, continuous rubber phase, whereas Example 3-D illustrates a comparative process utilizing an initially stable silica slurry and demonstrating less than half of the efficiency of Example 3-A utilizing an initially destabilized silica slurry. The observation of a cloudy liquid exiting the reaction zone exit point indicates insufficient mixing of the silica with the latex and a lower proportion of silica captured within the continuous rubber phase. It is theorized that in comparative processes 3B and 3D, there was insufficient destabilization of fluids during mixing. The results further show that poor capture of silica occurs when additional fluid is added while the first fluid and second fluid are being mixed together, and such process conditions generate unwanted amounts of waste.

Example 4

In these examples, the process according to various embodiments of the invention was run in the apparatus shown in either FIG. 1A or 1B under various conditions as described in Table 4, utilizing either Process A or Process B described above. Operating conditions were selected to yield a solid or semi-solid silica-containing, continuous rubber phase with the silica to rubber ratios set forth in Table 4.

TABLE 4

| Example | Process A/B | Silica[a] concentration in Slurry (wt %) | Latex Type | Rubber Content in Latex (DRC) (wt %) | Latex wt % $NH_3$ (wt %) | Salt Type | Salt concentration in Slurry (wt %) | Zeta Potential (Est.)[b] (mV) |
|---|---|---|---|---|---|---|---|---|
| 4-1 | A | 20 | Conc. | 31.9 | 0.53 | $Ca(NO_3)_2$ | 1.0 | −12.2 |
| 4-2 | B | 25 | Conc. | 31 | 0.27 | $Ca(NO_3)_2$ | 0.75 | −13.9 |
| 4-3 | B | 25 | Field | 33 | 0.60 | N/A | 0.00 | −10.5 |
| 4-4 | A | 18.5 | Conc. | 31 | 0.70 | $Ca(NO_3)_2$ | 0.75 | −14.1 |
| 4-5 | A | 18.5 | Conc. | 30.6 | 0.70 | $Ca(NO_3)_2$ | 0.39 | −18.4 |
| 4-6 | B | 20 | Conc. | 31 | 0.27 | $Ca(NO_3)_2$ | 1 | −1.8 |
| 4-7 | A | 20.0 | Conc. | 31.9 | 0.53 | $Ca(NO_3)_2$ | 1 | −12.2 |
| 4-8 | A | 10.0 | Conc. | 31.9 | 0.53 | $Ca(NO_3)_2$ | 0.5 | −17.1 |
| 4-9 | A | 10.0 | Conc. | 31.9 | 0.53 | $Ca(NO_3)_2$ | 0.5 | −17.1 |
| 4-10 | A | 20.0 | Field | 32.7 | 0.35 | $Ca(NO_3)_2$ | 1 | −12.2 |
| 4-11 | A | 20.0 | Field | 32.7 | 0.35 | $Ca(NO_3)_2$ | 1 | −12.2 |
| 4-12 | A | 20.0 | Field | 32.7 | 0.35 | $Ca(NO_3)_2$ | 1.3 | −10.6 |
| 4-13 | A | 10.0 | Field | 32.7 | 0.35 | $Ca(NO_3)_2$ | 0.65 | −15.4 |
| 4-14 | A | 10.0 | Field | 32.7 | 0.35 | $Ca(NO_3)_2$ | 0.65 | −15.4 |
| 4-15 | A | 20.0 | Conc. | 31.9 | 0.53 | N/A | 0 | −15.1 |
| 4-16 | A | 10.0 | Conc. | 31.9 | 0.53 | $Ca(NO_3)_2$ | 0.55 | −6.6 |
| 4-17 | A | 20.0 | Field | 32.7 | 0.33 | N/A | 0 | −17.6 |
| 4-18 | A | 20.0 | Field | 32.7 | 0.33 | N/A | 0 | −17.6 |
| 4-19 | A | 20.0 | Field | 32.7 | 0.33 | $Ca(NO_3)_2$ | 1 | −6.1 |
| 4-20 | A | 20.0 | Field | 32.7 | 0.33 | $Ca(NO_3)_2$ | 1 | −6.1 |
| 4-21 | A | 20.0 | Field | 32.7 | 0.33 | $Ca(NO_3)_2$ | 1 | −6.1 |
| 4-22 | A | 16.0 | Conc. | 31.9 | 0.53 | $Ca(NO_3)_2$ | 1 | −1.8 |
| 4-23 | B | 25 | Conc. | 31 | 0.27 | $CaCl_2$ | 0.60 | −12.8 |
| 4-24 | B | 25 | Conc. | 31 | 0.27 | N/A | 0 | −10.6 |
| 4-25 | B | 25 | Conc. | 31 | 0.27 | N/A | 0 | −10.4 |
| 4-26 | A | 19.6 | Field | 32.8 | 0.66 | $Ca(NO_3)_2$ | 0.90 | −12.9 |

TABLE 4-continued

| Example | | | | | | | | |
|---|---|---|---|---|---|---|---|---|
| 4-27 | A | 19.6 | Field | 32.8 | 0.66 | Ca(NO$_3$)$_2$ | 0.90 | −12.9 |
| 4-28 | B | 25 | Conc. | 30.5 | 0.27 | Ca(NO$_3$)$_2$ | 0.75 | −13.9 |
| 4-29 | B | 25 | Field | 33.0 | 0.60 | N/A | 0.00 | −9.8 |
| 4-30 | B | 25 | Conc. | 31.0 | 0.27 | CaCl$_2$ | 1.50 | −6.9 |
| 4-31 | B | 25 | Field | 33.0 | 0.60 | N/A | 0.00 | −7.7 |
| 4-32 | B | 25 | Conc. | 31 | 0.27 | N/A | 0.00 | −10.6 |
| 4-33 | B | 25 | Conc. | 31 | 0.27 | N/A | 0.00 | −10.4 |
| 4-34 | B | 25 | Conc. | 31.0 | 0.27 | CaCl$_2$ | 1.00 | −9.5 |
| 4-35 | A | 18.5 | Conc. | 30.6 | 0.70 | Ca(NO$_3$)$_2$ | 0.22 | −22.0 |
| 4-36 | B | 25 | Conc. | 31 | 0.60 | N/A | 0.00 | −13.7 |
| 4-37 | B | 25 | Conc. | 31.0 | 0.27 | Ca(NO$_3$)$_2$ | 0.52 | −12.8 |
| 4-38 | A | 15.0 | Field | 32.8 | 0.66 | N/A | 0.00 | −11.3 |
| 4-39 | A | 16.5 | Conc. | 30.6 | 0.68 | N/A | 0.00 | −16.5 |
| 4-40 | B | 25 | Conc. | 30.9 | 0.30 | Al$_2$(SO$_4$)$_3$ | 1.04 | −5.0 |
| 4-41 | B | 15 | Conc. | 30.5 | 0.27 | N/A | 0.00 | −20.0 |
| 4-42 | B | 25 | Conc. | 30.5 | 0.27 | Ca(NO$_3$)$_2$ | 0.59 | −3.0 |
| 4-43 | B | 25 | Conc. | 31 | 0.27 | Ca(NO$_3$)$_2$ | 1.00 | −12.1 |

| Example | Acid Type | Acid wt % in Slurry (wt %) | Acid/ NH$_3$ molar ratio | Inlet Nozzle Velocity[c] (m/s) | Actual Silica loading (phr) | Slurry Flow Rate[d] (L/hr) | Latex Flow Rate[d] (L/hr) | Slurry-to-Latex Flow Ratio (v/v) |
|---|---|---|---|---|---|---|---|---|
| 4-1 | N/A | 0 | 0.00 | 49 | 38.4 | 540 | 703 | 0.77 |
| 4-2 | N/A | 0 | 0.00 | 75 | 86.3 | 60 | 59 | 1.01 |
| 4-3 | Formic | 2.5 | 1.45 | 11 | 69 | 60 | 76 | 0.79 |
| 4-4 | N/A | 0 | 0 | 50 | 26 | 788 | 1541 | 0.51 |
| 4-5 | N/A | 0 | 0 | 47 | 45.6 | 827 | 1112 | 0.74 |
| 4-6 | N/A | 0 | 0.00 | 76 | 49.2 | 60 | 56 | 0.94 |
| 4-7 | N/A | 0 | 0.00 | 75 | 54.8 | 828 | 593 | 1.40 |
| 4-8 | N/A | 0 | 0.00 | 78 | 29.5 | 950 | 805 | 1.18 |
| 4-9 | N/A | 0 | 0.00 | 78 | 63.6 | 950 | 379 | 2.51 |
| 4-10 | N/A | 0 | 0.00 | 76 | 45.4 | 738 | 794 | 0.93 |
| 4-11 | N/A | 0 | 0.00 | 76 | 76.9 | 738 | 491 | 1.50 |
| 4-12 | N/A | 0 | 0.00 | 76 | 38.2 | 738 | 938 | 0.79 |
| 4-13 | N/A | 0 | 0.00 | 78 | 52 | 950 | 484 | 1.96 |
| 4-14 | N/A | 0 | 0.00 | 78 | 77.8 | 950 | 300 | 3.17 |
| 4-15 | Acetic | 4.70 | 4.01 | 75 | 25.4 | 828 | 593 | 1.40 |
| 4-16 | Acetic | 2.35 | 3.21 | 78 | 18.1 | 950 | 403 | 2.36 |
| 4-17 | Acetic | 2.80 | 3.14 | 75 | 54.8 | 945 | 826 | 1.14 |
| 4-18 | Acetic | 2.80 | 3.93 | 75 | 67.2 | 945 | 660 | 1.43 |
| 4-19 | Acetic | 2.8 | 1.77 | 76 | 54.9 | 963 | 841 | 1.14 |
| 4-20 | Acetic | 2.8 | 2.36 | 76 | 43.3 | 630 | 734 | 0.86 |
| 4-21 | Acetic | 2.8 | 1.77 | 76 | 34.0 | 630 | 978 | 0.64 |
| 4-22 | N/A | 0 | 0.00 | 117 | 46.6 | 966 | 773 | 1.25 |
| 4-23 | N/A | 0 | 0.00 | 75 | 50.4 | 60 | 68 | 0.88 |
| 4-24 | Formic | 2.5 | 2.93 | 6475 | 60 | 5160 | 81 | 0.74 |
| 4-25 | Formic | 2.6 | 2.34 | 75 | 47 | 60 | 103 | 0.58 |
| 4-26 | N/A | 0 | 0.00 | 103 | 110 | 1639 | 827 | 1.98 |
| 4-27 | N/A | 0 | 0.00 | 119 | 175 | 1902 | 648 | 2.94 |
| 4-28 | N/A | 0 | 0.00 | 75 | 86.3 | 60 | 59 | 1.01 |
| 4-29 | Formic | 3.2 | 1.45 | 21 | 97 | 60 | 97 | 0.62 |
| 4-30 | N/A | 0 | 0 | 19 | 138 | 60 | 43 | 1.38 |
| 4-31 | Formic | 7.1 | 1.45 | 29 | 27 | 60 | 214 | 0.28 |
| 4-32 | Formic | 2.5 | 4.19 | 75 | ND | 60 | 57 | 1.06 |
| 4-33 | Formic | 2.6 | 4.26 | 75 | ND | 60 | 57 | 1.06 |
| 4-34 | N/A | 0 | 0.00 | 19 | 122 | 60 | 37 | 1.63 |
| 4-35 | N/A | 0 | 0.00 | 87 | ND | 1090 | 932 | 1.17 |
| 4-36 | acetic | 6.2 | 1.82 | 64 | 58 | 60 | 114 | 0.53 |
| 4-37 | formic | 0.9 | 1.47 | 29 | ND | 60 | 57 | 1.06 |
| 4-38 | formic | 2.0 | 1.59 | 41 | 44 | 800 | 626 | 1.28 |
| 4-39 | acetic | 3.6 | 1.81 | 64 | 40.4 | 800 | 743 | 1.08 |
| 4-40 | N/A | 0 | 0.00 | 29 | ND | 60 | 88 | 0.68 |
| 4-41 | acetic | 1.8 | 4.11 | 77 | 29 | 60 | 30 | 2.02 |
| 4-42 | N/A | 0 | 0 | 75 | 70.9 | 60 | 58 | 1.04 |
| 4-43 | N/A | 0 | 0 | 75 | ND | 60 | 142 | 0.42 |

ND = not determined, N/A = not applicable.

[a]Examples 4-6 and 4-22 used Agilon 454 silica (precipitated silica treated with silane coupling agents, obtained from PPG Industries Inc.). Examples 4-24 and 4-32 used Zeosil ® 175GR silica (conventional precipitated silica, obtained from Solvay S.A.). Examples 4-25 and 4-33 used Zeosil ® Premium 200MP silica (HDS with high surface area of 200 m$^2$/g, obtained from Solvay S.A.). Example 4-41 used Hi-Sil ® 243LD silica (obtained from PPG Industries Inc, and Example 4-42 used Agilon 400 silica (obtained from PPG Industries Inc). All other examples used ZEOSILO ® Z1165 MP precipitated silica. Example 4-38 included 1.5 wt % (on a total slurry weight basis) N134 carbon black (Cabot Corporation) in the silica slurry.
[b]Zeta potential values were estimated by interpolation of experimentally determined curves of zeta potential dependence on concentration of the salt or the acid of the slurries of the same grade of silica.
[c]The inlet nozzle velocity is the velocity of the silica slurry as it passes through a nozzle (3a) at first inlet (3) to the reaction zone (13) prior to contacting the latex.
[d]Slurry and Latex Flow Rates are the volumetric flow rates in L/hour of the silica slurry and the latex fluid, respectively, as they are delivered to the reaction zone.

In all the examples except Examples 4-13 and 4-14, the selected operating conditions yielded a solid silica-containing, continuous rubber phase in a roughly cylindrical form. The product contained a major amount of water, was elastic and compressible, and expelled water and retained solids content when manually compressed. The solid material could be stretched, for example, the material of example 4-17 could be stretched or elongated to 130-150% of its original length, without breaking. Silica particles were observed to be uniformly distributed throughout a continuous rubber phase and this product was substantially devoid of free silica particles and larger silica grains, both on exterior and interior surfaces. In some of the examples (4-13 and 4-14), the selected operating conditions yielded a semi-solid product with a paste-like consistency, comprising a semi-solid silica-containing, continuous rubber phase. Silica particles were observed, on visual examination, to be entrapped within, and uniformly distributed throughout, the rubber phase. The semi-solid material expelled water and retained solids content upon further processing in one or more subsequent operations selected to develop the paste-like material into a solid silica-containing continuous rubber phase. For the solid or semi-solid silica-containing, continuous rubber phase to form, not only did the silica need to be destabilized (e.g., by prior treatment with acids and/or salts), but the volumetric flow rates of destabilized silica slurry relative to the latex had to be adjusted not only for achieving a desired silica to rubber ratio (phr) in the elastomer composite, but also for balancing the degree of slurry destabilization to the rate of slurry and latex mixing and the rate of coagulation of latex rubber particles. By means of such adjustments, as the silica slurry entrained the latex, intimately distributing silica particles into the rubber, the rubber in the latex became a solid or semi-solid continuous phase, all within a fraction of a second after combining the fluids in the confined volume of the reaction zone. Thus, the process formed unique silica elastomer composites by means of a continuous fluid impact step done with sufficient velocity, selected fluid solids concentrations and volumes, and adjusted fluid flow rates to uniformly and intimately distribute the fine particulate silica within the latex and, in parallel, as such distribution occurs, to cause a liquid to solid phase inversion of the rubber.

Comparative Example 5

In these comparative examples, the same basic steps and apparatus as described in Example 4 were used, but the combination of process conditions selected for each of the comparative examples in Table 5 failed to create a solid or semi-solid continuous rubber phase, and a silica elastomer composite could not be produced. Table 5 below sets forth the concentration of silica in the slurry and the concentration of acetic acid or calcium nitrate, if any, and other details of these examples.

TABLE 5

| Comparative Example | Process A/B | Silica concentration in Slurry (wt %) | Latex Type | Rubber content of Latex (DRC) (wt %) | Latex wt % $NH_3$ (wt %) | Salt Type | Salt concentration in Slurry (wt %) | Acetic Acid concentration in Slurry (wt %) | Acid/ $NH_3$ molar ratio |
|---|---|---|---|---|---|---|---|---|---|
| 5-1 | A | 18.5 | Conc. | 30.6 | 0.70 | $Ca(NO_3)_2$ | 0.22 | N/A | 0 |
| 5-2 | A | 18.5 | Conc. | 30.6 | 0.70 | $Ca(NO_3)_2$ | 0.48 | N/A | 0 |
| 5-3 | A | 20.0 | Field | 32.7 | 0.35 | $Ca(NO_3)_2$ | 1 | N/A | 0 |
| 5-4 | A | 20.0 | Field | 32.7 | 0.35 | $Ca(NO_3)_2$ | 1.3 | N/A | 0 |
| 5-5 | A | 10.0 | Field | 32.7 | 0.35 | $Ca(NO_3)_2$ | 0.65 | N/A | 0 |
| 5-6 | A | 20.0 | Conc. | 31.9 | 0.53 | N/A | 0 | 4.70 | 0.66 |
| 5-7 | A | 20.0 | Field | 32.7 | 0.33 | N/A | 0 | 2.80 | 0.98 |
| 5-8 | B | 25 | Conc. | 31 | 0.27 | N/A | 0 | 0 | 0.00 |
| 5-9 | A | 18.5 | Conc. | 30.6 | 0.70 | N/A | 0 | 0 | 0.00 |
| 5-10 | A | 18.5 | Conc. | 30.6 | 0.70 | N/A | 0 | 0 | 0.00 |
| 5-11 | B | 20 | Conc. | 30.5 | 0.27 | N/A | 0 | 0 | 0.00 |
| 5-12 | A | 16.0 | Conc. | 31.9 | 0.53 | N/A | 0 | 0 | 0.00 |

| Comparative Example | Zeta (Est.)[a] (mV) | Inlet Nozzle velocity[b] (m/s) | Silica/ Rubber ratio setting (phr) | Slurry Flow Rate[c] (L/hr) | Latex Flow Rate[c] (L/hr) | Slurry to Latex Ratio (v/v) |
|---|---|---|---|---|---|---|
| 5-1 | −22.0 | 65 | 50 | 818 | 1118 | 0.73 |
| 5-2 | −17.0 | 50 | 30 | 792 | 1807 | 0.44 |
| 5-3 | −12.2 | 76 | 40 | 738 | 1289 | 0.57 |
| 5-4 | −10.6 | 76 | 40 | 738 | 1289 | 0.57 |
| 5-5 | −15.4 | 78 | 60 | 950 | 524 | 1.81 |
| 5-6 | −15.1 | 76 | 20 | 630 | 2255 | 0.28 |
| 5-7 | −17.6 | 76 | 25 | 630 | 1761 | 0.36 |
| 5-8 | −32.0 | 75 | 50 | 60 | 114 | 0.53 |
| 5-9 | −37 | 82 | 30 | 792 | 1807 | 0.44 |
| 5-10 | −37 | 85 | 50 | 818 | 1118 | 0.73 |

TABLE 5-continued

| 5-11 | −4.8 | 76 | 70 | 60  | 64  | 0.94 |
| 5-12 | −7.9 | 67 | 50 | 552 | 619 | 0.89 |

N/A = not applicable.
[a]Zeta potential values were estimated by interpolation of experimentally determined curves of zeta potential dependence on concentration of the salt or the acid of the slurries of the same grade of silica.
[b]The inlet nozzle velocity is the velocity of the silica slurry as it passes through a nozzle (3a) at first inlet (3) to the reaction zone prior to contacting the latex.
[c]Slurry and Latex Flow Rates are the volumetric flow rates in L/hour of the silica slurry and the latex fluid, respectively, as they are delivered to the reaction zone.
[d]Examples 5-11 and 5-12 used Agilon ® 454 silica.

Comparative Examples 5-8, 5-9, and 5-10 show that without pre-destabilization of silica in the slurry, no silica-containing continuous rubber phase was produced, even when using the remaining process steps according to embodiments of the present invention. Comparative Examples 5-1, 5-2, 5-3, 5-4, 5-5, 5-6 and 5-7 show that even with prior destabilization of silica in the slurry (zeta potential of silica below 25 mV), a silica-containing continuous rubber phase could not be made with the combination of relative volumetric flow rates and degree of dilution of the destabilization agent, (e.g., $Ca(NO_3)_2$ or acetic acid) in the reaction zone when fluids were mixed. Without being bound to any theory, it is theorized that such a low concentration of the destabilization agent in the mixture of slurry and latex in the reaction zone may reduce the coagulation rate of latex rubber particles so that a continuous rubber phase could not be formed within the short residence time in the reaction zone. In the Comparative Example 5-1, with 18.5 wt % of destabilized silica slurry and 30.6 wt % DRC latex concentrate, a relative flow ratio of destabilized slurry to latex was set at 0.73 (V/V) to deliver a silica to rubber ratio of 50 phr to the reaction zone. It is theorized that latex rubber particles did not coagulate within the 0.48 second residence time of the mixture in the reaction zone at such relatively low volumetric flow ratio of destabilized slurry to latex, whereby the original concentration of $Ca(NO_3)_2$ of 14.8 mM in the destabilized silica slurry was diluted by 58% to 6.2 mM in the reaction zone. Thus, it was not possible under these conditions to produce a solid or semi-solid silica-containing, continuous rubber phase comprising 50 phr silica. However, when a higher salt concentration (e.g., 0.5 wt % for Invention Example 4-8 versus 0.22 wt % for Comparative Example 5-1) was used (zeta potential of −17.1 mV versus −22 mV), and the volumetric flow ratio of slurry to latex was set at 0.73 to produce 50 phr silica-containing rubber, suitable product was made. Comparative Example 5-3 shows that a solid silica-containing, continuous rubber phase could not be made at settings of 40 phr silica and a volumetric flow ratio of destabilized slurry to field latex of 0.57 (V/V), whereas such products were made when the flow ratio was 0.93 and 1.50 thereby forming elastomer composite with 45.4 phr and 76.9 phr silica, respectively, (Invention Examples 4-10 and 4-11). The higher slurry-to-latex volumetric flow ratios in the Inventive Examples 4-10 and 4-11 led to less dilution of the salt in the reaction zone than in the Comparative Example 5-3, thus producing a solid silica-containing, continuous rubber phase.

The salt concentration in the 18.5% destabilized silica slurry of Comparative Example 5-2 was 0.48%, with a zeta potential of −17 mV, indicating a degree of destabilization on par with those of Invention Examples 4-4 (−14.1 mV) and 4-5 (−18.4 mV), but no solid silica-containing, continuous rubber phase was formed at a production setting of 30 phr silica content with latex concentrate at the relatively low flow ratio of selected for Comparative Example 5-2. Without wishing to be bound by any theory, it is believed that too much dilution of the salt and/or destabilized silica slurry by latex concentrate in the reaction zone in the Comparative Example 5-2 reduced the coagulation rate of the rubber latex particles in the reaction zone so much that a coherent continuous rubber phase would not form in the residence time of 0.36 seconds within the reaction zone.

When mixing field latex with a 10 wt % silica slurry destabilized by 0.65% $Ca(NO_3)_2$ (zeta potential at −15.4 mV), Comparative Example 5-5 did not produce a solid silica-containing, continuous rubber phase at a silica to rubber ratio of 60 phr and slurry-to-latex volumetric flow ratio of 0.57. These conditions did not deliver sufficient salt and/or destabilized slurry to the reaction zone for rapid coagulation of the rubber latex particles within the reaction zone. In general, either the degree of silica slurry destabilization and/or slurry-to-latex flow ratio adequate to coagulate latex concentrate were not sufficient to coagulate field latex.

Similar results were obtained when acid was employed to destabilize the silica slurry of Comparative Examples 5-6 and 5-7 and Invention Example 4-17, respectively. When acid was used as the sole agent to destabilize the silica slurry, there was a preferred threshold acid-to-ammonia molar ratio in the mixture of the slurry and latex in the reaction zone, below which solid or semi-solid silica-containing continuous rubber phase would not form in the reaction zone. In these experiments, the threshold acid-to-ammonia molar ratio that is desired was always higher than 1.0, with the result that the pH of the product exiting the reaction zone was acidic. In the case of Comparative Examples 5-6 and 5-7, for silica-to-rubber ratio production settings of 20 phr and 25 phr, relatively low slurry-to-latex volumetric flow ratios of 0.28 and 0.36 were used, respectively. At these low flow ratios, the acidic slurry was not sufficiently acidic to neutralize the ammonia in the latex. The acid-to-ammonia molar ratios for Comparative Examples 5-6 and 5-7 were 0.66 and 0.98, respectively. In both cases, only cloudy liquid sprayed out of the reaction zone. In contrast, for the Invention Example 4-17, a higher slurry-to-latex volumetric flow ratio of 1.14 was used for achieving 54.8 phr silica loading, through delivering sufficient acid from slurry into the reaction zone for neutralizing ammonia from latex. The acid-to-ammonia molar ratio in the reaction zone for the Invention Examples 4-17 was 3.14, and a solid silica-containing, continuous rubber phase was produced as an elastic worm-like material exiting the reaction zone. This material could be stretched to 130-150% of its original length without breaking.

Example 6

To explore the process variables that enable formation of a solid or semi-solid silica-containing continuous rubber phase, a series of experiments were conducted under various combinations of process variables, including, but not limited to, concentration of silica in the destabilized slurry, concentration of acid or salts in the destabilized slurry, types of latex (e.g. field latex and latex concentrate), concentration of ammonia in latex, latex lots, flow rates of destabilized slurry and latex, velocities of destabilized slurry and latex in reaction zone, and acid or salt concentrations in reaction zone. This series of experiments was carried out according to Process A, and calcium nitrate was used as the salt. The solid contents of fluids and the inlet nozzle velocities for the experiments are listed in Tables 6 and 7 for a latex concentrate and field latex, respectively. At a low slurry to latex volumetric flow ratio (i.e., low silica to rubber ratio in the reaction zone), the destabilized slurry and salt were diluted by the latex, and no solid or semi-solid silica-containing continuous rubber phase was formed. The setting for silica to rubber ratio was then gradually increased by raising the slurry-to-latex volumetric flow ratio until a solid or semi-solid silica-containing, continuous rubber phase was observed exiting the reaction zone. In Tables 6 and 7, the "Silica Loading Delivered to Reaction Zone" indicates the lowest silica-to-rubber ratio at which a solid or semi-solid silica-containing, continuous rubber phase was produced. The minimum salt concentration in the reaction zone (including both destabilized slurry and latex) for formation of solid or semi-solid silica-containing, continuous rubber phase was calculated for each set of experimental conditions (e.g., silica concentration in slurry, salt concentration in slurry, slurry velocity). For the first six examples listed in Table 6, the silica concentration in the destabilized slurry was the same, namely 18.5 wt %, but the salt concentration in the destabilized slurry was varied, and the silica loading lower threshold for formation of a solid or semi-solid silica-containing, continuous rubber phase was determined in each example by increasing the latex volumetric flow rate until coagulum was formed. Results in Table 6 show that, when the salt concentration in the destabilized silica slurry was increased from 0.22 wt % to 0.75 wt %, it was possible to reduce the slurry-to-latex volumetric flow ratio, so as to obtain a solid or semi-solid silica-containing, continuous rubber phase having a lower silica to rubber ratio. For instance, by increasing the salt concentration from 0.22 wt % to 0.65 wt % of a 18.5 wt % silica slurry, the minimum silica phr setting for creating a solid or semi-solid silica-containing continuous rubber phase decreased from 80 phr silica to 35 phr silica as the relative volumetric flow of latex was increased and the ratio of slurry-to-latex volumetric flow rates was decreased from 1.17 to 0.51. Similar results were observed for other silica slurry concentrations and when acid was used to destabilize the silica slurry.

TABLE 6

Solid or semi-solid silica-containing continuous rubber phase formation thresholds: phr silica loading and calcium nitrate concentration under various conditions when destabilized silica slurry was mixed with 50% diluted latex concentrate (31 wt % dry rubber content; 0.70 wt % ammonia content except for last sample, for which ammonia content was 0.53 wt %) using Process A.

| Silica Conc. In Slurry (wt %) | Ca(NO$_3$)$_2$ in Slurry (wt %) | [Ca$^{2+}$] in slurry (mM) | Zeta Potential (Est.) (mV) | Inlet Nozzle Velocity (m/s)$^a$ | Silica Loading Delivered to Reaction Zone (phr) | Slurry to latex flow ratio (v/v) | [Ca$^{2+}$] Conc in Reaction Zone (mM) |
|---|---|---|---|---|---|---|---|
| 18.5 | 0.22 | 14.8 | −22.0 | 87 | 80 | 1.17 | 7.9 |
| 18.5 | 0.39 | 26.2 | −18.4 | 46 | 46.3 | 0.68 | 10.5 |
| 18.5 | 0.48 | 32.3 | −17.0 | 67 | 40 | 0.59 | 11.9 |
| 18.5 | 0.52 | 34.9 | −16.5 | 58 | 45 | 0.66 | 13.8 |
| 18.5 | 0.65 | 43.6 | −15.1 | 58 | 35 | 0.51 | 14.7 |
| 18.5 | 0.75 | 50.4 | −14.1 | 59 | 35 | 0.51 | 17.0 |
| 26 | 0.68 | 47.6 | −14.5 | 54 | 55 | 0.55 | 16.8 |
| 26 | 0.99 | 69.3 | −12.1 | 77 | 50 | 0.50 | 23.0 |
| 11 | 0.36 | 23.2 | −19.1 | 80 | 35 | 0.90 | 10.9 |
| 20 | 1.00 | 67.8 | −12.2 | 49 | 35 | 0.49 | 22.2 |

$^a$The inlet nozzle velocity is the velocity of the silica slurry as it passes through a nozzle (3a) at first inlet (3) to the reaction zone prior to contacting the latex.

TABLE 7

Solid or semi-solid silica-containing continuous rubber phase formation thresholds: phr silica loading and calcium nitrate concentration under various conditions when silica slurry was mixed with field latex using Process A.

| Silica Conc. In Slurry (wt %) | Ca(NO$_3$)$_2$ in Slurry (wt %) | [Ca$^{2+}$] in slurry (mM) | Zeta Potential Slurry (mV) | Inlet Nozzle Velocity (m/s)$^a$ | Silica Loading Lower Threshold (phr) | Slurry to latex ratio (v/v) | [Ca$^{2+}$] Conc in Reaction Zone (mM) |
|---|---|---|---|---|---|---|---|
| 10 | 0.65 | 41.7 | −15.4 | 78 | 65 | 1.96 | 27.6 |
| 19.6 | 0.90 | 60.8 | −12.9 | 71 | 65 | 0.95 | 29.6 |
| 20 | 1.0 | 67.7 | −12.2 | 76 | 65 | 0.93 | 32.6 |
| 20 | 1.3 | 88.0 | −10.6 | 76 | 50 | 0.72 | 36.7 |

$^a$The inlet nozzle velocity is the velocity of the silica slurry as it passes through a nozzle (3a) at first inlet (3) to the reaction zone prior to contacting the latex.

In a batch mode coagulation experiment conducted by mixing silica slurry with latex in a bucket under relatively low shear mixing, the minimum amount of the salt or acid to coagulate the latex in the mixture is a constant, independent of original concentration of salt or acid in the silica slurry before mixing. However, in processes according to various embodiments of the invention, the threshold concentration of the salt in the reaction zone for formation of a solid or semi-solid silica-containing, continuous rubber phase increases with increases in the salt concentration in the destabilized silica slurry before mixing (i.e. the degree of destabilization of silica slurry). For example, in Table 6, one can see that the threshold concentration of $Ca(NO_3)_2$ for coagulating the latex concentrate is independent of silica concentration in the destabilized slurry, but depends strongly on the original salt concentration in the destabilized silica slurry. When the salt concentration increased from 14.8 mM to 69.3 mM, the threshold salt concentration increased from 7.9 mM to 23.0 mM. For comparison, a series of batch coagulation experiments were conducted in a bucket using low shear stirring and it was determined that the threshold concentration of $Ca(NO_3)_2$ for coagulating the same latex concentrate was a constant at 10.7 mM, independent of both the original salt concentration in the destabilized silica slurry as well as the silica concentration in the destabilized slurry. These results highlight the importance of balancing the degree of destabilization of the silica slurry, rate of mixing, rate of silica particle agglomeration, and rate of latex coagulation under high shear for efficiently producing a solid or semi-solid silica-containing, continuous rubber phase.

Likewise, the threshold acid-to-ammonia ratio for formation of a solid or semi-solid silica-containing, continuous rubber phase according to embodiments of the invention is not a constant, but increases with the degree of acid destabilization of the silica slurry.

Based on the production variables described herein, such as the velocity of the destabilized silica slurry, the velocity of the latex, the relative flow rates of the destabilized silica slurry and latex fluids, the degree of destabilization of the silica slurry, the silica concentration in the destabilized slurry, the dry rubber content of the latex, and the ammonia concentration of the latex (e.g., the ammonia concentration can be reduced by bubbling nitrogen through the latex or on top of the liquid surface), it was possible to obtain and/or predict formation of a solid or semi-solid silica-containing, continuous rubber phase over a range of desired silica loadings. Thus, the process of the invention can be operated over an optimized range of variables.

Comparative Example 7

The following comparative experiments utilizing a multi-step batch process were conducted as a comparison to a continuous process according to embodiments of the invention.

In these comparative examples, a slurry of silica was combined with elastomer latex under batch mixing conditions, using either a silica slurry that had been ground (as in the process of Process B above), or a silica slurry prepared without grinding, each at two slurry concentrations: 25 wt % and 6 wt %, respectively (based on the total weight of the slurry). The silica used in these examples was ZEOSIL® 1165 MP. The elastomer latex used in all experiments was high ammonia latex concentrate (60CX12021, from Chemionics Corporation, Tallmadge, Ohio) diluted by 50% (by weight) with deionized water.

Experiment 7-A: Batch Mixing with Ground Silica Slurry

The silica slurry prepared above was mixed with a desired amount of deionized water in a 5 gallon bucket to achieve the target silica concentration of slurry.

For each run described below, the indicated quantity of silica slurry was taken from the slurry run tank and mixed for fifteen minutes with the indicated quantity of elastomer latex in a 5 gallon bucket—using an overhead low shear stirrer (Model #1750, Arrow Engineering Co, Inc., Hillside, N.J.). Except in Run 5, calcium chloride salt was then added to the mixture and mixing continued until coagulation appeared to be complete. Unless otherwise indicated, the salt was added as a 20 wt % salt solution in deionized water. The amount of salt used (dry amount) is indicated below. The "target phr silica" reflects the amount of silica in phr expected to be present in the rubber composite based on the starting amount of silica used, assuming all silica was incorporated into all of the rubber. Runs 1-4 were dewatered and dried according to the Process B methods described above.

Run 1—Target 55 phr silica rubber composite using 25 wt % silica slurry.
    Conditions (for approx. 1.9 kg dried material):
        2.7 kg of 25 wt % silica slurry, ground
        4.0 kg of latex concentrate
        0.060 kg (equivalent dry amount) of salt in solution.
    Observations: Big pieces of wet rubber composite were formed around the mixing blade after coagulation was complete. However, coagulation did not incorporate all of the rubber and silica into the coagulum, as a milky liquid remained in the mixing bucket and a layer of wet silica was deposited on the bottom of the bucket. The dried coagulum weighed about 0.5 kg, which was much less than the 1.9 kg targeted yield. A significant amount of silica appeared on the surface of the rubber product indicating poor distribution of silica within the rubber composite. The silica appeared to be very poorly mixed with rubber in the coagulum, and undispersed grains of silica were felt and seen throughout the coagulum. Silica particles were observed falling off dried coagulum. When dry rubber product was cut using a pair of scissors, silica particles fell from the cut surface. Following drying, TGA analysis of the rubber product indicated loadings of silica averaged about 44 phr.

Run 2—Target 70 phr silica rubber composite using 25 wt % silica slurry.
    Conditions (for approx. 1.9 kg dried material):
        3.1 kg of 25 wt % silica slurry, ground
        3.6 kg of latex concentrate
        0.060 kg of salt, added dry.
    Observations: Big pieces of wet rubber were formed around the mixing blade and the post coagulation liquid was cloudy or milky. A layer of silica remained on the bottom of the bucket. Approximately 1 kg of dried coagulum was produced. Similar to Run 1, very poor distribution of silica particles within the rubber coagulum was observed. Following drying, TGA analysis of the rubber product revealed silica loadings averaging about 53 phr.

Run 3—Target 55 phr silica rubber composite using 6 wt % silica slurry.
    Conditions (for approx. 2 kg dried material):
        2.6 kg of 25 wt % silica slurry, ground
        8.4 kg deionized water 4.0 kg of latex concentrate 0.090 kg of salt in solution.

Observations: After adding the salt, the whole mixture of latex and slurry became a soft gel. About 0.9 kg dry composite was made. Similar to Run 1, very poor distribution of silica particles within the rubber coagulum was observed. Following drying, the silica loading in the coagulum measured by TGA was about 45 phr.

Run 4—Target 70 phr silica rubber composite using 6 wt % silica slurry.

Conditions (for approx. 2 kg dried material):

3.1 kg of 25 wt % silica slurry, ground 9.9 kg water 3.7 kg of latex concentrate 0.10 kg of salt in solution.

Observations: After adding the salt, small crumbs formed in milky liquid. A sieve was used to collect and compact the small crumbs. Similar to Run 1, very poor dispersion of silica particles within the rubber coagulum was observed. About 0.7 kg dry composite was collected with silica loading in the crumb measured by TGA at about 50 phr.

Run 5 Target 55 phr silica rubber composite using 25 wt % silica slurry destabilized with 1% of $CaCl_2$.

Conditions (for approx. 1.9 kg dried material):

4.0 kg of 25 wt % slurry containing 1% $CaCl_2$, ground 2.7 kg latex concentrate.

Observations: The latex was put in a 5-gallon bucket with an overhead low shear stir. The ground 25% destabilized silica slurry containing 1% of $CaCl_2$ was poured into the bucket with stirring, and stirring continued until coagulation was complete. Visual and tactile observations of the rubber piece revealed many large pockets (mm to cm size) of silica slurry within the rubber piece and a large quantity of silica particles trapped but not distributed within the solid rubber phase. The average silica loading in the dried coagulum measured by TGA was about 58 phr. Sample-to-sample variations of silica loadings were greater than 10 phr.

Experiment 7-B: Batch Mixing Using Silica Slurry without Grinding

For preparing the silica slurry without grinding, the silica was slowly added to water using only an overhead stirrer (Model #1750, Arrow Engineering Co, Inc., Hillside, N.J.). When the silica appeared to be completely dispersed, the latex was added and the liquid mixture stirred for 20 minutes. The $CaCl_2$ salt solution was then added to the liquid mixture and allowed to mix until coagulation appeared to be complete. Samples were dried in an oven prior to TGA analysis.

Run 5B—Target 65 phr silica rubber composition using 25 wt % silica slurry.

Conditions (for approx. 1.9 kg dried material):

3.0 kg of 25 wt % silica slurry 3.8 kg of latex concentrate 0.06 kg of salt in solution.

Observations: After adding the salt, very large pieces of rubber coagulum were formed around the blade of the stirrer. After coagulation, a thick layer of silica settled at the bottom of the bucket. The rubber piece felt gritty and slimy. Grains of silica could be felt and seen on the surface of the rubber coagulum and visual observation revealed very poor distribution of silica in the rubber coagulum. The silica loading in the coagulum was determined as 25 phr using TGA.

Run 6—Target 80 phr silica rubber composite using 25 wt % silica slurry.

Conditions (for approx. 1.9 kg dried material):

3.3 kg of 25 wt % silica slurry 3.4 kg of latex concentrate 0.06 kg of salt in solution.

Observations: The loading of silica in the rubber was determined as 35 phr and visual observation revealed very poor distribution of silica in the rubber coagulum.

Run 7—Target 110 phr silica rubber composite using 6 wt % silica slurry.

Conditions (for approx. 1.9 kg dried material, done in two batches):

1.0 kg of 25 wt % silica slurry 15.6 kg of water 3.0 kg of latex concentrate 0.120 kg of salt in solution.

Observations: Small rubber crumbs were formed in the bucket and the liquid remaining after coagulation was mostly clear, with a layer of silica on the bottom of the bucket. TGA measured silica loading in the rubber product averaged about 30 phr. The coagulum was elastic, with silica grains on the surface. As it dried, silica could easily be brushed off the surface, and visual observation revealed very poor distribution of silica in the rubber coagulum.

Run 8—Target 140 phr silica rubber composite using 6 wt % silica slurry.

Conditions (for approx. 1.9 kg dried material, done in two batches):

1.0 kg of 25 wt % silica slurry 15.7 kg of water 2.4 kg of latex concentrate 0.110 kg of salt in solution.

Observations: Small rubber crumbs were formed in the bucket and the liquid remainder after coagulation was mostly clear, with a layer of silica on the bottom of the bucket. TGA measured silica loading in the rubber product averaged about 35 phr. Particles of silica were settled on the surface of the rubber product that could be brushed free as it dried, and visual observation revealed very poor distribution of silica in the rubber coagulum.

Summary of Observations.

Compared with the continuous process of making elastomer composite, as for instance in Examples 4 and 6, batch latex mixing process of Example 7 were incapable of achieving the desired quality or quantity of silica dispersion in rubber. With ground silica slurries, the actual silica loading in rubber products produced with batch mixing was observed to be <55 phr. After coagulation, a significant amount of silica settled at the bottom of the mixing bucket and appeared on the surface of the rubber product, indicating poor capture of silica particles within the rubber coagulum. With silica slurries that had not been ground, the actual silica loading in rubber produced with batch mixing was limited to 30 phr to 35 phr. After coagulation, a thick layer of silica settled at the bottom of the mixing bucket, the silica appeared to be very poorly mixed with rubber in the coagulum, and undispersed grains of silica were felt and seen throughout the coagulum. Compared to processes according to embodiments of the present invention, batch mixing processes yielded poor incorporation and distribution of silica particles within the rubber matrix of the coagulum. In the product of each of these batch mixing runs, silica particles were observed falling off dried coagulum. When dry rubber composite was cut using a pair of scissors, silica particles fell from the cut surface. Such loss of silica particles was not observed in examining the solid or semi-solid silica-containing continuous rubber phase produced by processes according to embodiments of the invention.

Example 8

In these examples, the process to produce silica elastomer composite was run on the apparatus shown in either FIG. 1A or 1B under various operating conditions as described in Table 8, using either Process A or Process B as described above. Operating conditions were selected to yield silica-containing continuous rubber phase with the silica to rubber ratios set forth in Table 8. In each example, the silica-containing continuous rubber phase comprised at least 40 wt % aqueous fluid. The approximate elongation at break of the silica-containing continuous rubber phase emerging from the reaction zone is also given in Table 8.

Higher elongation is correlated with the use of latex concentrate, lower production rates (rate of flow of material on a dry basis), increased residence time in the reaction zone, and/or lower flow rates of latex and/or destabilized silica slurry.

The present invention includes the following aspects/embodiments/features in any order and/or in any combination, a method of producing a silica elastomer composite, comprising:

(1) (a) providing a continuous flow under pressure of at least a first fluid comprising a destabilized dispersion of silica in particulate form, and having a wt % of silica of from about 6 wt % to 35 wt % based on the weight of the first fluid, wherein said silica has been obtained without drying said silica to a solids content greater than 40%, by weight; and

TABLE 8

| Example | Process A/B | Silica[a] concentration in Slurry (wt %) | Latex Type | Rubber concentration in Latex (DRC) (wt %) | Latex wt % NH$_3$ (wt %) | Salt Type | Salt wt % in Slurry (wt %) | Zeta Potential (Est.)[b] (mV) |
|---|---|---|---|---|---|---|---|---|
| 8-1 | B | 25 | Conc. | 31 | 0.27 | CaCl$_2$ | 0.75 | −11.4 |
| 8-2 | B | 25 | Conc. | 31 | 0.27 | CaCl$_2$ | 0.75 | −11.4 |
| 8-3 | B | 25 | Conc. | 31 | 0.27 | CaCl$_2$ | 1.0 | −9.5 |
| 8-4 | B | 25 | Conc. | 31 | 0.27 | N/A | 0 | −11.2 |
| 8-5 | B | 25 | Conc. | 31 | 0.27 | N/A | 0 | −11.2 |
| 8-6 | B | 25 | Conc. | 31 | 0.27 | N/A | 0 | −17.8 |
| 8-7 | B | 12.5 | Conc. | 31 | 0.27 | CaCl$_2$ | 0.50 | |
| 8-8 | A | 20 | Conc. | 31.9 | 0.53 | Ca(NO$_3$)$_2$ | 1.0 | −12.2 |
| 8-9 | A | 20.0 | Field | 32.7 | 0.33 | N/A | 0 | −17.6 |
| 8-10 | A | 20.0 | Field | 32.7 | 0.33 | N/A | 0 | −17.6 |
| 8-11 | A | 20.0 | Field | 32.7 | 0.33 | Ca(NO$_3$)$_2$ | 1 | −6.1 |
| 8-12 | A | 20.0 | Field | 32.7 | 0.33 | Ca(NO$_3$)$_2$ | 1 | −6.1 |
| 8-13 | A | 20.0 | Field | 32.7 | 0.33 | Ca(NO$_3$)$_2$ | 1 | −6.1 |
| 8-14 | B | 25 | Conc. | 31.0 | 0.27 | CaCl$_2$ | 1.50 | −6.9 |
| 8-15 | B | 25 | Conc. | 31.0 | 0.27 | CaCl$_2$ | 1.00 | −9.5 |
| 8-16 | A | 16.5 | Conc. | 30.6 | 0.68 | N/A | 0.00 | −16.5 |
| 8-17 | B | 25 | Conc. | 30.5 | 0.27 | Ca(NO$_3$)$_2$ | 0.59 | −3.0 |
| 8-18 | B | 25 | Conc. | 31 | 0.27 | Ca(NO$_3$)$_2$ | 1.00 | −12.1 |

| Example | Acid Type | Acid wt % in Slurry (wt %) | Acid/NH$_3$ molar ratio | Inlet Nozzle Velocity[c] (m/s) | Actual Silica loading (phr) | Slurry Flow Rate[d] (L/hr) | Latex Flow Rate[d] (L/hr) | Slurry-to-Latex Flow Ratio (v/v) | Elongation @ Break of Solid Rubber Phase (%) |
|---|---|---|---|---|---|---|---|---|---|
| 8-1 | N/A | 0 | 0.00 | 19 | 95 | 60 | 67 | 0.898 | 300-400 |
| 8-2 | N/A | 0 | 0.00 | 19 | 101 | 60 | 53 | 1.141 | 300-600 |
| 8-3 | N/A | 0 | 0.00 | 19 | 92 | 60 | 67 | 0.898 | 200-250 |
| 8-4 | Formic | 2.0 | 1.36 | 19 | 45 | 60 | 142 | 0.423 | 200-400 |
| 8-5 | Formic | 2.0 | 1.87 | 19 | 47 | 60 | 103 | 0.581 | 150-250 |
| 8-6 | Acetic | 2.6 | 1.35 | 19 | 61 | 60 | 142 | 0.423 | 200-300 |
| 8-7 | Acetic | 1.3 | 1.86 | 37 | 33 | 60 | 48 | 1.245 | 300-400 |
| 8-8 | N/A | 0 | 0.00 | 49 | 38.4 | 540 | 703 | 0.77 | 130 |
| 8-9 | Acetic | 2.80 | 3.14 | 75 | 54.8 | 945 | 826 | 1.14 | 130-150 |
| 8-10 | Acetic | 2.80 | 3.93 | 75 | 67.2 | 945 | 660 | 1.43 | 120 |
| 8-11 | Acetic | 2.8 | 1.77 | 76 | 54.9 | 963 | 841 | 1.14 | 120 |
| 8-12 | Acetic | 2.8 | 2.36 | 76 | 43.3 | 630 | 734 | 0.86 | 150 |
| 8-13 | Acetic | 2.8 | 1.77 | 76 | 34.0 | 630 | 978 | 0.64 | 150-200 |
| 8-14 | N/A | 0 | 0 | 19 | 138 | 60 | 43 | 1.38 | 300-400 |
| 8-15 | N/A | 0 | 0.00 | 19 | 122 | 60 | 37 | 1.63 | 300-500 |
| 8-16 | acetic | 3.6 | 1.81 | 64 | 40.4 | 800 | 743 | 1.08 | 120-150 |
| 8-17 | N/A | 0 | 0 | 75 | 70.9 | 60 | 58 | 1.040 | 200-300 |
| 8-18 | N/A | 0 | 0 | 75 | — | 60 | 142 | 0.422 | 130-150 |

[a]Example 8-17 used Agilon 400 silica (obtained from PPG Industries Inc.). All other examples used ZEOSIL® Z1165 MP precipitated silica.
[b]Zeta potential values were estimated by interpolation of experimentally determined curves of zeta potential dependence on concentration of the salt or the acid of the slurries of the same grade of silica.
[c]The inlet nozzle velocity is the velocity of the silica slurry as it passes through a nozzle (3a) at first inlet (3) to the reaction zone (13) prior to contacting the latex.
[d]Slurry and Latex Flow Rates are the volumetric flow rates in L/hour of the silica slurry and the latex fluid, respectively, as they are delivered to the reaction zone.

The results show that highly elastic silica-containing continuous rubber phase materials in the form of solid articles can be achieved at a variety of operating conditions.

(b) providing a continuous flow of at least a second fluid comprising elastomer latex;
(c) providing volumetric flow of the first fluid relative to that of the second fluid to yield a silica content of about 15 phr to about 180 phr in the silica elastomer composite;
(d) combining the first fluid flow and the second fluid flow with a sufficiently energetic impact to distribute the silica within the elastomer latex to obtain a flow of a solid silica-containing continuous rubber phase or semi-solid silica-containing continuous rubber phase.

(2) The method, further comprising before step 1(a):
(a) acidifying a solution of silicate to obtain an aqueous slurry of precipitated silica; and
(b) filtering said aqueous slurry of precipitated silica to obtain precipitated silica in the form of a filter cake that has a water content of from about 60 wt % to about 90 wt % based on the weight of the filter cake.

(3) The method, further comprising mechanically processing said filter cake, whereby silica particle agglomeration, filter cake viscosity, or a combination thereof, is reduced.

(4) The method, further comprising adjusting acidity of the aqueous slurry of precipitated silica.

(5) The method, further comprising, before step 1(a):
(a) acidifying a solution of silicate to obtain an aqueous slurry of precipitated silica having an initial ionic concentration; and
(b) adjusting the initial ionic concentration of the aqueous slurry of precipitated silica to yield a destabilized dispersion of the precipitated silica having an ionic concentration of about 10 mM to about 160 mM.

(6) The method, further comprising before step 1(a):
(a) acidifying a solution of silicate to obtain an aqueous slurry of precipitated silica;
(b) without drying the precipitated silica, adjusting the aqueous slurry of precipitated silica to a solids content of from about 6 wt % to about 35 wt %, to obtain a destabilized dispersion of the precipitated silica.

(7) The method, further comprising before step 1(a):
(a) acidifying a solution of silicate to obtain an aqueous slurry of precipitated silica;
(b) recovering precipitated silica without forming a filter cake.

(8) The method, wherein said adjusting comprises filtering said aqueous slurry of precipitated silica to obtain precipitated silica in the form of a filter cake, washing the filter cake with an aqueous medium and adjusting filter cake solids content and ionic concentration to yield the first fluid.

(9) The method, further comprising mechanically processing said filter cake, whereby silica particle agglomeration, filter cake viscosity, or a combination thereof, is reduced.

(10) The method, further comprising before step 1(a):
(a) adding an aqueous silicate solution to an aqueous slurry of carbon black particles to form a reaction mixture;
(b) adjusting the reaction mixture pH to deposit silica onto the carbon black particles and yield an aqueous slurry of silica coated carbon black particles having an initial ionic concentration; and
(c) without drying the reaction mixture to a solids content of greater than 40 wt %, adjusting the aqueous slurry of the silica coated carbon black particles to a solids content of from about 6 wt % to about 35 wt %.

(11) The method, wherein said silica is silica coated carbon black.

(12) The method, further comprising adjusting the initial ionic concentration of the aqueous slurry of precipitated silica to yield a destabilized dispersion of silica coated carbon black particles having an ionic concentration of about 10 mM to about 160 mM.

(13) A method for making a rubber compound comprising
(a) conducting the method of claim 1, and
(b) blending the silica elastomer composite with other components to form the rubber compound, wherein said other components comprise at least one antioxidant.

(14) The method, wherein at least one antioxidant has a lower affinity to silica than 6PPD antioxidant.

(15) The method, wherein said antioxidant comprises polymerized 2,2,4-trimethyl 1-1,2 dihydroquinoline or 2,6-di-t-butyl-4-methylphenol, 6PPD antioxidant, or a combination thereof.

(16) The method, wherein said silica is chemically treated with at least one silane.

(17) The method, wherein said silica is silane-treated prior to carrying out step 1(a).

(18) The method, said method further comprising subjecting particulate silica to mechanical processing, whereby a controlled silica particle size distribution is obtained prior to carrying out step 1(a).

The present invention further includes a solid silica-containing rubber phase article made by the above methods and comprising at least 40 phr silica dispersed in natural rubber and at least 40 wt % aqueous fluid and having a length dimension (L), wherein the solid silica-containing continuous rubber phase article can be stretched to at least 130% of (L) without breaking.

The present invention can include any combination of these various features or embodiments above and/or below as set forth in any sentences and/or paragraphs herein. Any combination of disclosed features herein is considered part of the present invention and no limitation is intended with respect to combinable features.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:
1. A method of producing a silica elastomer composite, comprising:
(a) providing a continuous flow under pressure of at least a first fluid comprising a destabilized dispersion of silica in particulate form, and having a wt % of silica of from about 6 wt % to 35 wt % based on the weight of the first fluid, wherein said silica has been obtained without drying said silica to a solids content greater than 40%, by weight; and (b) providing a continuous flow of at least a second fluid comprising elastomer latex;

(c) providing volumetric flow of the first fluid relative to that of the second fluid to yield a silica content of about 15 phr to about 180 phr in the silica elastomer composite;

(d) combining the first fluid flow and the second fluid flow with a sufficiently energetic impact to distribute the silica within the elastomer latex to obtain a flow of a solid silica-containing continuous rubber phase or semi-solid silica-containing continuous rubber phase, wherein said flow of said solid or semi-solid silica-containing rubber phase forms in two seconds or less after combining said first fluid flow and second fluid flow; and (e) recovering said solid or semi-solid silica-containing continuous rubber phase that is the silica elastomer composite.

2. The method of claim 1, further comprising before step 1(a):

(a) acidifying a solution of silicate to obtain an aqueous slurry of precipitated silica; and (b) filtering said aqueous slurry of precipitated silica to obtain precipitated silica in the form of a filter cake that has a water content of from about 60 wt % to about 90 wt % based on the weight of the filter cake, further comprising mechanically processing said filter cake, whereby silica particle agglomeration, filter cake viscosity, or a combination thereof, is reduced.

3. The method of claim 2, further comprising adjusting acidity of the aqueous slurry of precipitated silica.

4. The method of claim 1, further comprising, before step 1(a):

(a) acidifying a solution of silicate to obtain an aqueous slurry of precipitated silica having an initial ionic concentration; and (b) adjusting the initial ionic concentration of the aqueous slurry of precipitated silica to yield a destabilized dispersion of the precipitated silica having an ionic concentration of about 10 mM to about 160 mM, wherein said adjusting comprises filtering said aqueous slurry of precipitated silica to obtain precipitated silica in the form of a filter cake, washing the filter cake with an aqueous medium and adjusting filter cake solids content and ionic concentration to yield the first fluid.

5. The method of claim 4, wherein said filter cake has a silica particle agglomeration and a filter cake viscosity, and said method further comprising mechanically processing said filter cake, whereby said silica particle agglomeration, or said filter cake viscosity, or a combination thereof, is reduced.

6. The method of claim 1, wherein said destabilized dispersion of silica in particulate form is a destabilized dispersion of silica coated carbon black.

7. The method of claim 1, further comprising before step 1(a):

(a) adding an aqueous silicate solution to an aqueous slurry of carbon black particles to form a reaction mixture;

(b) adjusting the reaction mixture pH to deposit silica onto the carbon black particles and yield an aqueous slurry of silica coated carbon black particles having an initial ionic concentration; and (c) without drying the reaction mixture to a solids content of greater than 40 wt %, adjusting the aqueous slurry of the silica coated carbon black particles to a solids content of from about 6 wt % to about 35 wt %, further comprising adjusting the initial ionic concentration of the aqueous slurry of the silica coated carbon black particles to yield a destabilized dispersion of silica coated carbon black particles having an ionic concentration of about 10 mM to about 160 mM.

8. A method for making a rubber compound comprising
(a) conducting the method of claim 1, and
(b) blending the silica elastomer composite with other components to form the rubber compound, wherein said other components comprise at least one antioxidant.

9. The method of claim 8, wherein at least one antioxidant has a lower affinity to silica than 6PPD antioxidant.

10. The method of claim 8, wherein said antioxidant comprises polymerized 2,2,4-trimethyl 1-1,2 dihydroquinoline or 2,6-di-t-butyl-4-methylphenol, 6PPD antioxidant, or a combination thereof.

11. The method of claim 1, wherein said destabilized dispersion of silica in particulate form is a destabilized dispersion of silica that is chemically treated with at least one silane.

12. The method of claim 11, wherein said silica is silane-treated prior to carrying out step 1(a).

13. The method of claim 1, wherein the silica is precipitated silica.

14. The method of claim 1, wherein said silica has a BET surface area of about 20 $m^2$/g to about 450 $m^2$/g.

15. The method of claim 1, wherein said flow of said solid or semi-solid silica-containing continuous rubber phase forms in about 50 milliseconds to about 1500 milliseconds after combining said first fluid flow and second fluid flow.

16. The method of claim 1, wherein the volumetric flow of said first fluid and of said second fluid are at a volumetric flow ratio of first fluid to second fluid of from 0.2:1 to 2.8:1.

17. The method of claim 1, wherein the volumetric flow of said first fluid and of said second fluid are at a volumetric flow ratio of first fluid to second fluid of from 0.4:1 to 3.2:1, and said destabilized dispersion of silica includes at least one salt.

18. The method of claim 1, wherein the volumetric flow of said first fluid and of said second fluid are at a volumetric flow ratio of first fluid to second fluid of from 0.2:1 to 2.8:1, and said destabilized dispersion of silica includes at least one acid.

19. The method of claim 1, wherein said elastomer latex comprises a base, said destabilized dispersion of silica comprises at least one acid, and a molar ratio of hydrogen ions in said acid in said first fluid to said base in said second fluid is at least 1.0.

20. The method of claim 1, wherein said elastomer latex comprises a base, said destabilized dispersion of silica comprises at least one acid, and a molar ratio of hydrogen ions in said acid in said first fluid to said base in said second fluid is from 1 to 4.5.

21. The method of claim 1, wherein said destabilized dispersion of silica includes at least one salt, wherein said salt is present in said destabilized dispersion in an amount of from about 0.2 wt % to about 2 wt % based on weight of said destabilized dispersion.

22. The method of claim 1, wherein said destabilized dispersion of silica includes at least one acid, wherein said acid is present in said destabilized dispersion in an amount of from about 0.8 wt % to about 7.5 wt % based on weight of said destabilized dispersion.

23. The method of claim 1, wherein step (c) is carried out in a semi-confined reaction zone and the first fluid has a velocity sufficient to induce cavitation in the reaction zone upon combining with the second fluid.

24. The method of claim 23, wherein the second fluid has a velocity sufficient to create turbulent flow.

25. The method of claim 1, wherein said first fluid comprises an aqueous fluid.

26. The method of claim 25, wherein said first fluid comprises an aqueous fluid, further comprising at least one salt, and at least one acid.

27. The method of claim 1, wherein carbon black is present in said silica elastomer composite in an amount of from about 10 wt % to about 0.1 wt % based on total particulates present in said silica elastomer composite.

28. The method of claim 1, said method further comprising destabilizing a dispersion of silica by lowering a pH of the dispersion of silica to a pH of from 2 to 4 so as to form the destabilized dispersion of silica provided in step 1(a).

29. The method of claim 1, wherein said silica has a hydrophilic surface.

30. The method of claim 1, wherein said first fluid in step (a) further comprises at least one acid, and wherein said acid has a molecular weight or an average molecular weight below 200.

31. The method of claim 1, wherein said elastomer latex is natural rubber latex.

32. The method of claim 31, wherein the natural rubber latex is in the form of an epoxidized natural rubber latex.

33. The method of claim 31, wherein the natural rubber latex is in the form of a latex concentrate.

34. The method of claim 1, further comprising mixing the silica elastomer composite with additional elastomer.

35. The method of claim 1, further comprising providing one or more additional fluids and combining the one or more additional fluids with said first fluid flow and second fluid flow, wherein said one or more additional fluids comprise one or more elastomer latex fluids, and said additional fluids are the same as or different from said elastomer latex present in said second fluid flow.

* * * * *